US010120531B2

United States Patent
Lochhead et al.

(10) Patent No.: US 10,120,531 B2
(45) Date of Patent: Nov. 6, 2018

(54) USER INTERFACES FOR NAVIGATING AND PLAYING CONTENT

(71) Applicant: Apple Inc., Cupertino, CA (US)

(72) Inventors: Jonathan Lochhead, Scotts Valley, CA (US); Joe Howard, San Jose, CA (US); Jeffrey L. Robbin, Los Altos, CA (US); William Bachman, San Jose, CA (US); Benjamin W. Keighran, Menlo Park, CA (US); Elbert D. Chen, Cupertino, CA (US); Jennifer L. C. Folse, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 393 days.

(21) Appl. No.: 15/017,530

(22) Filed: Feb. 5, 2016

(65) Prior Publication Data

US 2017/0068402 A1    Mar. 9, 2017

Related U.S. Application Data

(60) Provisional application No. 62/215,567, filed on Sep. 8, 2015.

(51) Int. Cl.
*G06F 3/0482* (2013.01)
*G06F 3/0488* (2013.01)
(Continued)

(52) U.S. Cl.
CPC .......... *G06F 3/0482* (2013.01); *G06F 3/0485* (2013.01); *G06F 3/0488* (2013.01);
(Continued)

(58) Field of Classification Search
CPC .... G06F 3/0482; G06F 3/0485; G06F 3/0488; H04N 21/41407; H04N 21/47217; H04N 21/4825; G11B 27/102
See application file for complete search history.

(56) References Cited

U.S. PATENT DOCUMENTS

| 5,483,261 A | 1/1996 | Yasutake |
| 5,488,204 A | 1/1996 | Mead et al. |

(Continued)

FOREIGN PATENT DOCUMENTS

| EP | 2 741 176 A2 | 6/2014 |
| JP | 2000-163031 A | 6/2000 |

(Continued)

OTHER PUBLICATIONS

Bohn, D. (Jan. 6, 2014). "Rebooting webOS: how LG rethought the smart TV," The Verge, located at: http://www.theverge.com/2014/1/6/5279220/rebooting-webos-how-lg-rethought-the-smart-tv, retrieved on Feb. 24, 2014, five pages.

(Continued)

*Primary Examiner* — Shen Shiau
(74) *Attorney, Agent, or Firm* — Morrison & Foerster LLP

(57) ABSTRACT

In some embodiments, a first electronic device, during a playlist mode, displays a plurality of representations of content items available on the first electronic device. While in the playlist mode, the first electronic device optionally receives a first input, via one or more input devices, selecting a respective representation of a respective content item from the plurality of representations of content items. In response to receiving the first input, in accordance with a determination that the respective content item was playing on the first electronic device when the first input was received, the first electronic device optionally transitions to a now playing mode. In accordance with a determination that the respective content item was not playing on the first electronic device when the first input was received, the first electronic device optionally plays the respective content item on the first electronic device while remaining in the playlist mode.

45 Claims, 46 Drawing Sheets

(51) Int. Cl.
*G06F 3/0485* (2013.01)
*G06F 3/0484* (2013.01)
*G11B 27/10* (2006.01)
*H04N 21/414* (2011.01)
*H04N 21/472* (2011.01)
*H04N 21/482* (2011.01)

(52) U.S. Cl.
CPC ........ *G06F 3/04847* (2013.01); *G11B 27/102* (2013.01); *H04N 21/41407* (2013.01); *H04N 21/47217* (2013.01); *H04N 21/4825* (2013.01)

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 6,690,391 B1 | 2/2004 | Proehl et al. | |
| 7,015,894 B2 | 3/2006 | Morohoshi | |
| 7,184,064 B2 | 2/2007 | Zimmerman et al. | |
| 7,216,008 B2* | 5/2007 | Sakata | G06F 3/16 700/94 |
| 7,663,607 B2 | 2/2010 | Hotelling et al. | |
| 8,148,622 B2* | 4/2012 | Rothkopf | G11B 27/105 84/604 |
| 8,384,672 B2 | 2/2013 | Sakai et al. | |
| 8,479,122 B2 | 7/2013 | Hotelling et al. | |
| 8,615,716 B2 | 12/2013 | Kagaya | |
| 9,841,876 B2 | 12/2017 | Carrigan et al. | |
| 2003/0146915 A1* | 8/2003 | Brook | G11B 27/11 345/473 |
| 2004/0158555 A1 | 8/2004 | Seedman et al. | |
| 2006/0020904 A1 | 1/2006 | Aaltonen et al. | |
| 2006/0059535 A1 | 3/2006 | D'Avello | |
| 2006/0197753 A1 | 9/2006 | Hotelling | |
| 2007/0150830 A1 | 6/2007 | Ording et al. | |
| 2007/0233377 A1 | 10/2007 | Salay et al. | |
| 2008/0016446 A1 | 1/2008 | Aonuma et al. | |
| 2008/0062137 A1 | 3/2008 | Brodersen et al. | |
| 2008/0062141 A1 | 3/2008 | Chandhri | |
| 2008/0165147 A1 | 7/2008 | Christie et al. | |
| 2008/0189318 A1* | 8/2008 | Bourke | G06F 17/30053 |
| 2008/0222546 A1* | 9/2008 | Mudd | G06F 17/30749 715/765 |
| 2009/0100494 A1* | 4/2009 | Teal | H04M 1/72522 725/134 |
| 2009/0172532 A1 | 7/2009 | Chaudhri | |
| 2011/0004330 A1* | 1/2011 | Rothkopf | G11B 27/105 700/94 |
| 2011/0234480 A1* | 9/2011 | Fino | G11B 27/005 345/156 |
| 2012/0290933 A1 | 11/2012 | Rajaraman et al. | |
| 2012/0311444 A1 | 12/2012 | Chaudhri | |
| 2013/0135221 A1 | 5/2013 | Ainslie et al. | |
| 2013/0321340 A1 | 12/2013 | Seo et al. | |
| 2013/0346859 A1 | 12/2013 | Bates et al. | |
| 2013/0346867 A1 | 12/2013 | Woods et al. | |
| 2014/0089802 A1 | 3/2014 | Wang | |
| 2014/0108929 A1 | 4/2014 | Garmark et al. | |
| 2014/0123006 A1 | 5/2014 | Chen et al. | |
| 2014/0143725 A1 | 5/2014 | Lee | |
| 2014/0160078 A1 | 6/2014 | Seo et al. | |
| 2014/0178047 A1 | 6/2014 | Apodaca et al. | |
| 2014/0310316 A1 | 10/2014 | Coburn, IV et al. | |
| 2014/0331133 A1 | 11/2014 | Coburn, IV et al. | |
| 2014/0368734 A1 | 12/2014 | Hoffert et al. | |
| 2015/0067513 A1 | 3/2015 | Zambetti et al. | |
| 2015/0370426 A1* | 12/2015 | Carrigan | G06F 3/0482 345/173 |
| 2018/0067617 A1* | 3/2018 | Carrigan | G06F 3/04812 |

FOREIGN PATENT DOCUMENTS

| | | |
|---|---|---|
| JP | 2002-342033 A | 11/2002 |
| JP | 2008-018189 A | 1/2008 |
| JP | 2009-500761 A | 1/2009 |
| JP | 2009-532806 A | 9/2009 |
| WO | WO-2015/200371 A1 | 12/2015 |
| WO | WO-2017/044320 A1 | 3/2017 |

OTHER PUBLICATIONS

Grey, M. (Jun. 11, 2013). "Comcast's new X2 platform moves your DVR recordings from the box to the cloud," engadget, located at: http://www.engadget.com/2013/06/11/comcast-x2-platform/, retrieved on Feb. 24, 2014, one page.
International Search Report dated Oct. 14, 2015, for PCT Application No. PCT/US2015/037260, filed Jun. 23, 2015, four pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI ' 92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Danish Search Report dated Oct. 18, 2016, for Patent Application No. 2016 70623, four pages.
International Search Report dated Nov. 4, 2016, for PCT Application No. PCT/US2016/048731, filed Aug. 25, 2016, seven pages.
Non-Final Office Action dated Feb. 8, 2017, for U.S. Appl. No. 14/748,067, filed Jun. 23, 2015, eight pages.
Non-Final Office Action dated Jan. 25, 2018, for U.S. Appl. No. 15/808,774, filed Nov. 9, 2017, six pages.
Notice of Allowance dated Aug. 10, 2017, for U.S. Appl. No. 14/748,067, filed Jun. 23, 2015, five pages.

* cited by examiner

USER INTERFACES FOR NAVIGATING AND PLAYING CONTENT

CROSS REFERENCE TO RELATED APPLICATIONS

This application claims benefit of U.S. Provisional Patent Application No. 62/215,567, filed Sep. 8, 2015, which is hereby incorporated by reference in its entirety.

FIELD OF THE DISCLOSURE

This relates generally to electronic devices that allow for navigating and playing content, and user interactions with such devices.

BACKGROUND OF THE DISCLOSURE

User interaction with electronic devices has increased significantly in recent years. These devices can be devices such as computers, tablet computers, televisions, multimedia devices, mobile devices, and the like.

In some circumstances, such a device has access to content (e.g., music, movies, etc.), and user interaction with such a device entails navigation and playing of the content. Enhancing these interactions improves the user's experience with the device and decreases user interaction time, which is particularly important where input devices are battery-operated.

SUMMARY OF THE DISCLOSURE

The embodiments described in this disclosure are directed to one or more electronic devices that allow users to navigate and play content items available on the electronic devices, and one or more operations related to the above that the electronic devices optionally perform. The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1A:
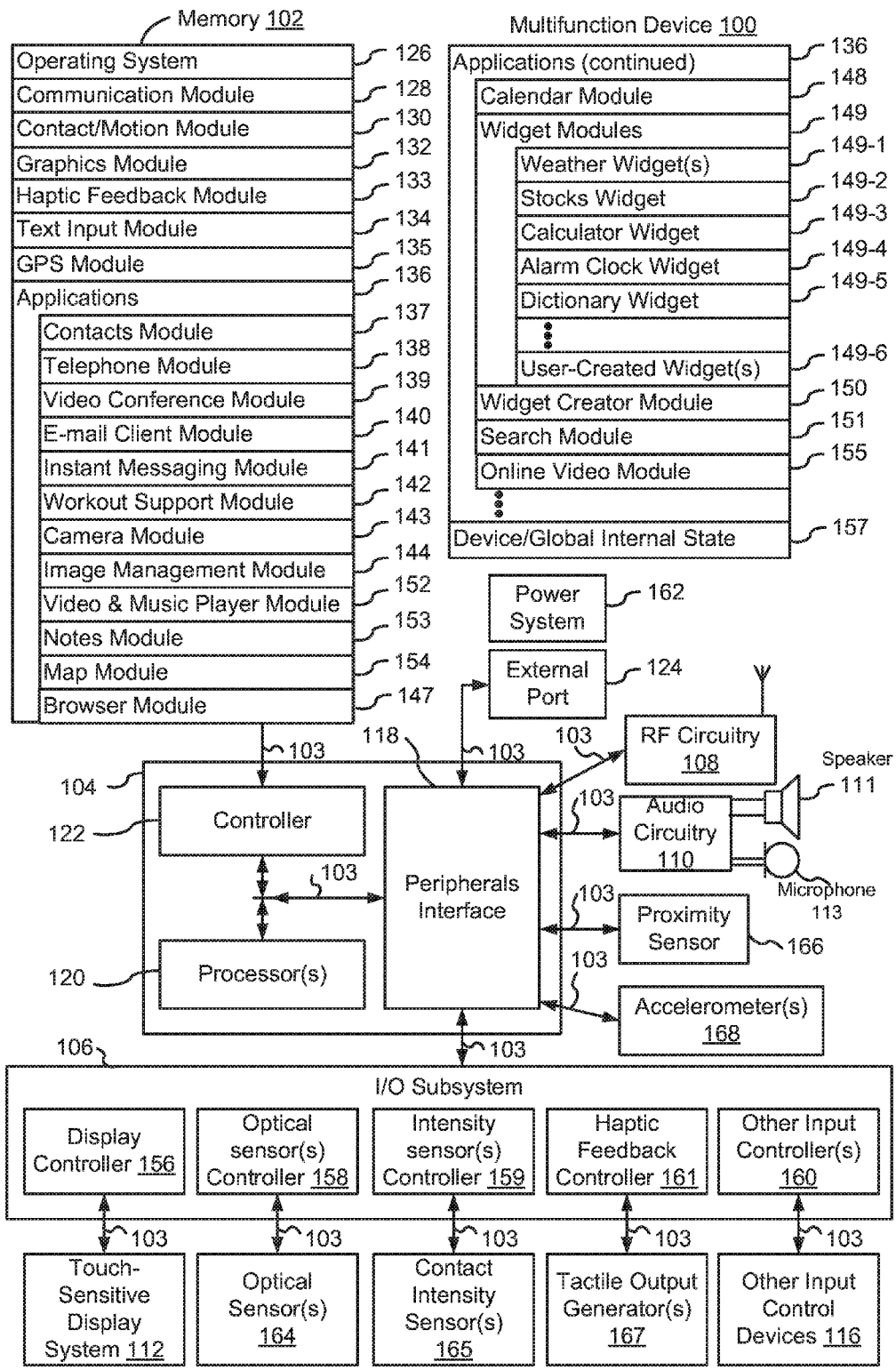
FIG. 1A is a block diagram illustrating a multifunction device with a touch-sensitive display in accordance with some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments.

Exemplary Devices

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/ to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112.

In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
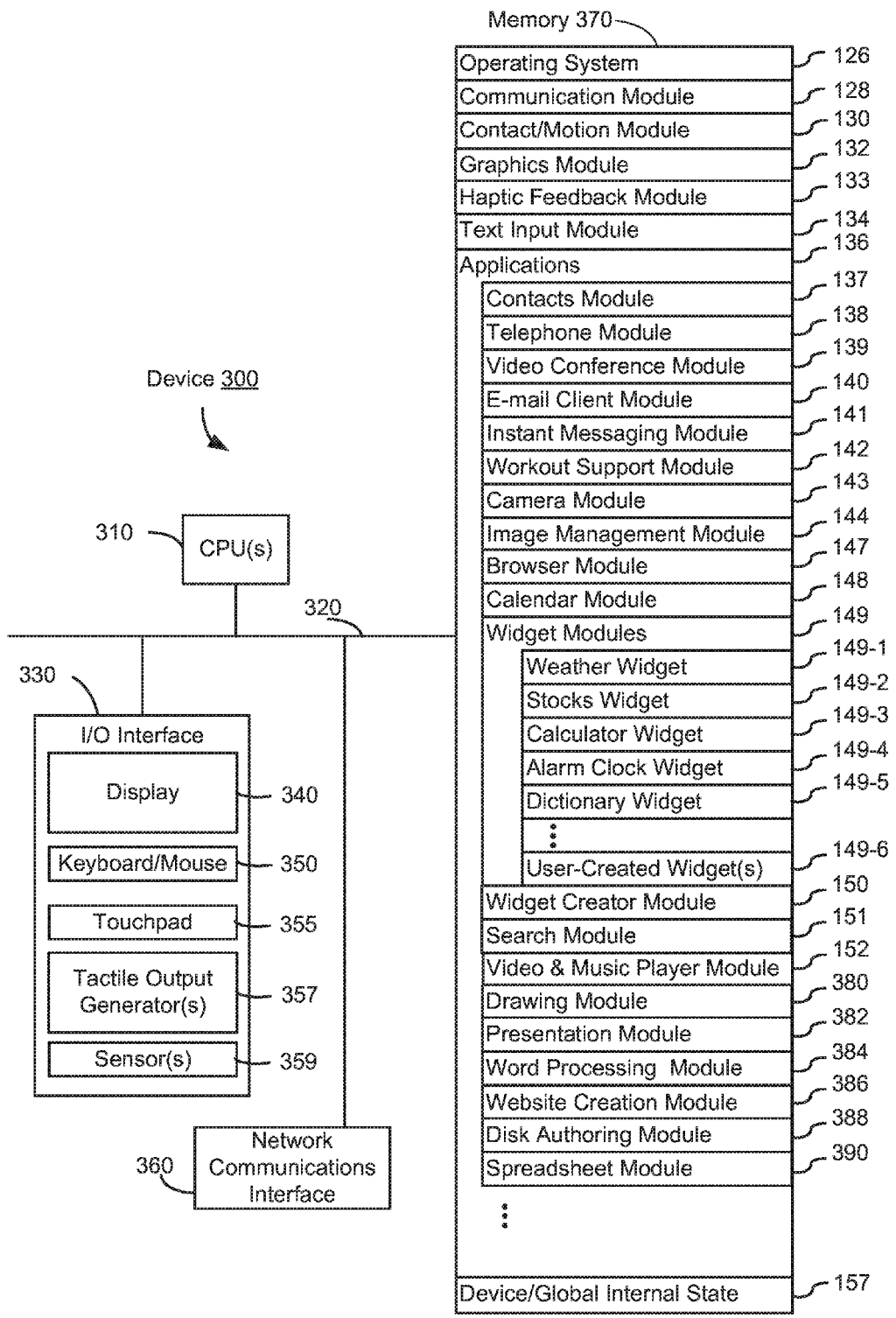
FIG. 3 is a block diagram of an exemplary multifunction device with a display and a touch-sensitive surface in accordance with some embodiments of the disclosure.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns and intensities. Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
   contacts module 137 (sometimes called an address book or contact list);
   telephone module 138;
   video conferencing module 139;
   e-mail client module 140;
   instant messaging (IM) module 141;
   workout support module 142;
   camera module 143 for still and/or video images;
   image management module 144;
   browser module 147;

calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154;
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad (whether included in device 100 or on a separate device, such as an input device). By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In some embodiments, a "menu button" is implemented using a touchpad. In some other embodiments, the menu button is a physical push button or other physical input control device instead of a touchpad.

Figure 1B:
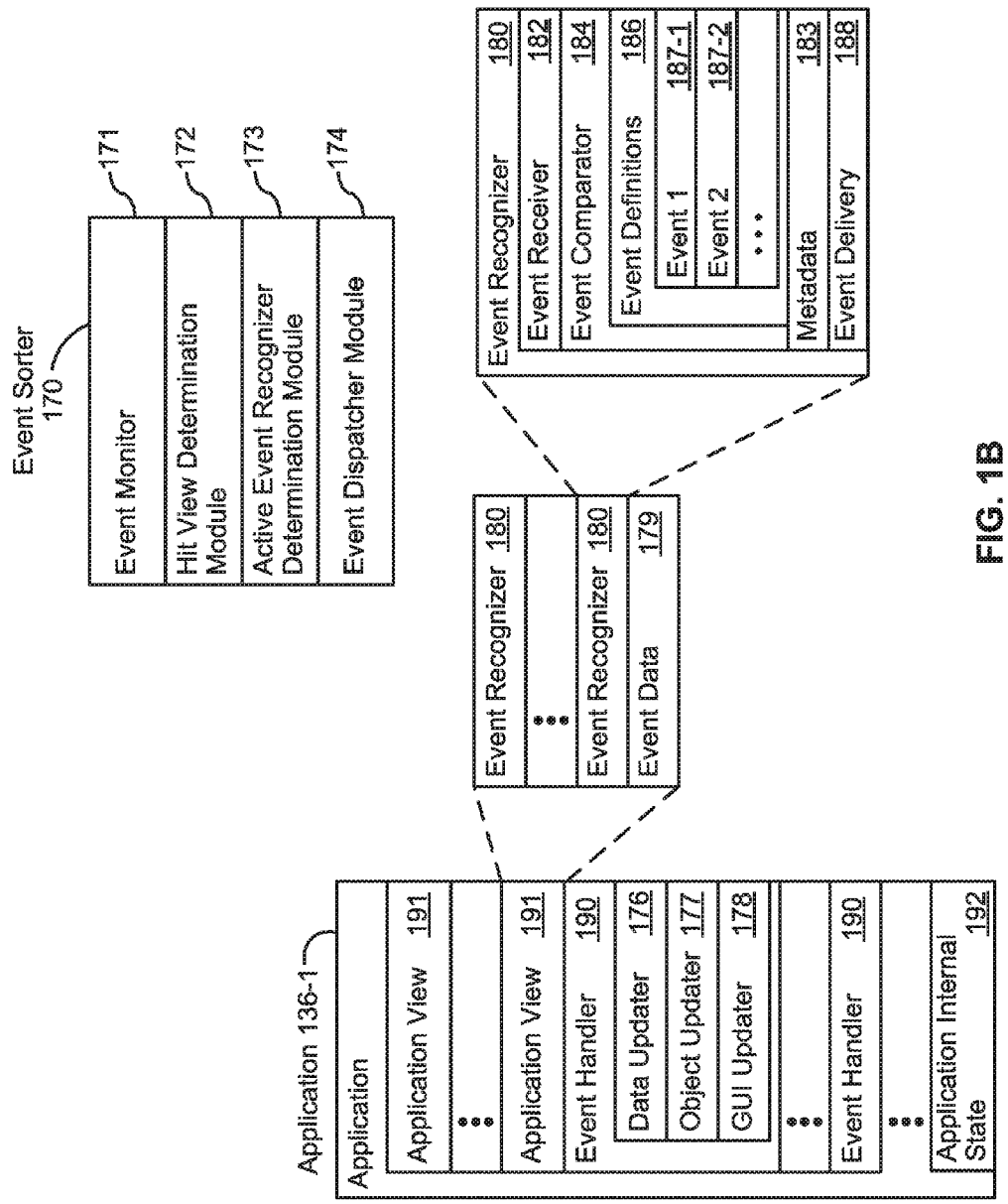
FIG. 1B is a block diagram illustrating exemplary components for event handling in accordance with some embodiments of the disclosure.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object.

In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays and/or touchpads also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
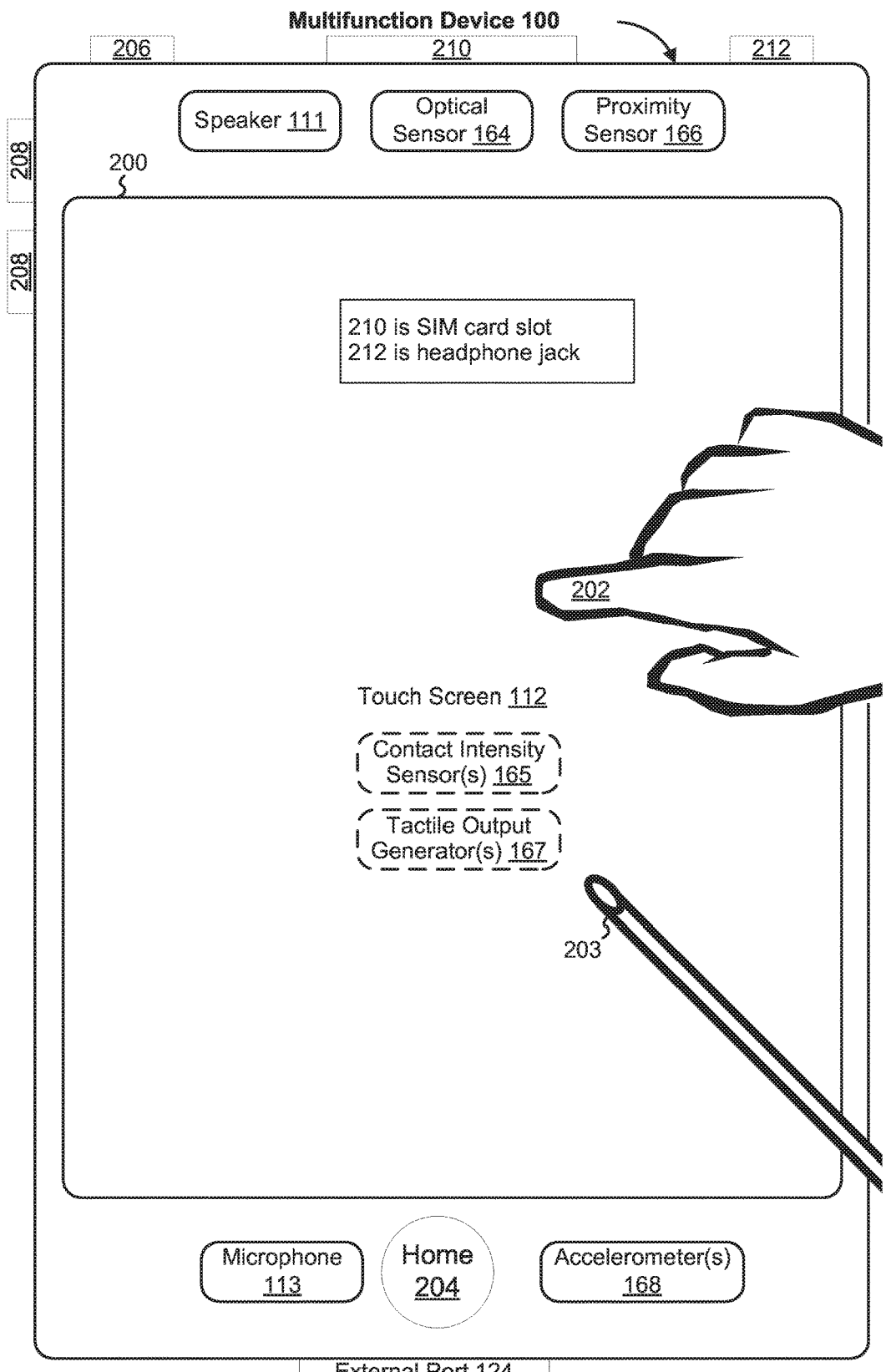
FIG. 2 illustrates a multifunction device having a touch screen in accordance with some embodiments of the disclosure.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As previously described, menu button 204 is, optionally, used to navigate to any application 136 in a set of applications that are, optionally, executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 4:
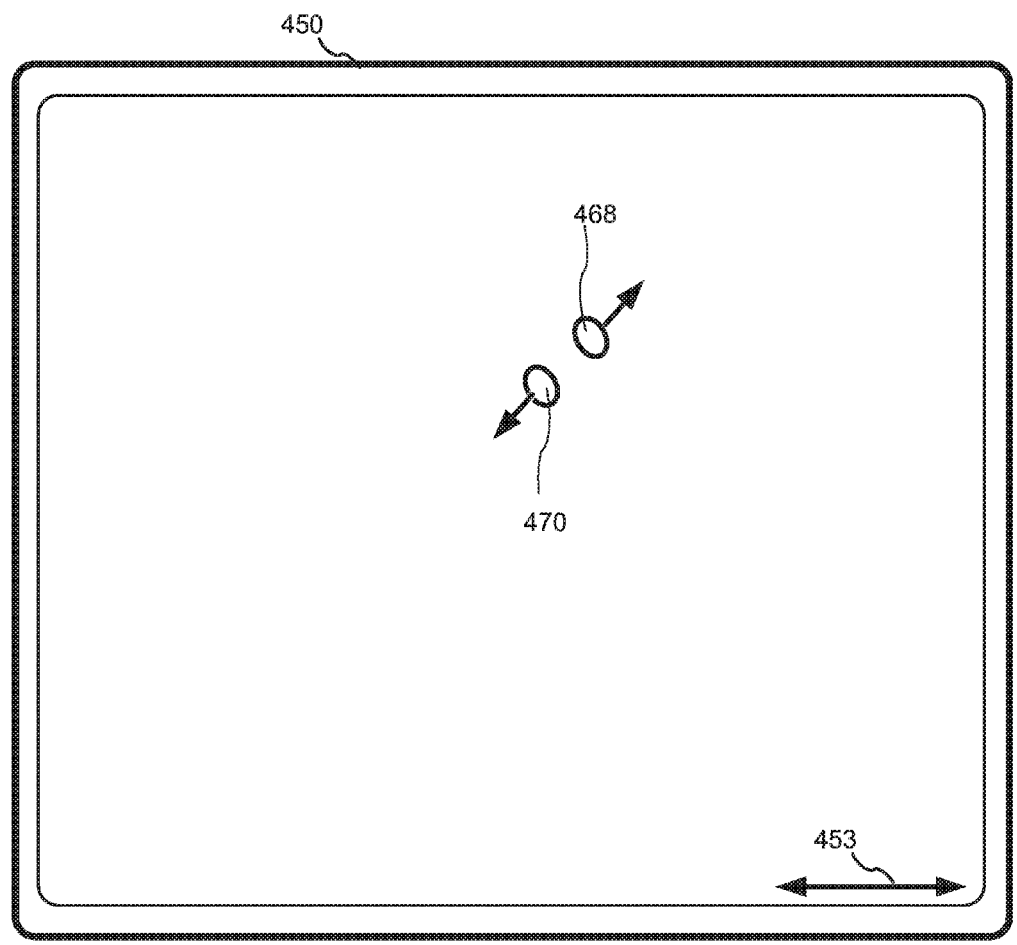
FIG. 4 illustrates an exemplary user interface for a multifunction device with a touch-sensitive surface that is separate from the display in accordance with some embodiments of the disclosure.
Figure 4:
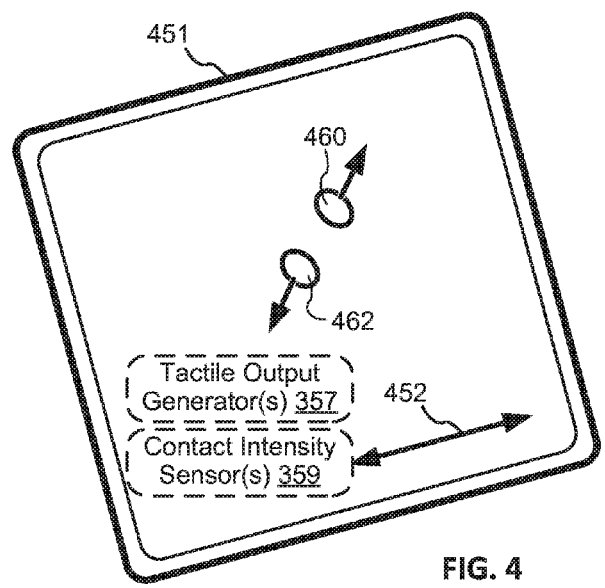

FIG. 4 illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4. In some embodiments the touch sensitive surface (e.g., 451 in FIG. 4) has a primary axis (e.g., 452 in FIG. 4) that corresponds to a primary axis (e.g., 453 in FIG. 4) on the display (e.g., 450). In accordance with these embodiments, the device detects contacts (e.g., 460 and 462 in FIG. 4) with the touch-sensitive surface 451 at locations that correspond to respective locations on the display (e.g., in FIG. 4, 460 corresponds to 468 and 462 corresponds to 470). In this way, user inputs (e.g., contacts 460 and 462, and movements thereof) detected by the device on the touch-sensitive surface (e.g., 451 in FIG. 4) are used by the device to manipulate the user interface on the display (e.g., 450 in FIG. 4) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5A:
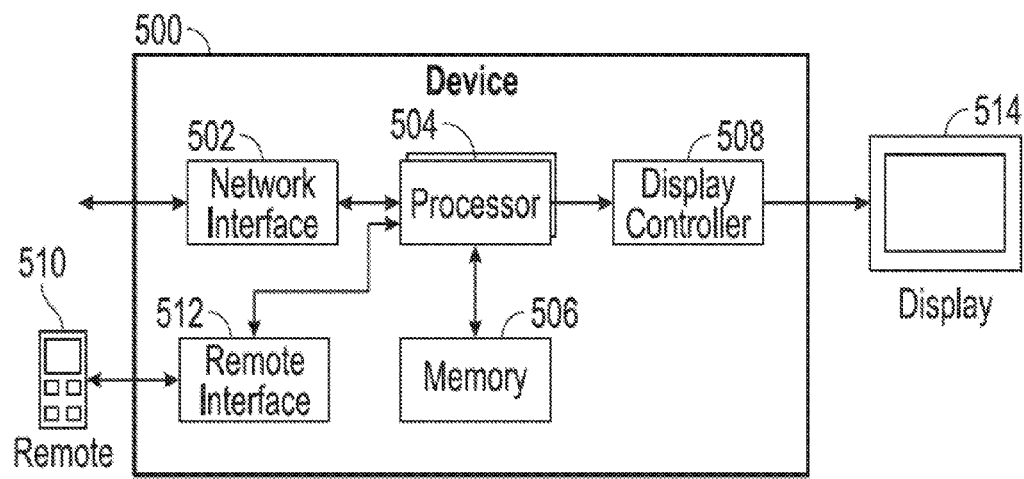
FIGS. 5A-5B illustrate block diagrams of exemplary architectures for devices according to some embodiments of the disclosure.

FIG. 5A illustrates a block diagram of an exemplary architecture for the device 500 according to some embodiments of the disclosure. In the embodiment of FIG. 5A, media content is optionally received by device 500 via network interface 502, which is optionally a wireless or wired connection. The one or more processors 504 optionally execute any number of programs stored in memory 506 or storage, which optionally includes instructions to perform one or more of the methods and/or processes described herein (e.g., method 700).

In some embodiments, display controller 508 causes the various user interfaces of the disclosure to be displayed on display 514. Further, input to device 500 is optionally provided by remote 510 via remote interface 512, which is optionally a wireless or a wired connection. It is understood that the embodiment of FIG. 5A is not meant to limit the features of the device of the disclosure, and that other components to facilitate other features described in the disclosure are optionally included in the architecture of FIG. 5A as well. In some embodiments, device 500 optionally corresponds to one or more of multifunction device 100 in FIGS. 1A and 2 and device 300 in FIG. 3; network interface 502 optionally corresponds to one or more of RF circuitry 108, external port 124, and peripherals interface 118 in FIGS. 1A and 2, and network communications interface 360 in FIG. 3; processor 504 optionally corresponds to one or more of processor(s) 120 in FIG. 1A and CPU(s) 310 in FIG. 3; display controller 508 optionally corresponds to one or more of display controller 156 in FIG. 1A and I/O interface 330 in FIG. 3; memory 506 optionally corresponds to one or more of memory 102 in FIG. 1A and memory 370 in FIG. 3; remote interface 512 optionally corresponds to one or more of peripherals interface 118, and I/O subsystem 106 (and/or its components) in FIG. 1A, and I/O interface 330 in FIG. 3; remote 512 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4; and, display 514 optionally corresponds to one or more of touch-sensitive display system 112 in FIGS. 1A and 2, and display 340 in FIG. 3.

Figure 5B:
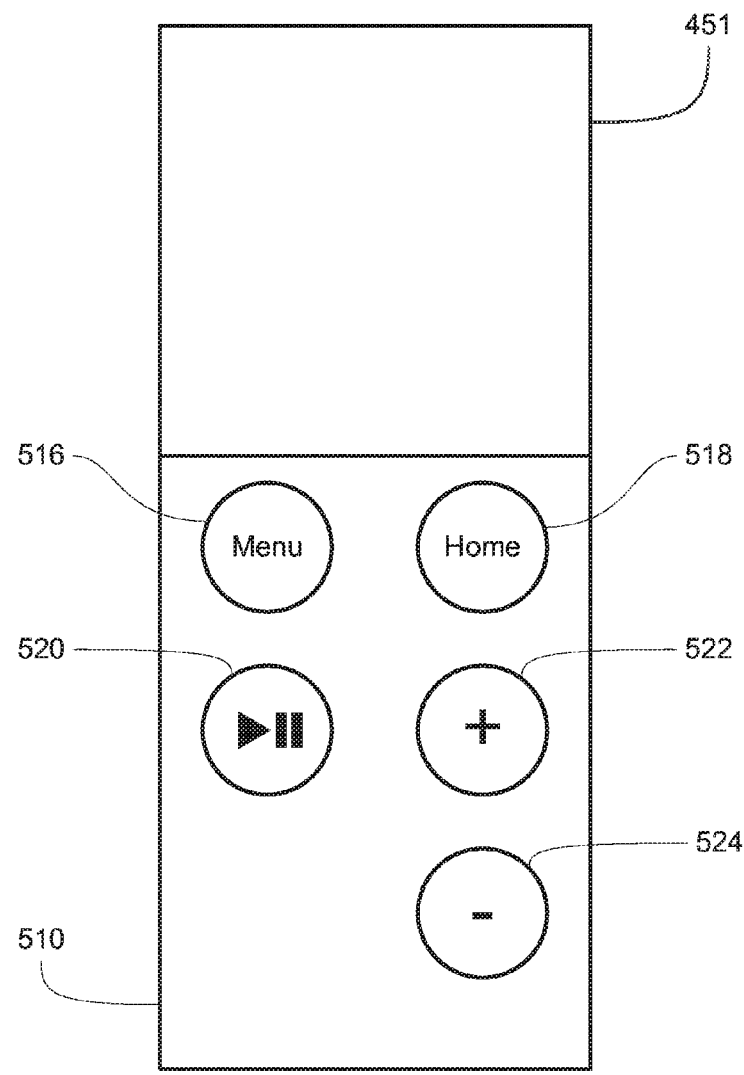

FIG. 5B illustrates an exemplary structure for remote 510 according to some embodiments of the disclosure. Remote 510 optionally includes touch-sensitive surface 451. In some embodiments, touch-sensitive surface 451 is edge-to-edge (e.g., it extends to the edges of remote 510, such that little or no surface of remote 510 exists between the touch-sensitive surface 451 and one or more edges of remote 510, as illustrated in FIG. 5B). Touch-sensitive surface 451 is optionally able to sense contacts as well as contact intensities (e.g., clicks of touch-sensitive surface 451), as previously described in this disclosure. Remote 510 also optionally includes buttons 516, 518, 520, 522 and 524. Buttons 516, 518, 520, 522 and 524 are optionally mechanical buttons or mechanical button alternatives that are able to sense contact with, or depression of, such buttons to initiate corresponding action(s) on, for example, device 500. In some embodiments, selection of "menu" button 516 by a user navigates device 500 backwards in a currently-executing application or currently-displayed user interface (e.g., back to a user interface that was displayed previous to the currently-displayed user interface), or navigates device 500 to a one-higher-level user interface than the currently-displayed user interface. In some embodiments, selection of "home" button 518 by a user navigates device 500 to a main, home, or root user interface from any user interface that is displayed on device 500 (e.g., to a home screen of device 500 that optionally includes one or more applications accessible on device 500). In some embodiments, selection of "play/pause" button 520 by a user toggles between playing and pausing a currently-playing content item on device 500 (e.g., if a content item is playing on device 500 when "play/pause" button 520 is selected, the content item is optionally paused, and if a content item is paused on device 500 when "play/pause" button 520 is selected, the content item is optionally played). In some embodiments, selection of "+" 522 or "−" 524 buttons by a user increases or decreases, respectively, the volume of audio reproduced by device 500 (e.g., the volume of a content item currently-playing on device 500). In addition or alternatively to the functionalities described above, touch-sensitive surface 451 and buttons 516, 518, 520, 522 and 524 are optionally utilized in the manners provided in the descriptions of embodiments set forth below.

User Interfaces and Associated Processes

Content Navigation and Playing

Users interact with electronic devices in many different manners, including interacting with content (e.g., music, movies, etc.) that may be available (e.g., stored or otherwise accessible) on the electronic devices. In some circumstances, the users desire to navigate through content available on the electronic devices, and/or play content available on the electronic devices. The embodiments described below provide ways in which electronic devices allow users to navigate and play content items available on the electronic devices, thereby enhancing users' interactions with the electronic devices. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 6A:
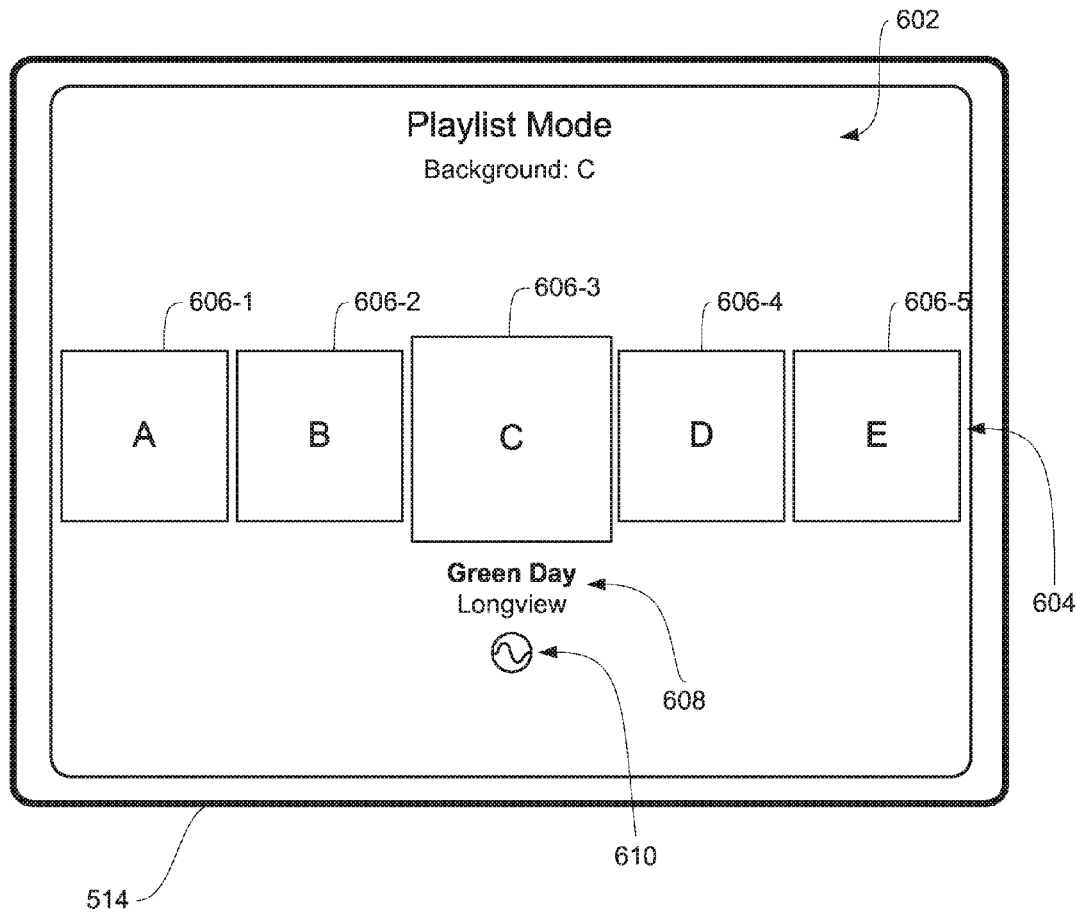
FIGS. 6A-6Z and 6AA-6CC illustrate exemplary ways in which electronic devices allow users to navigate and play content items available on the electronic devices in accordance with some embodiments of the disclosure.
Figure 6B:
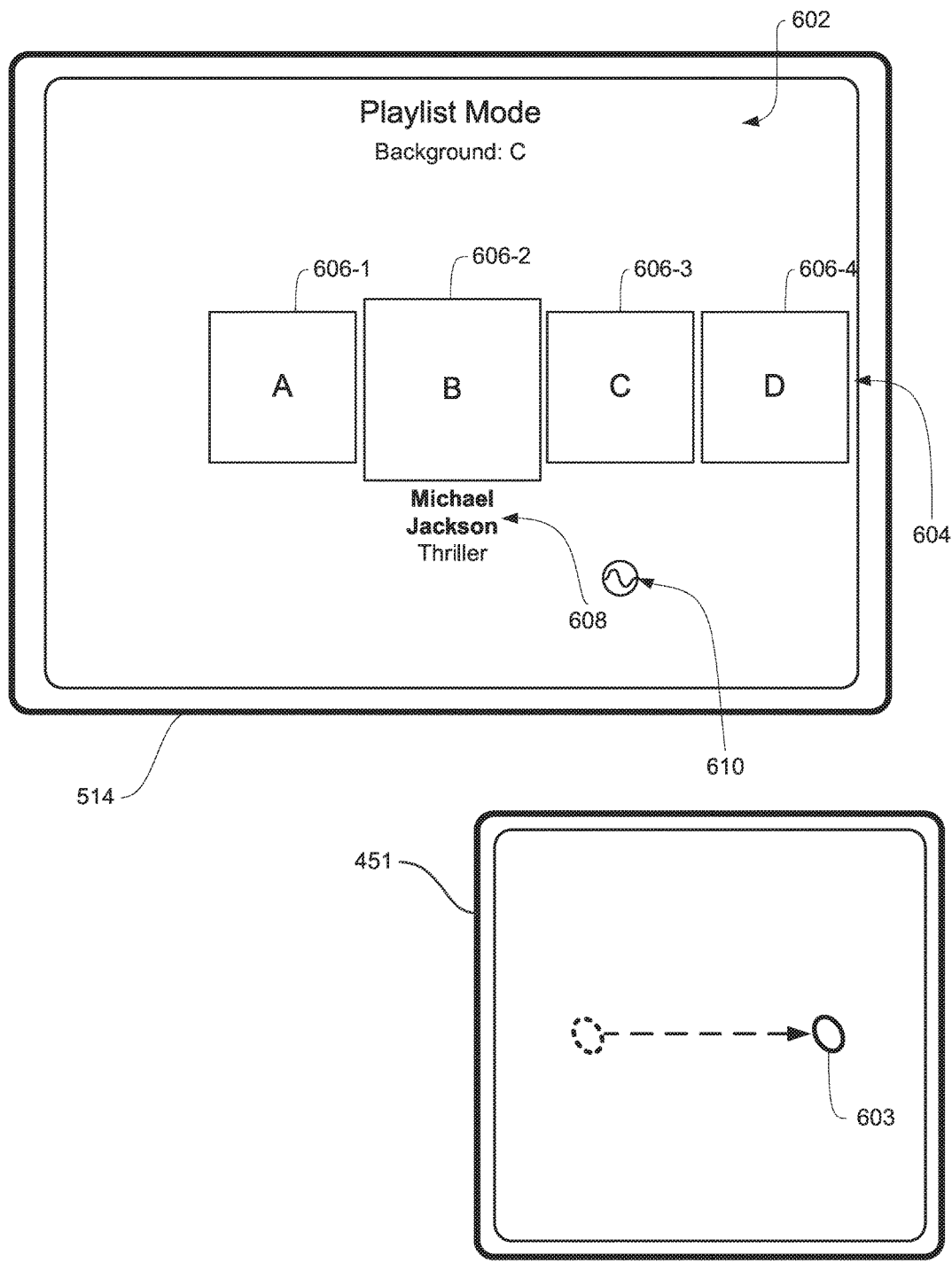
Figure 6C:
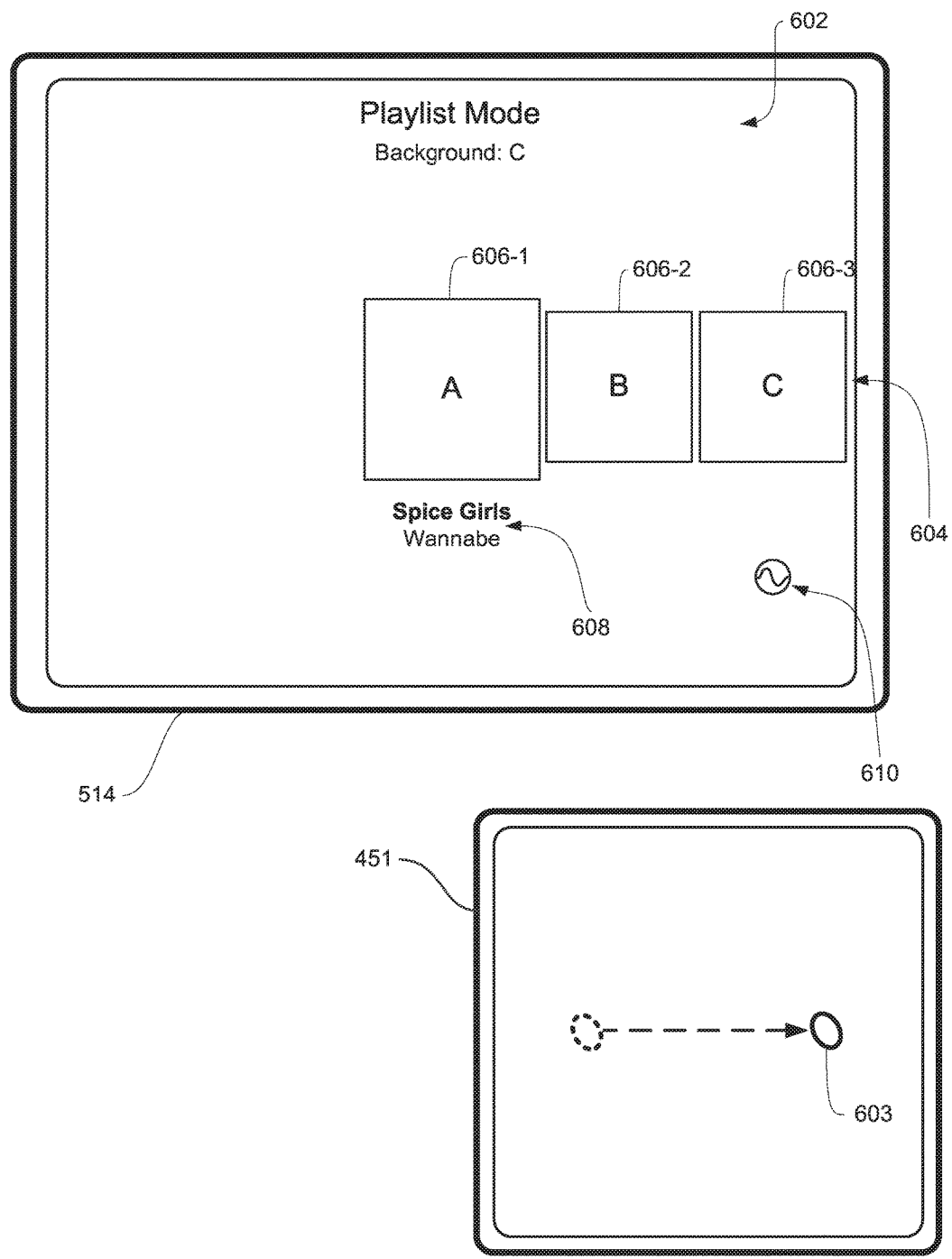
Figure 6D:
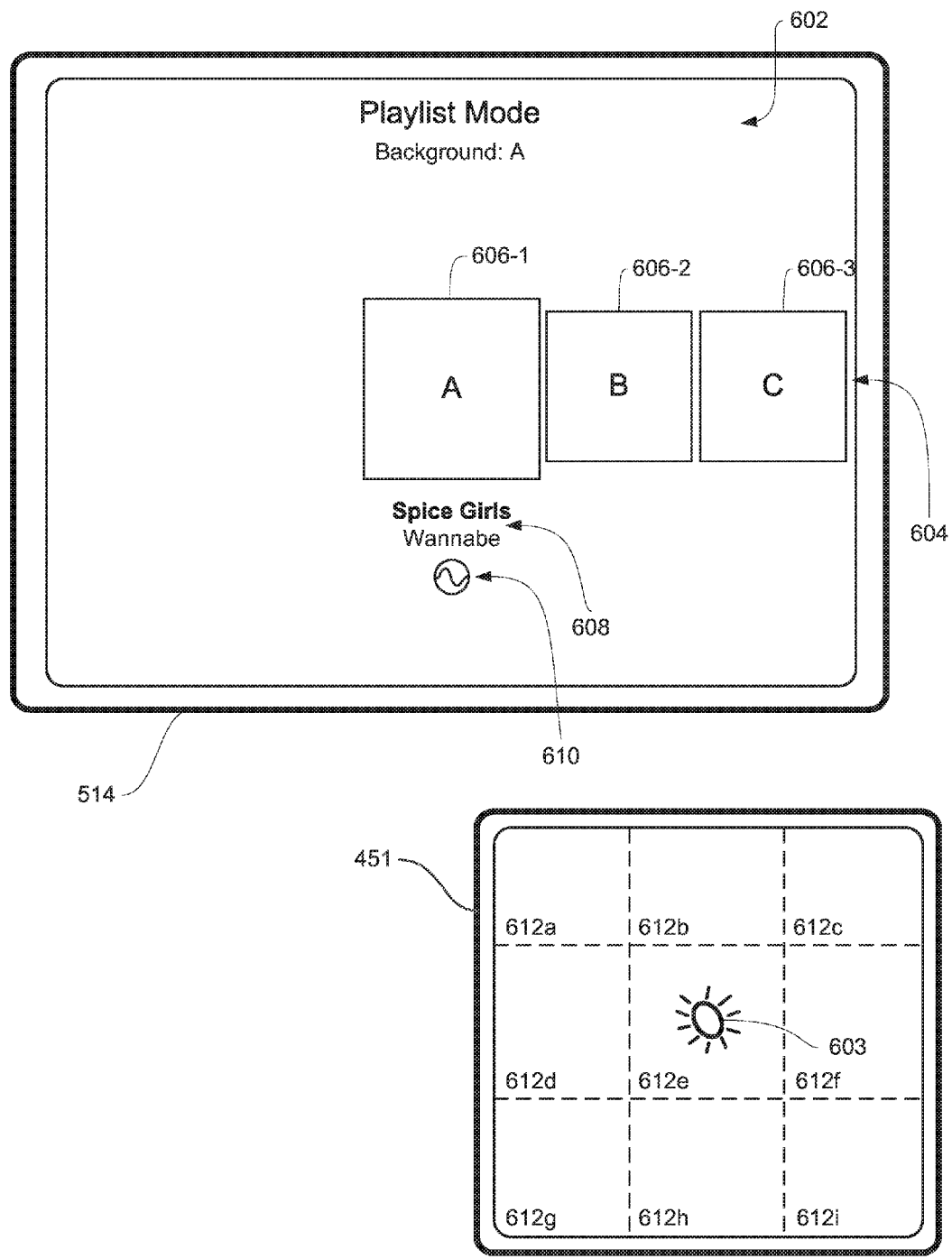
Figure 6E:
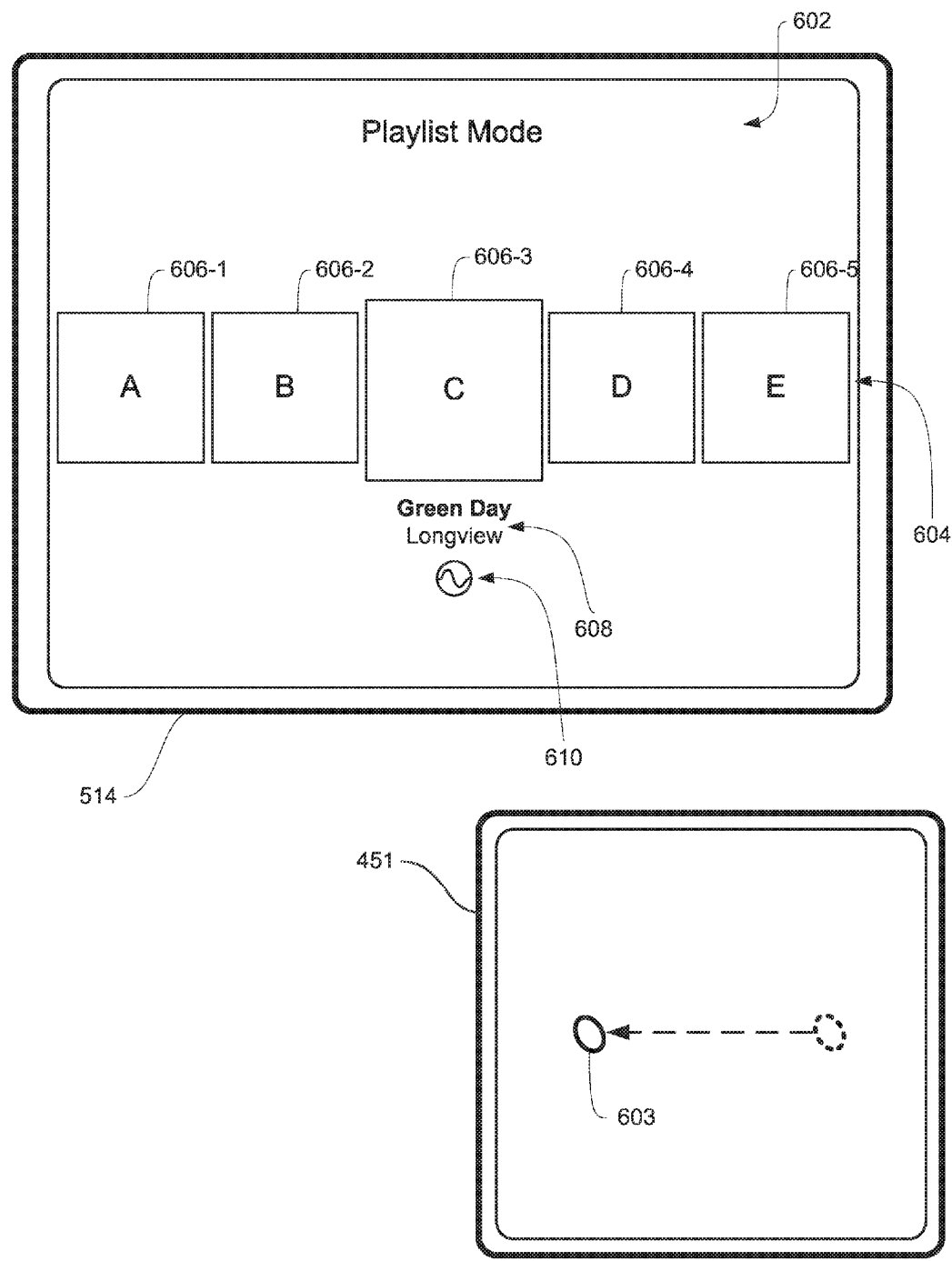
Figure 6F:
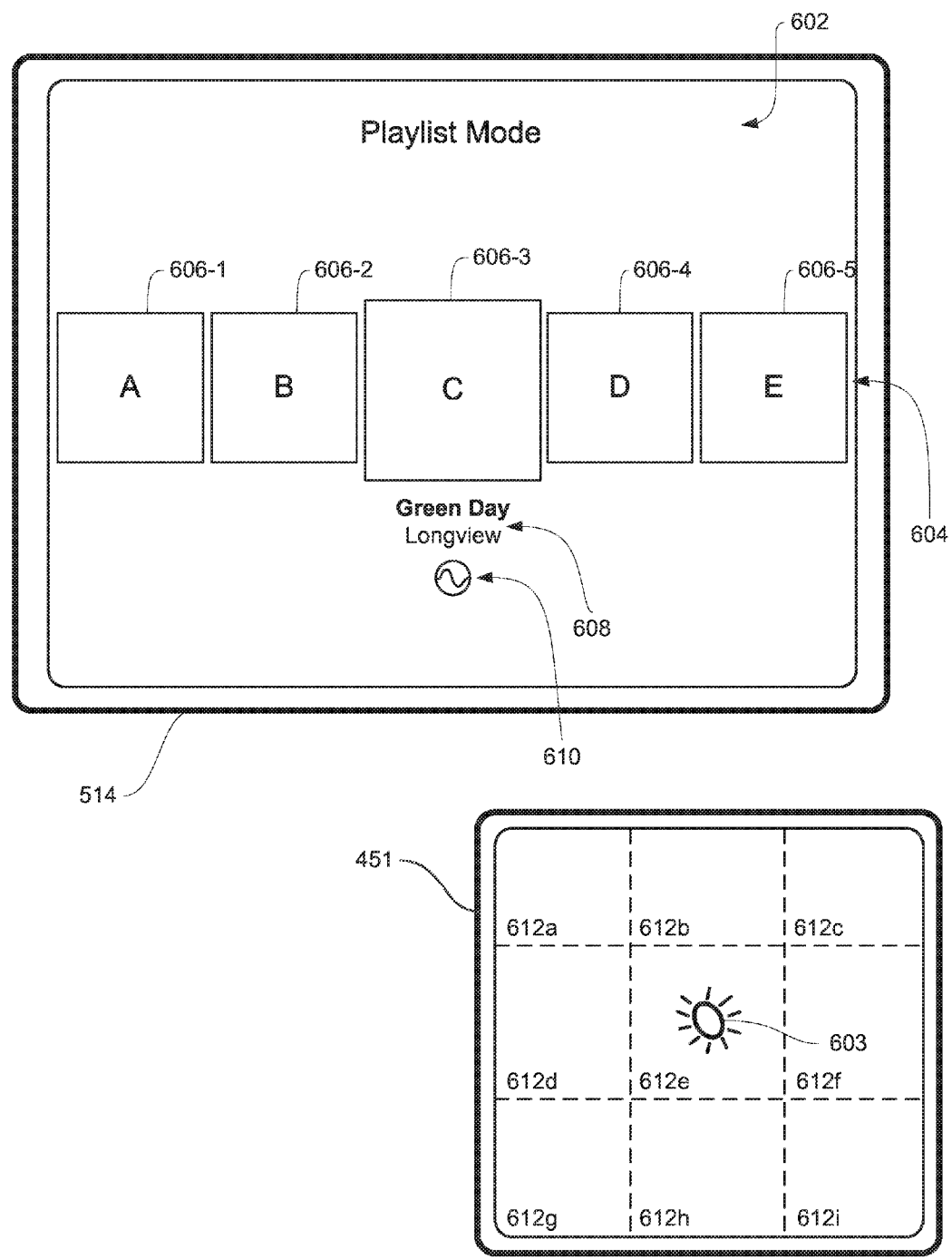
Figure 6G:
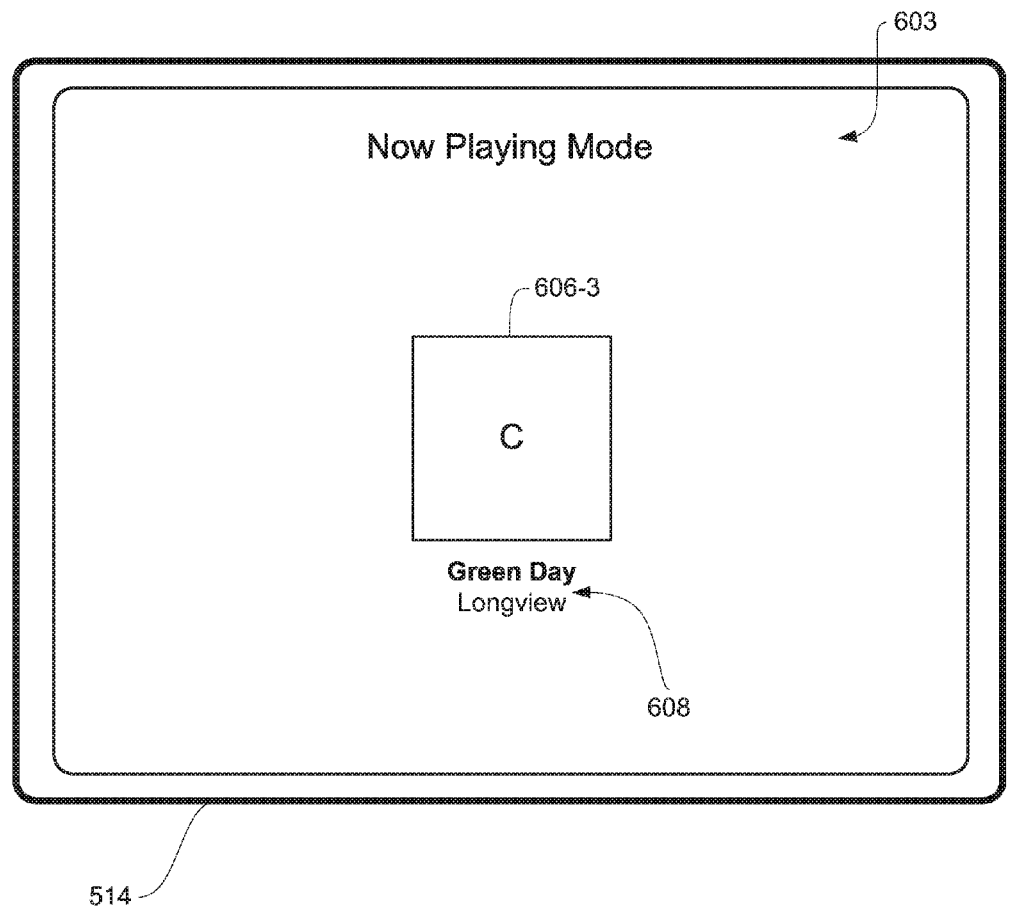
Figure 6H:
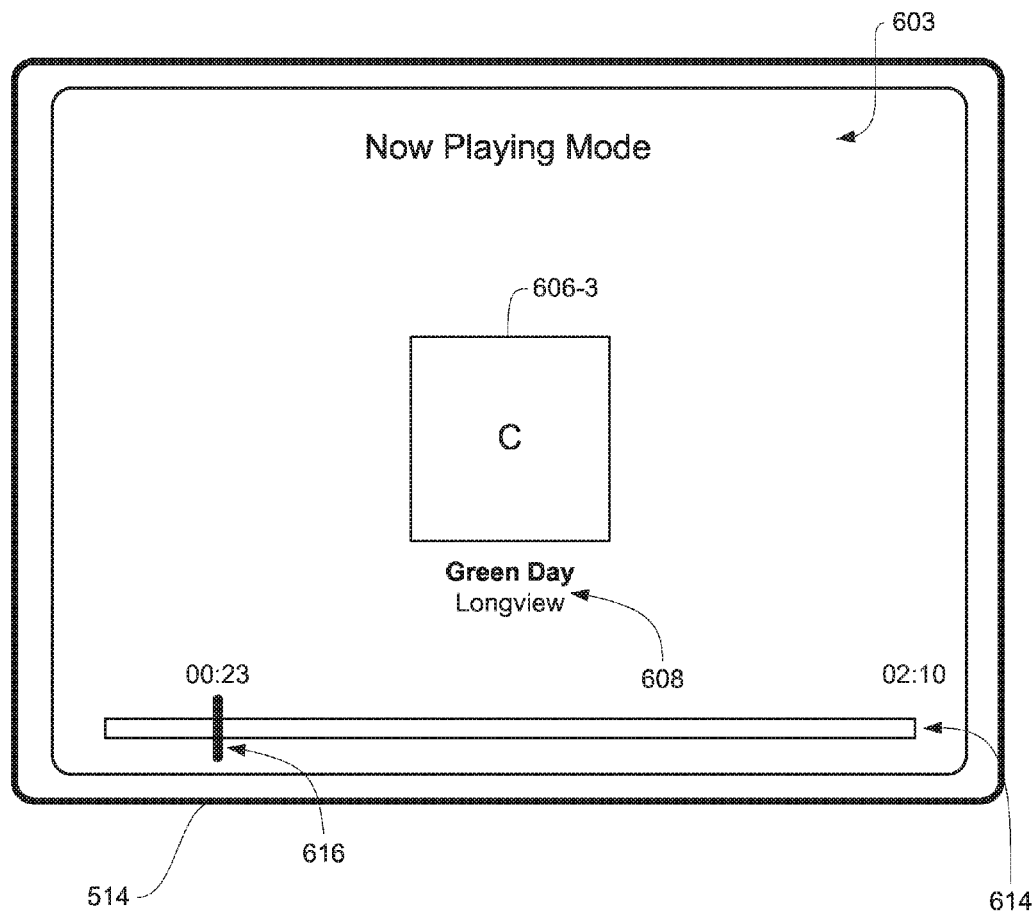
Figure 6I:
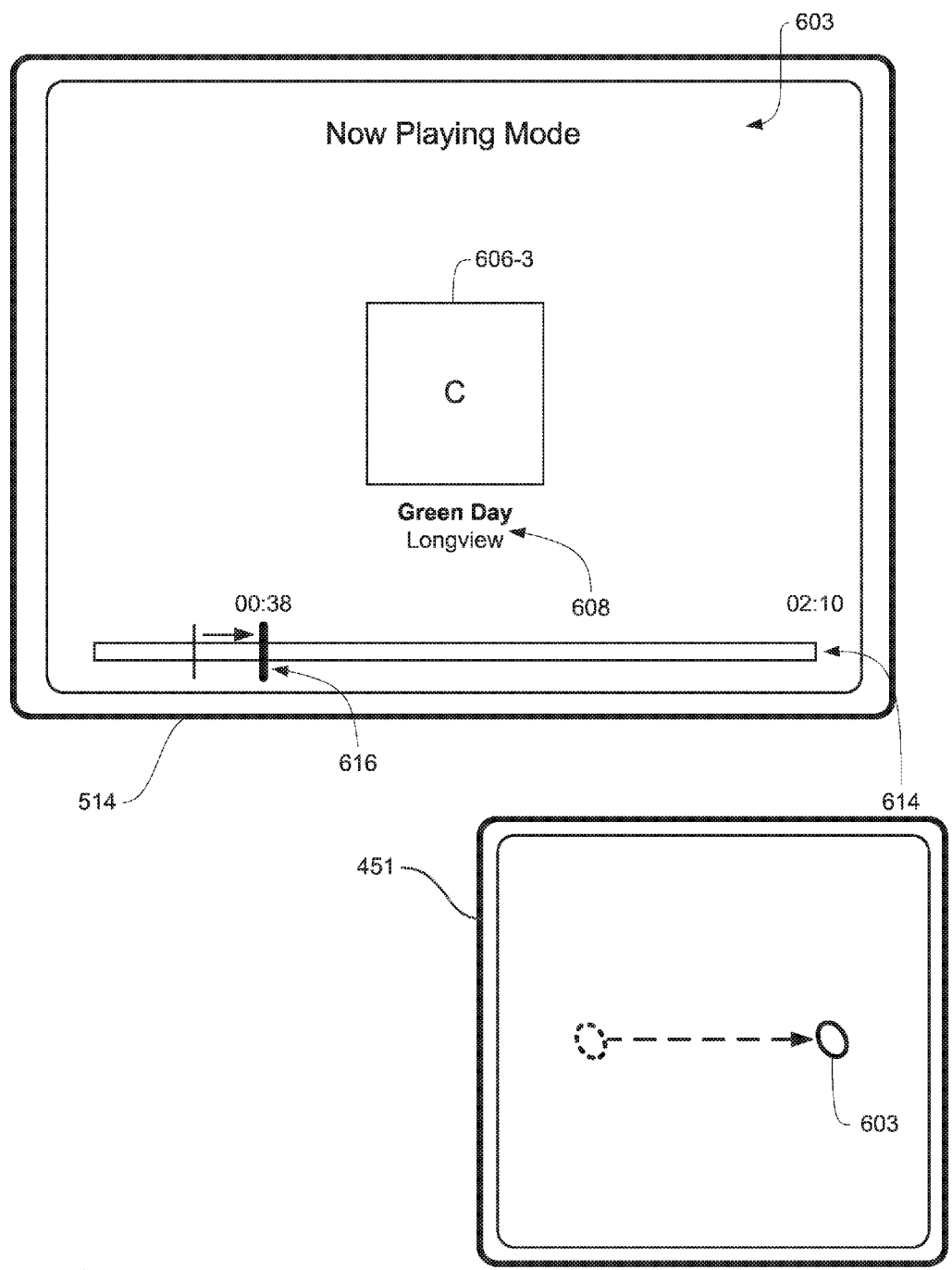
Figure 6J:
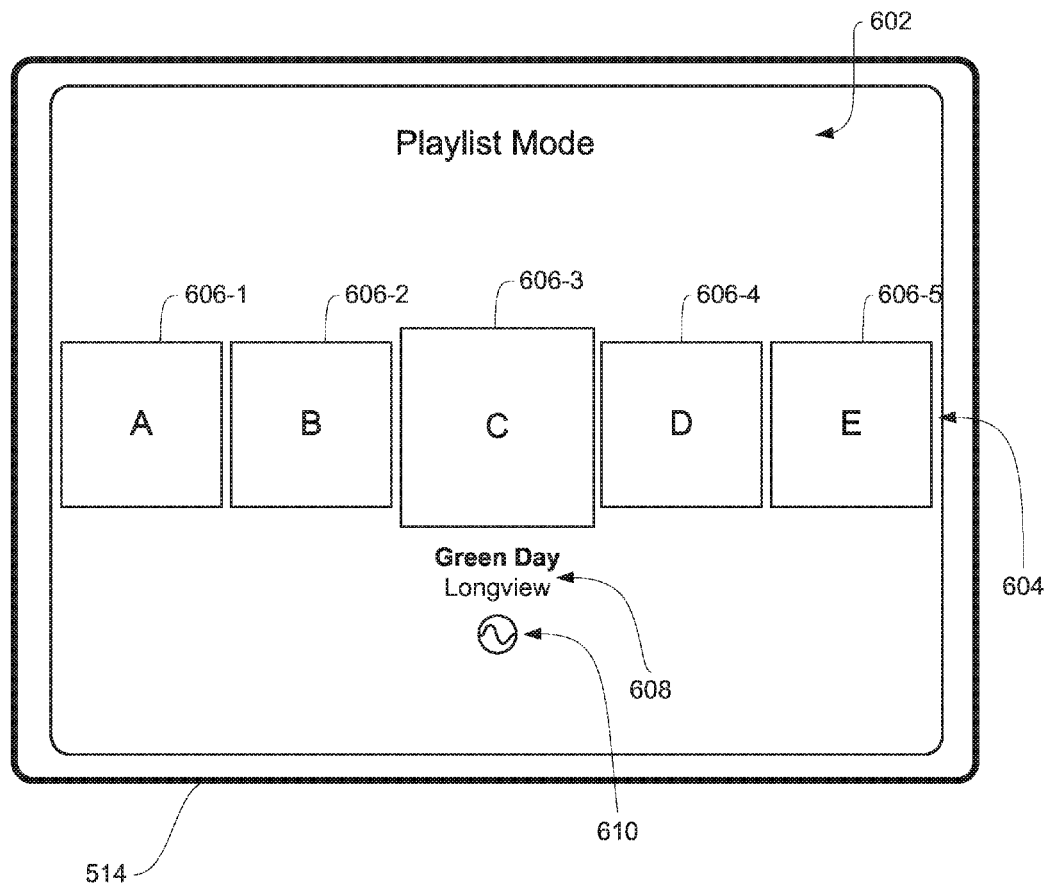
Figure 6K:
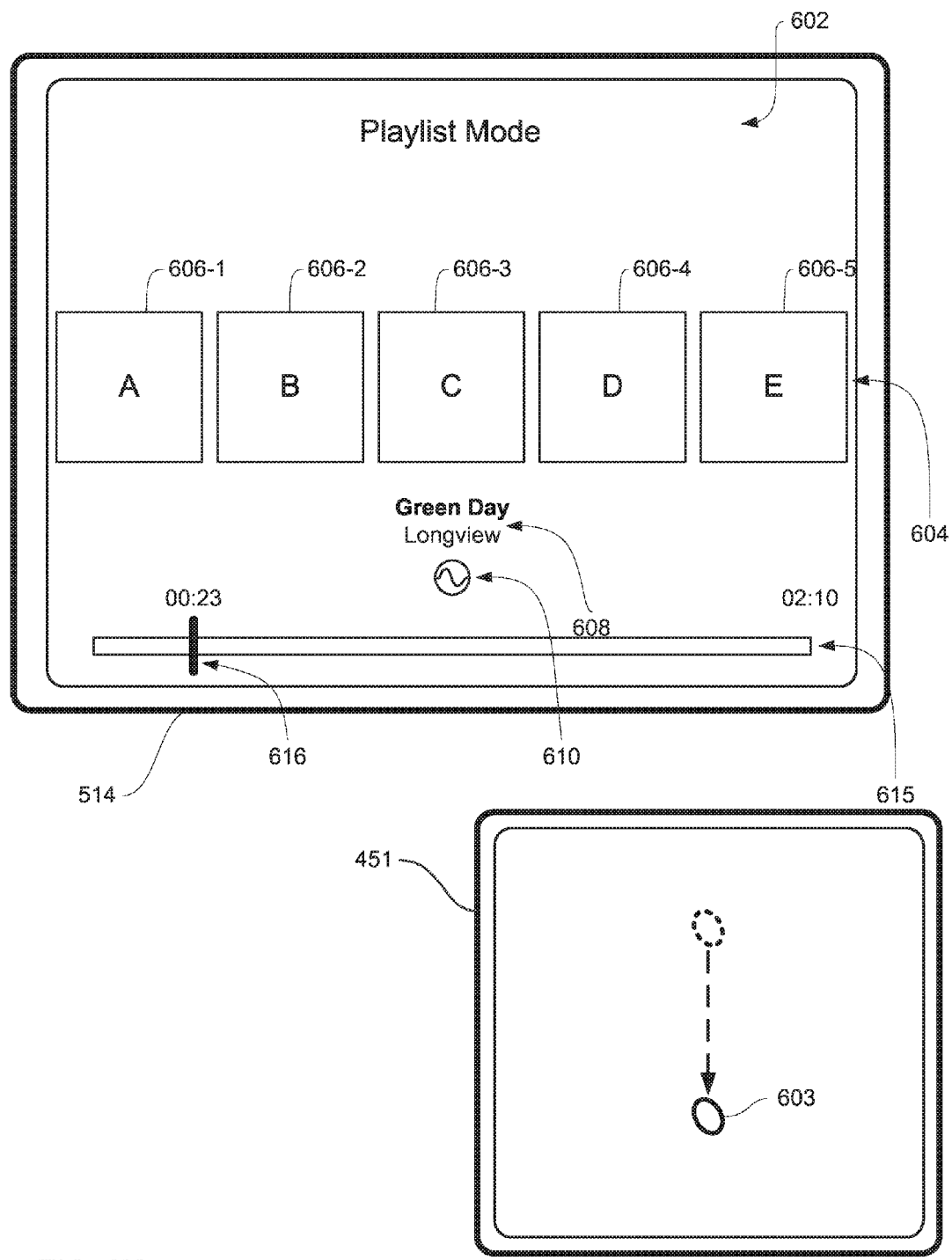
Figure 6L:
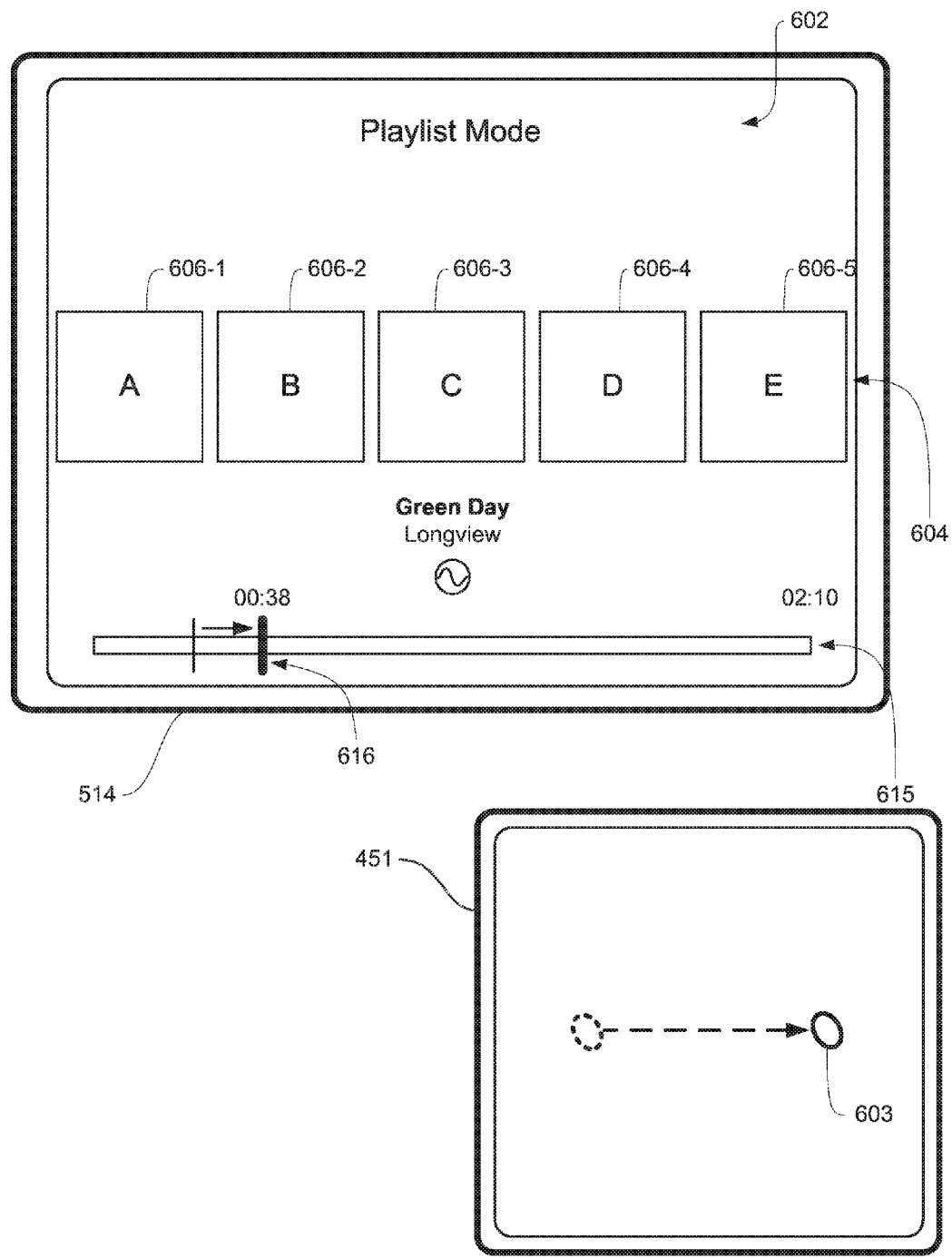
Figure 6M:
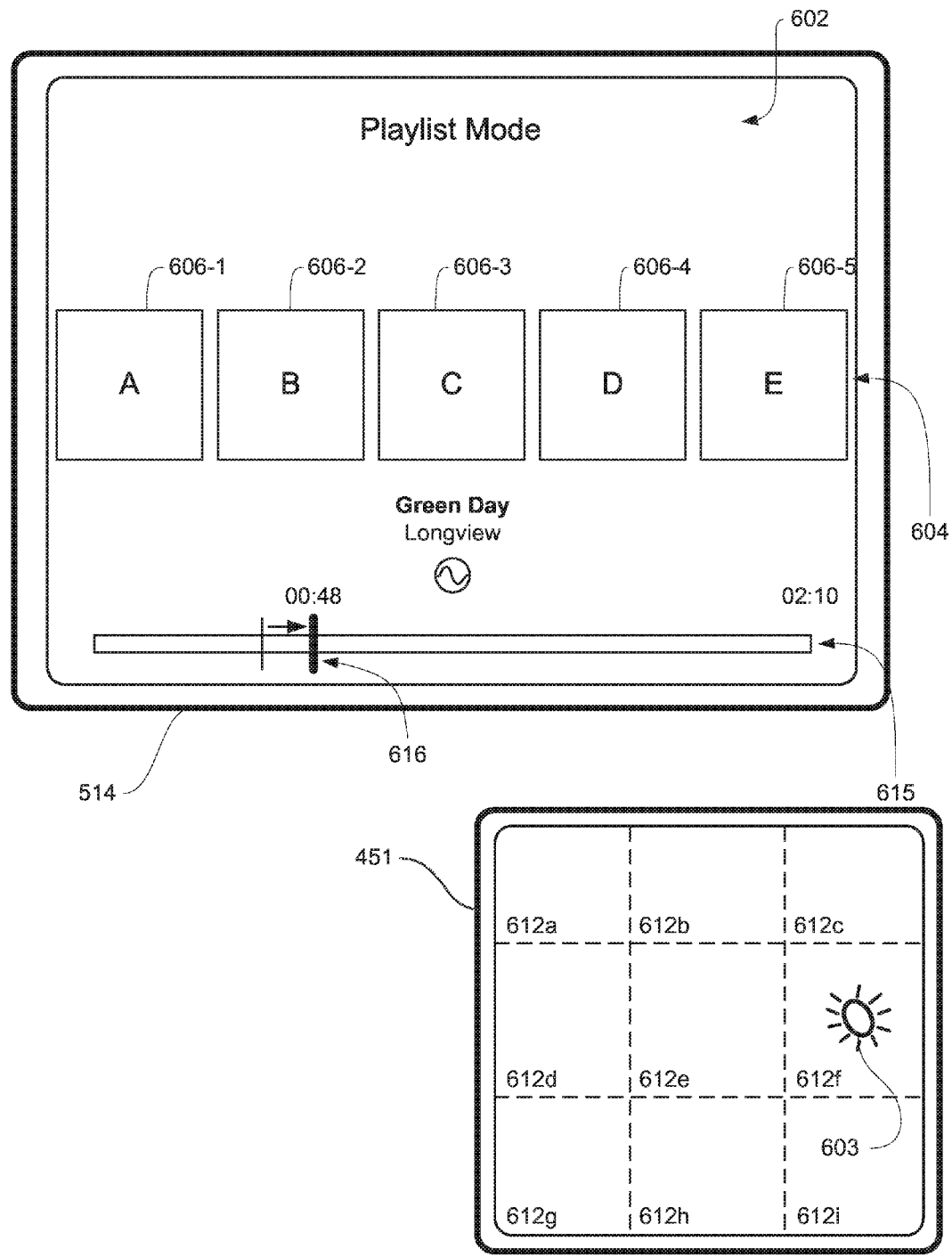
Figure 6N:
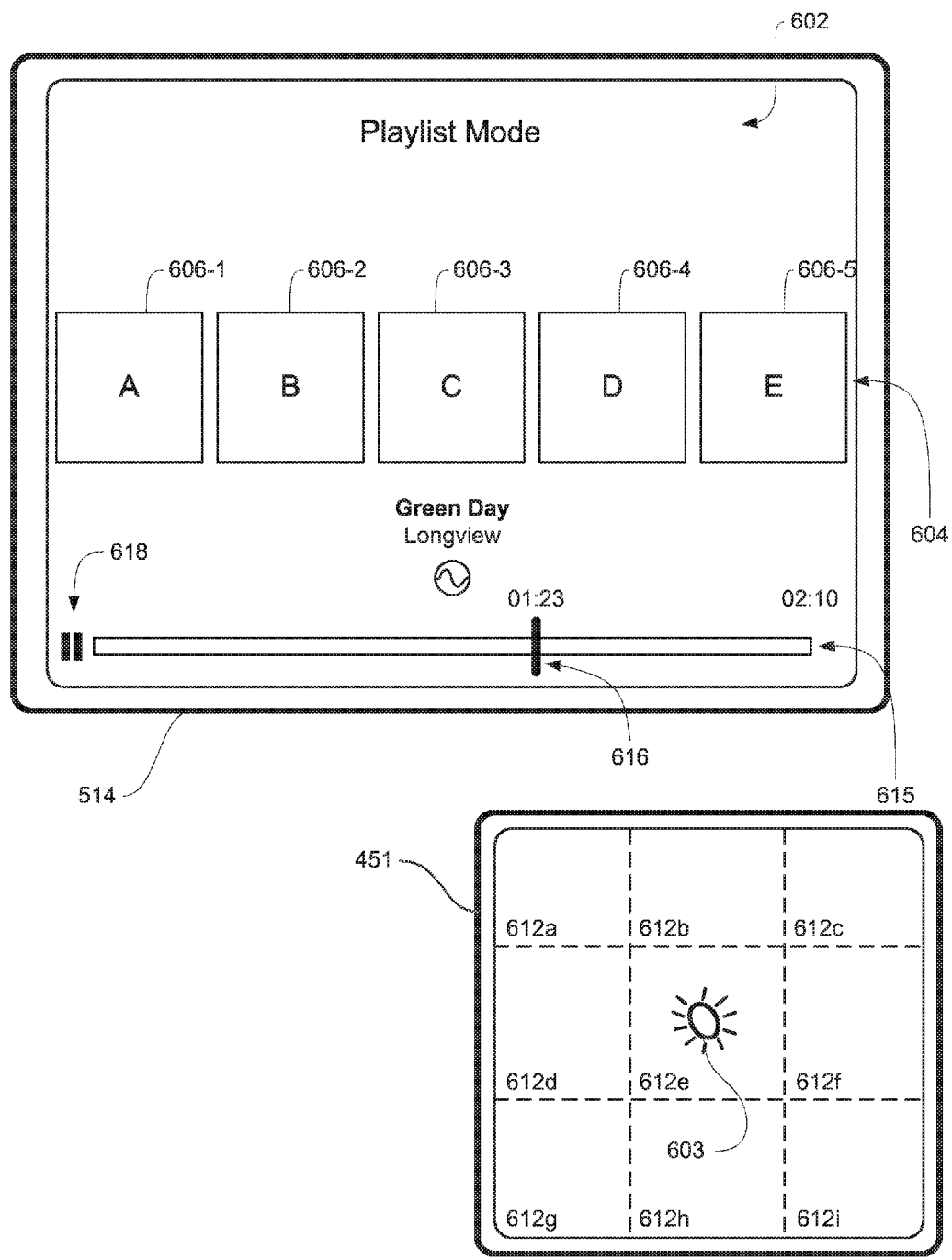
Figure 6O:
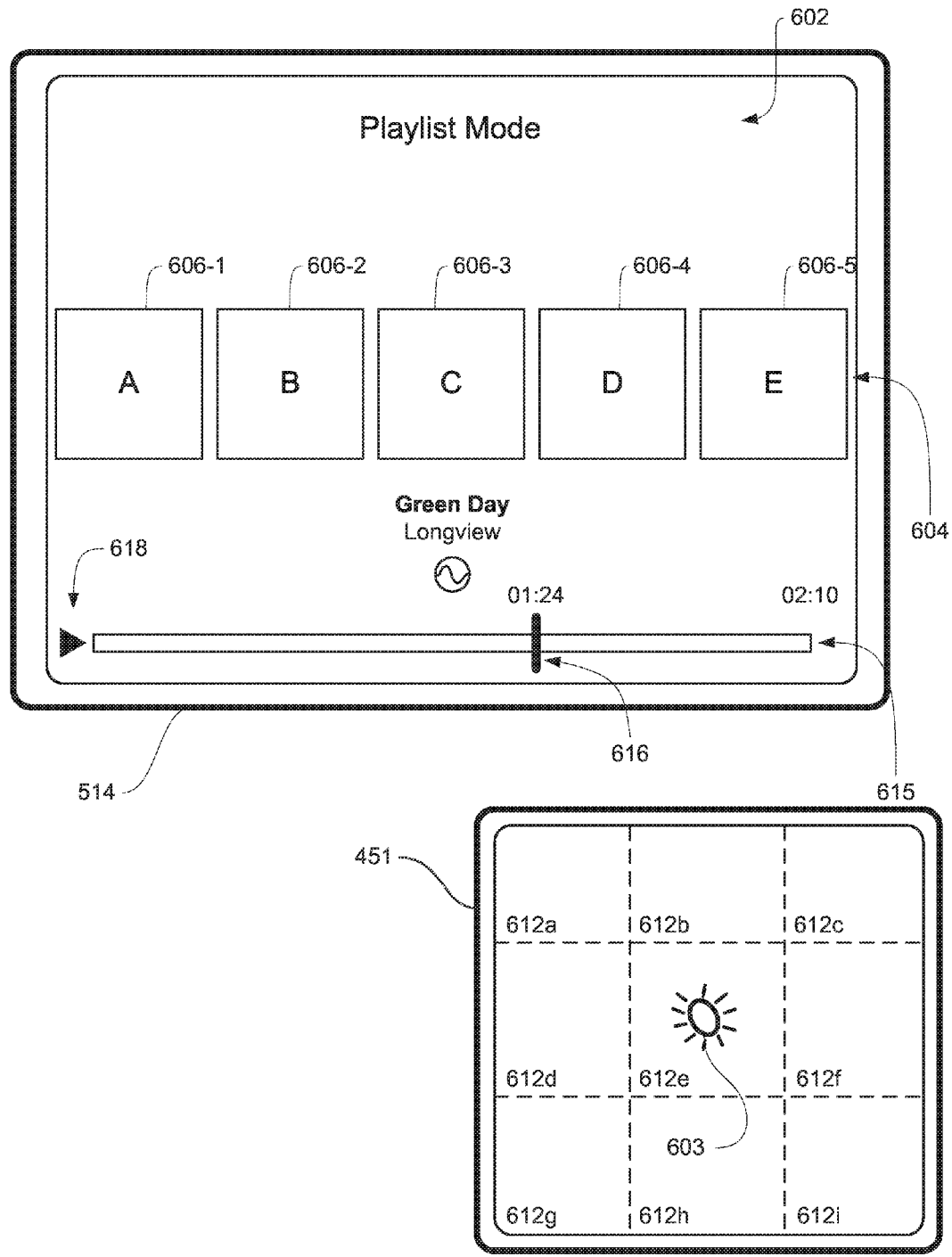
Figure 6P:
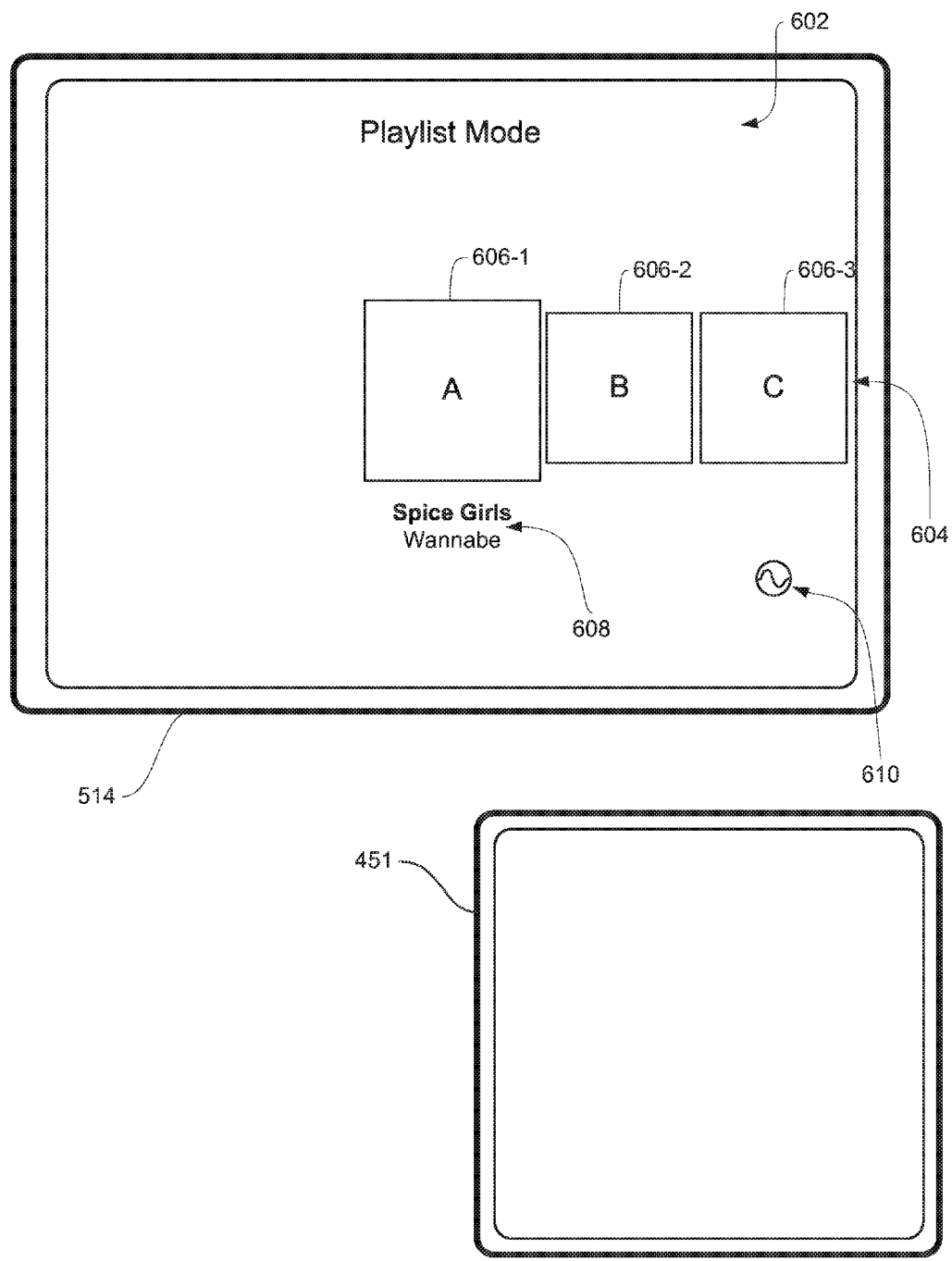
Figure 6Q:
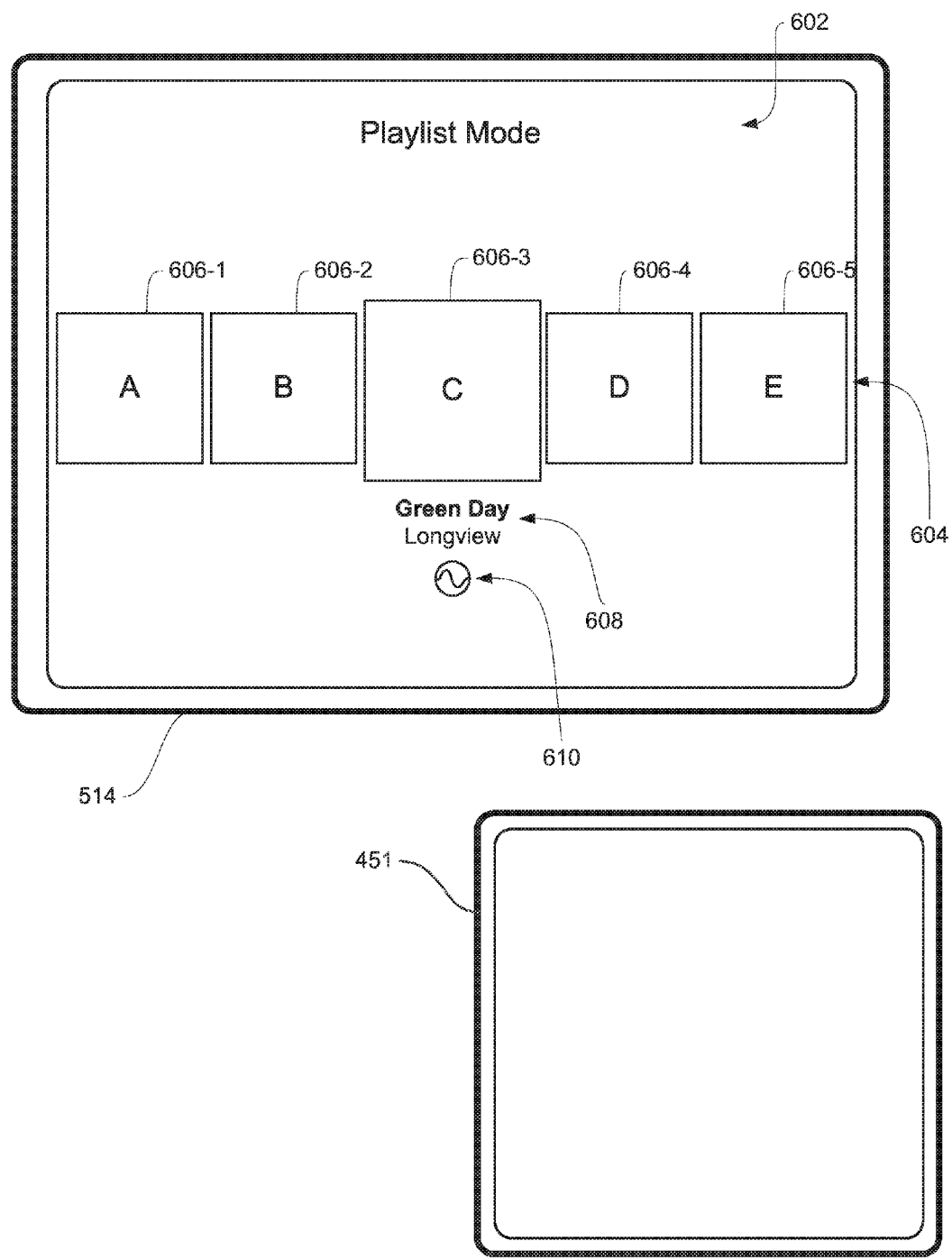
Figure 6R:
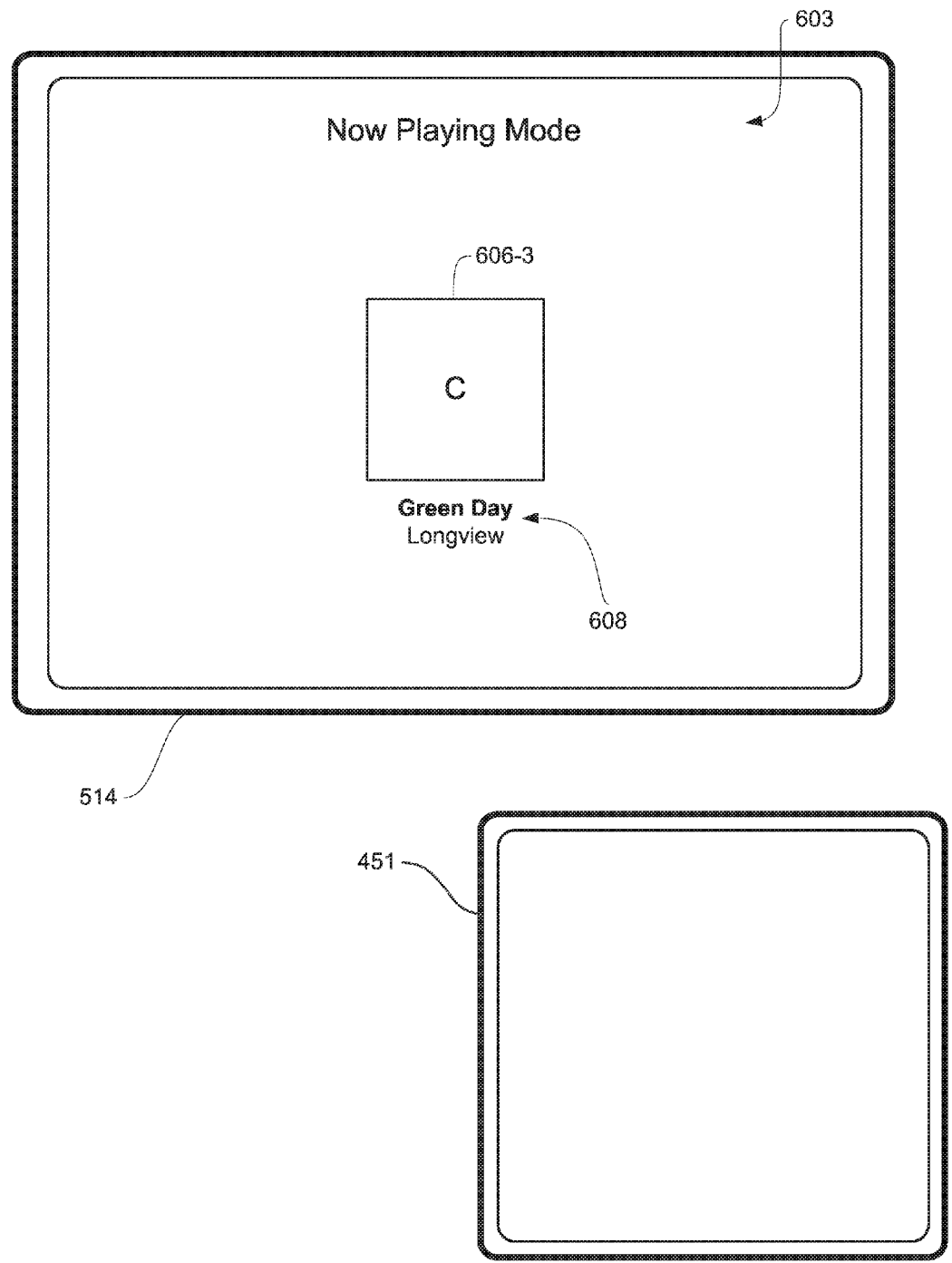
Figure 6S:
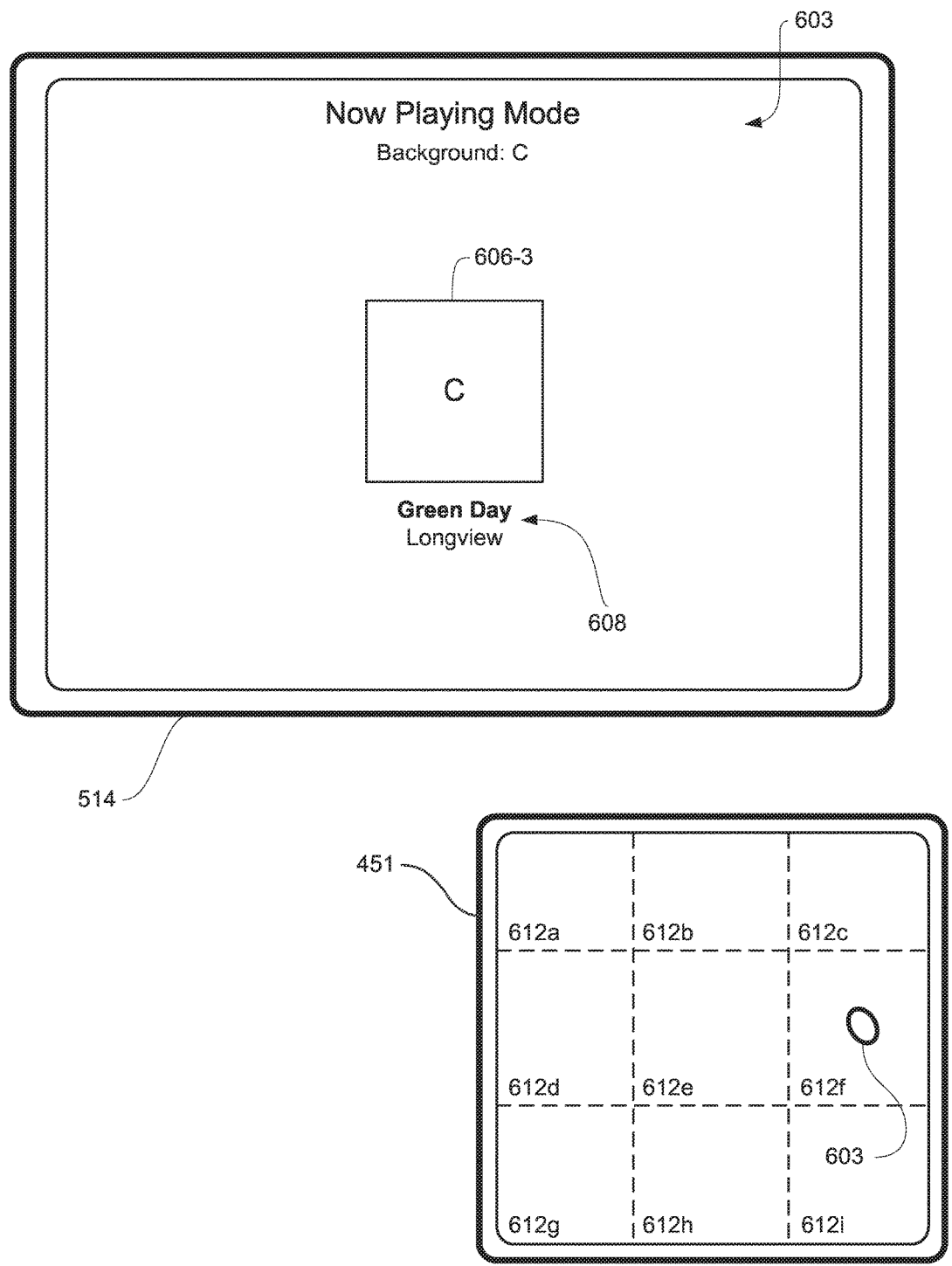
Figure 6T:
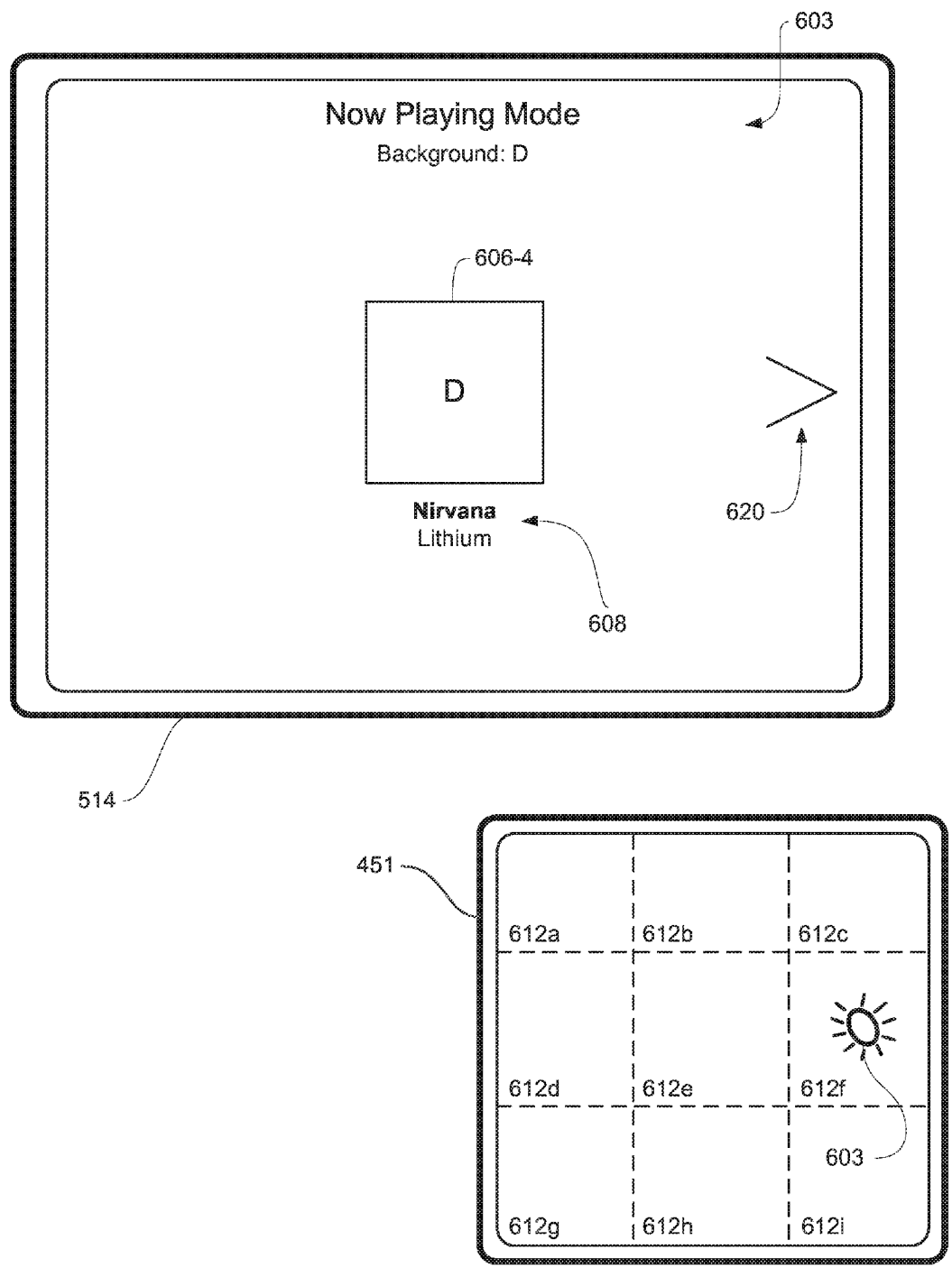
Figure 6U:
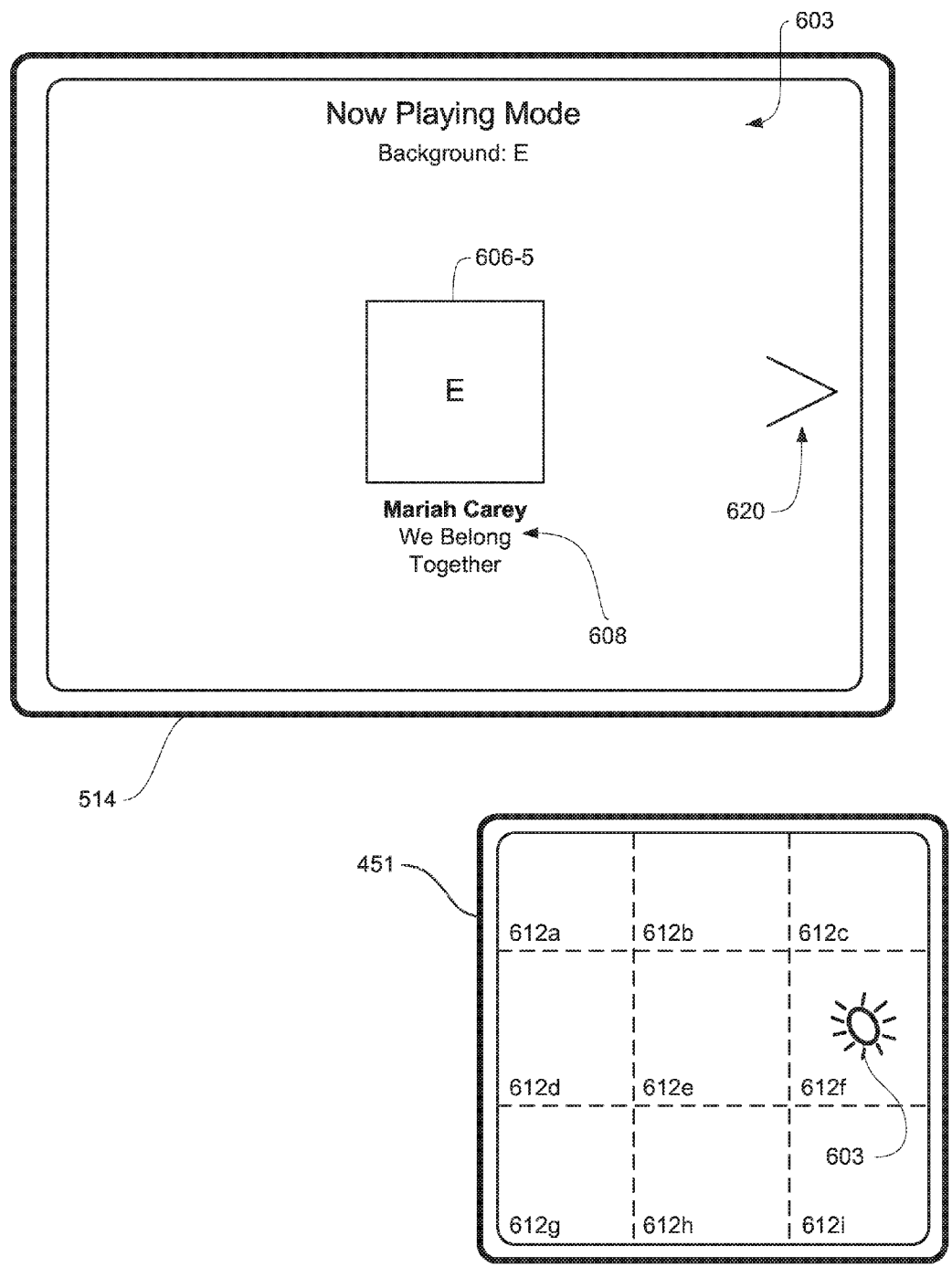
Figure 6V:
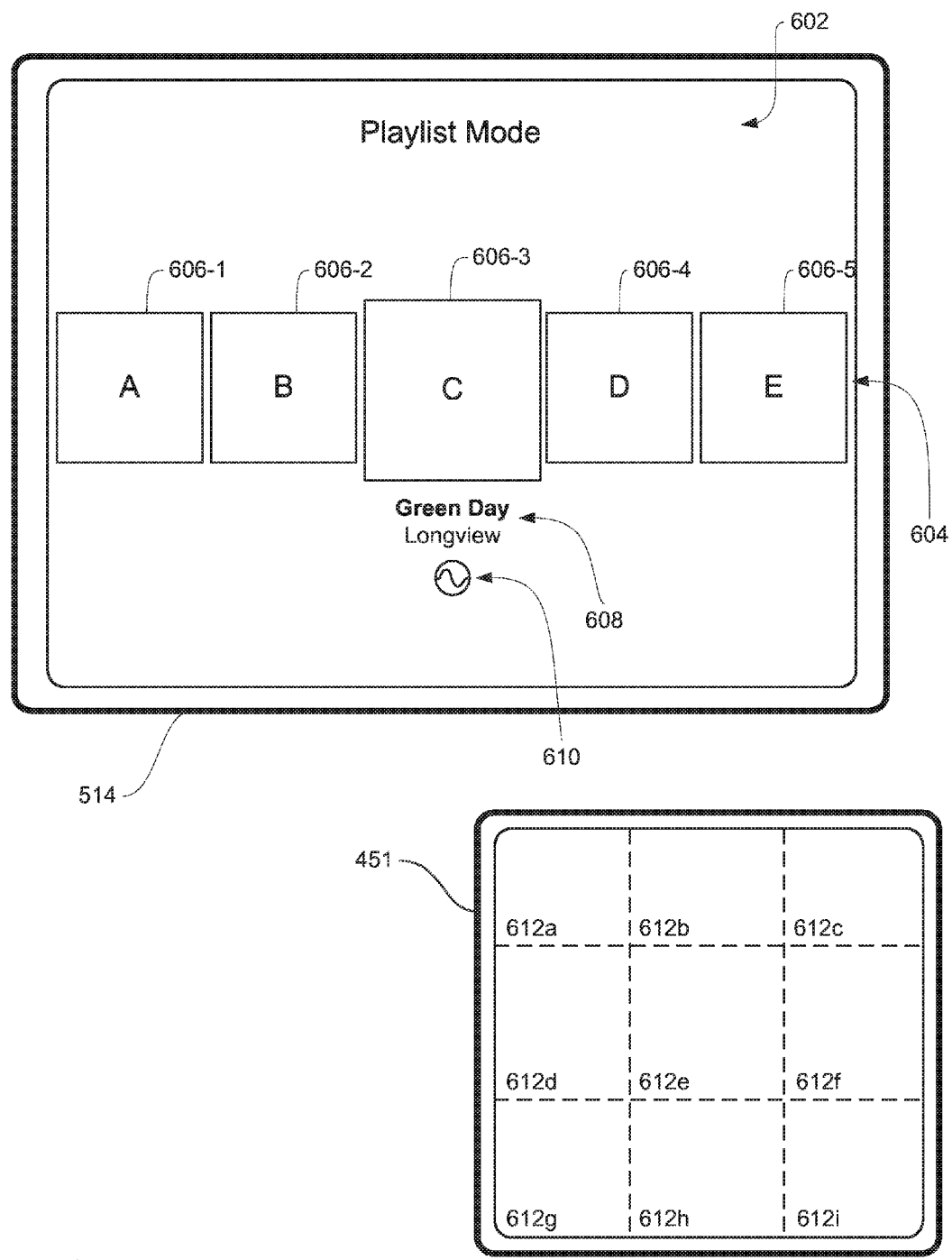
Figure 6W:
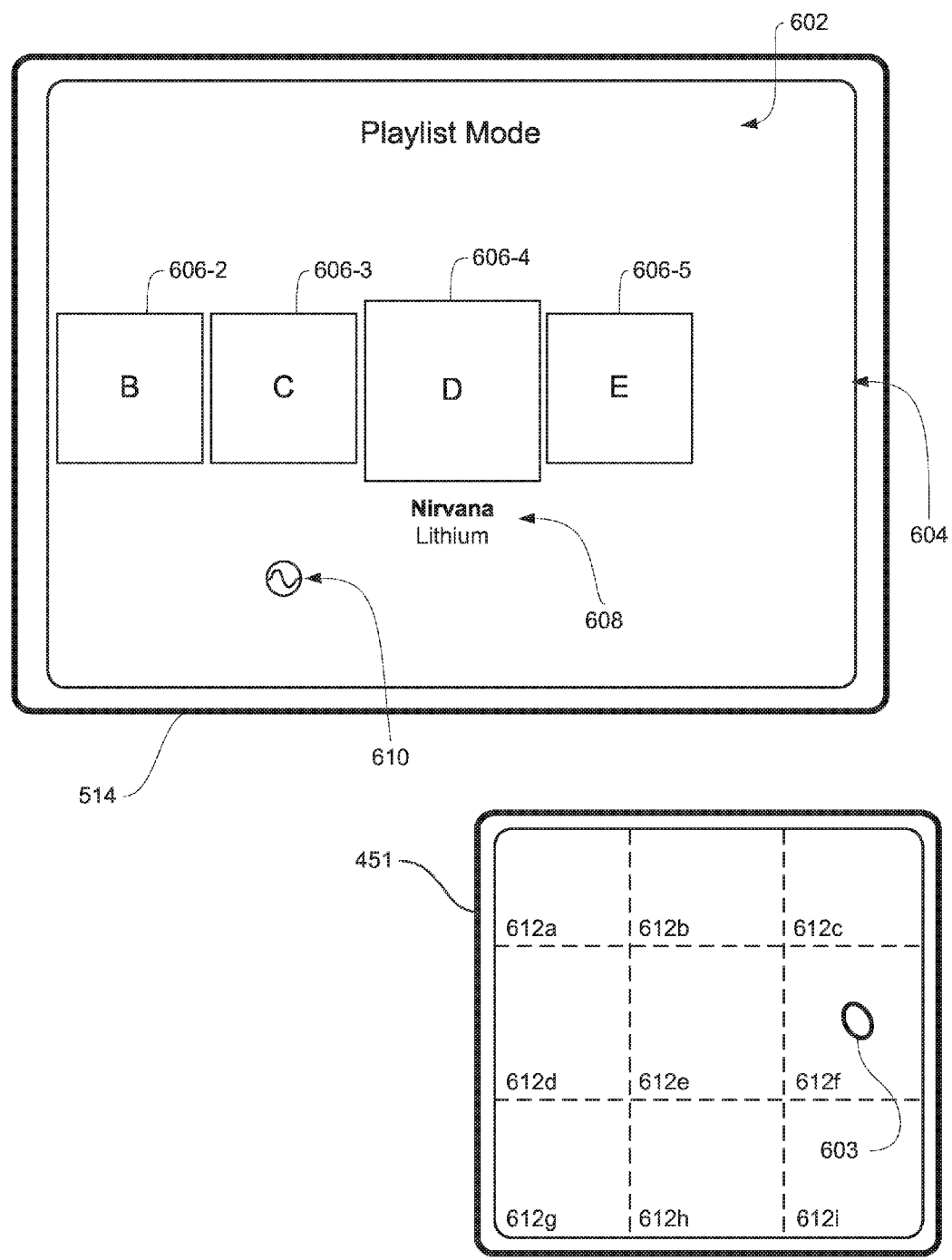
Figure 6X:
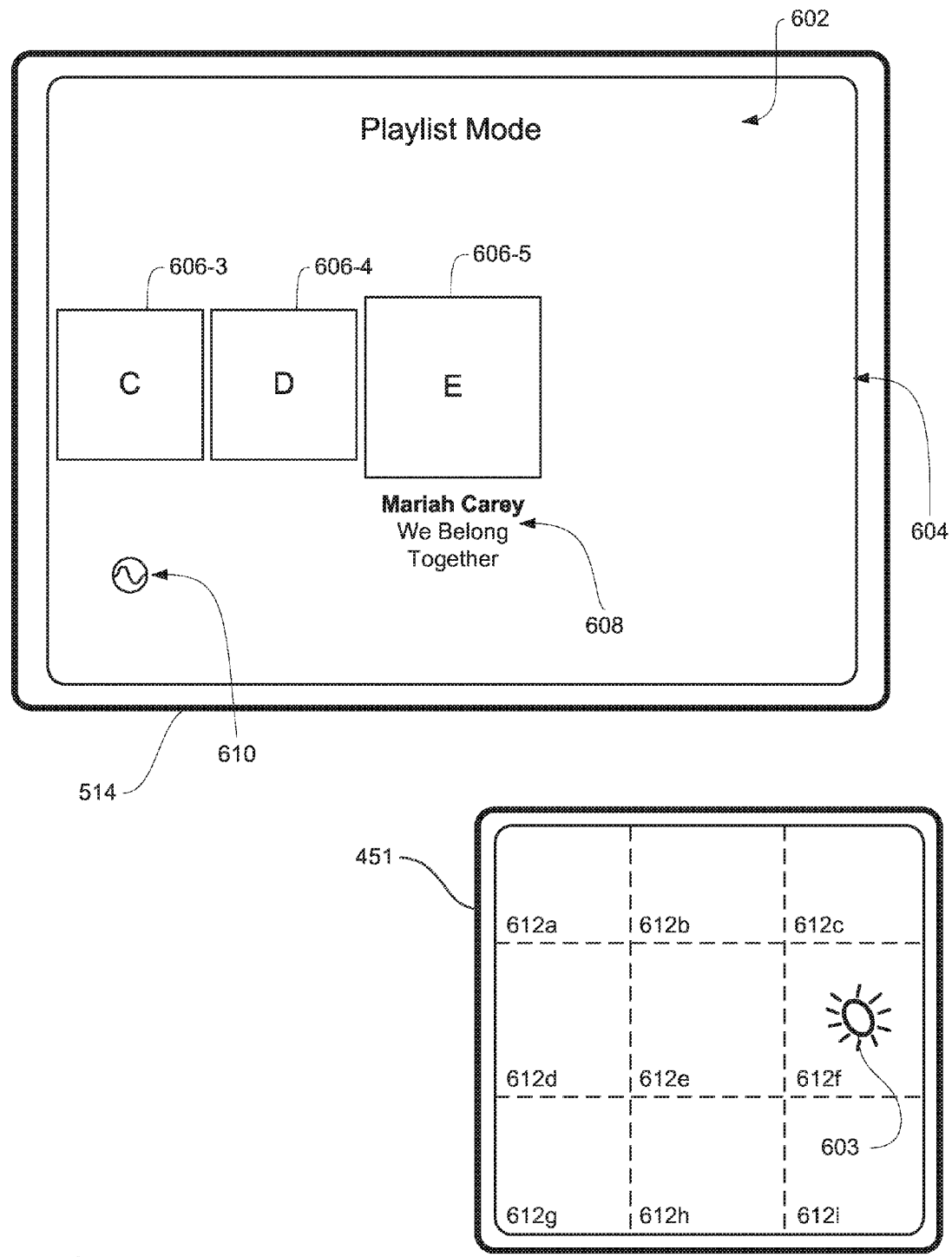
Figure 6Y:
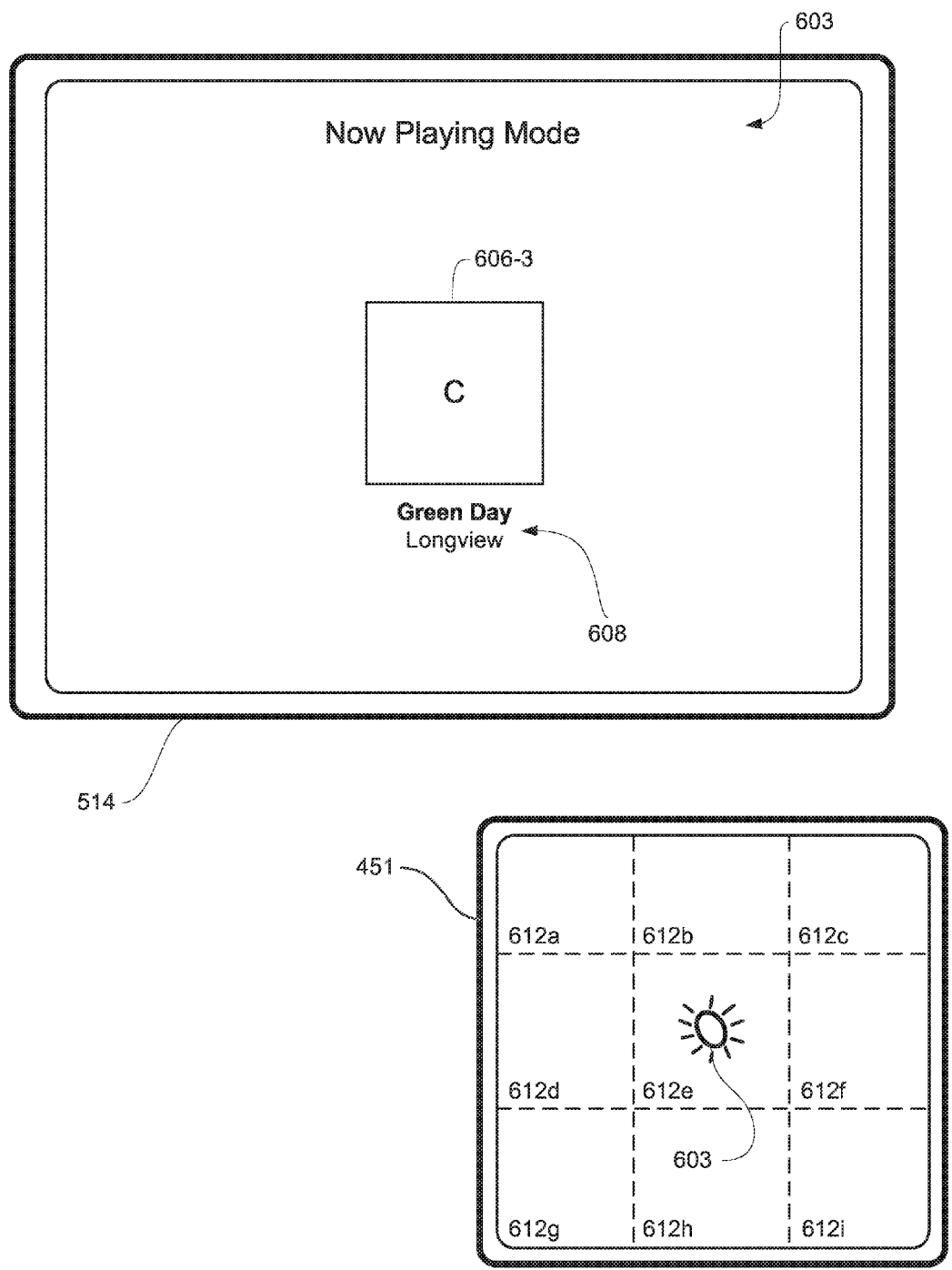
Figure 6Z:
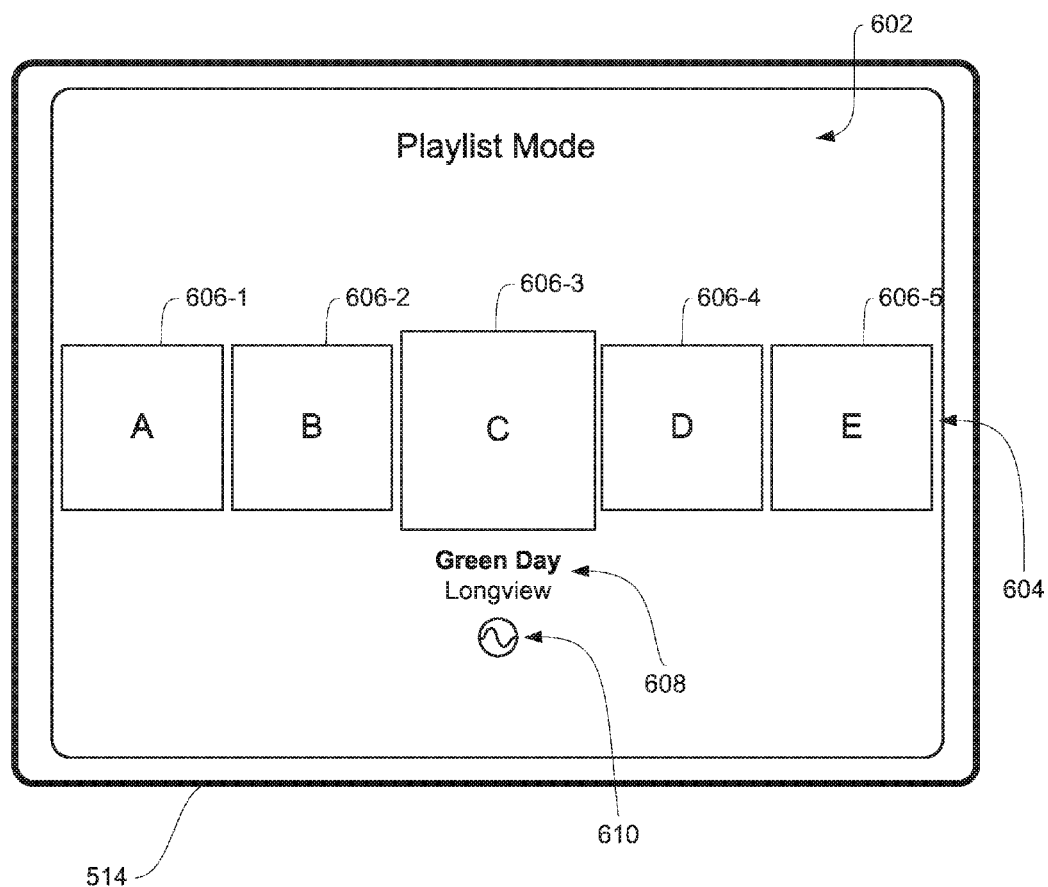
Figure 6A:
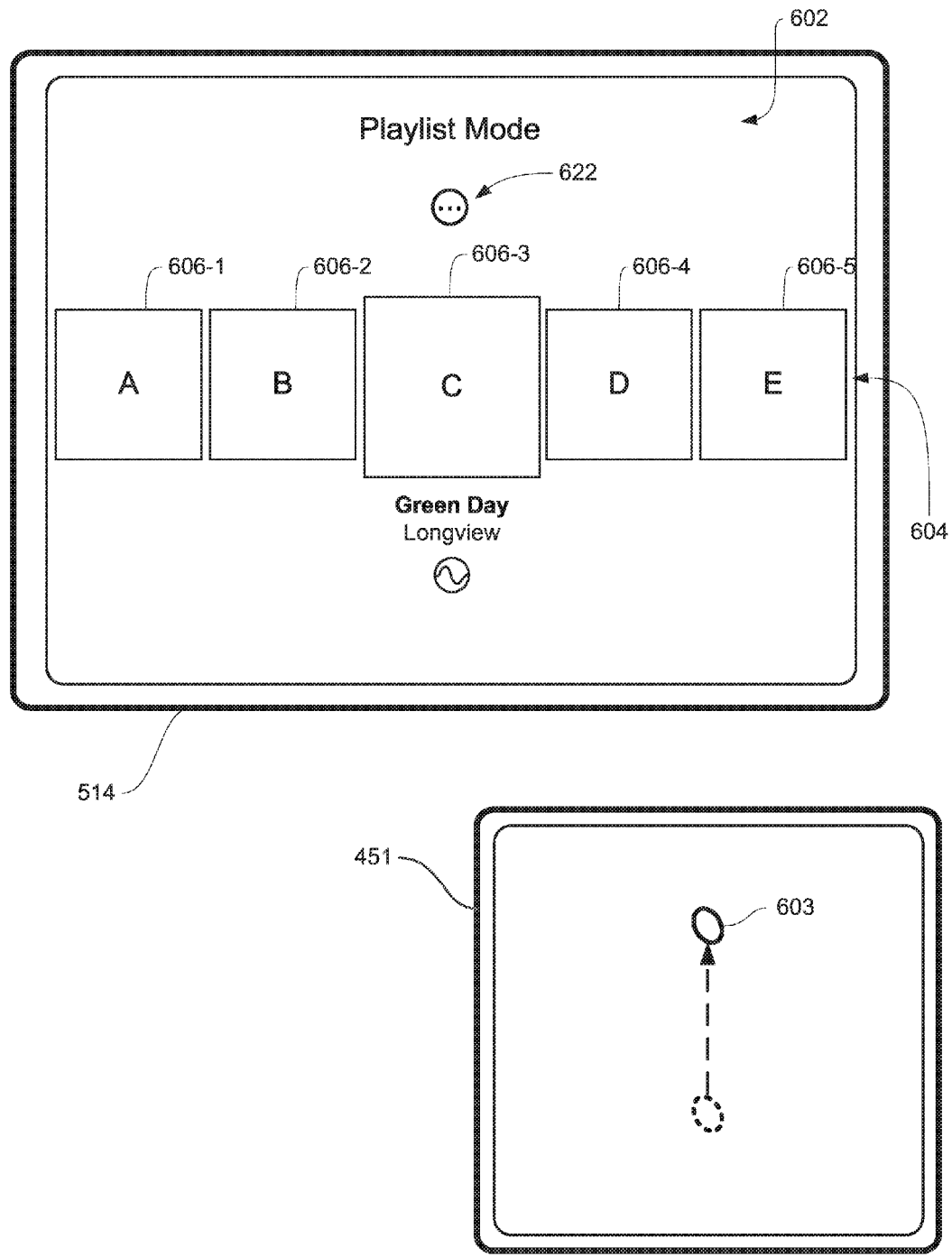
Figure 6B:
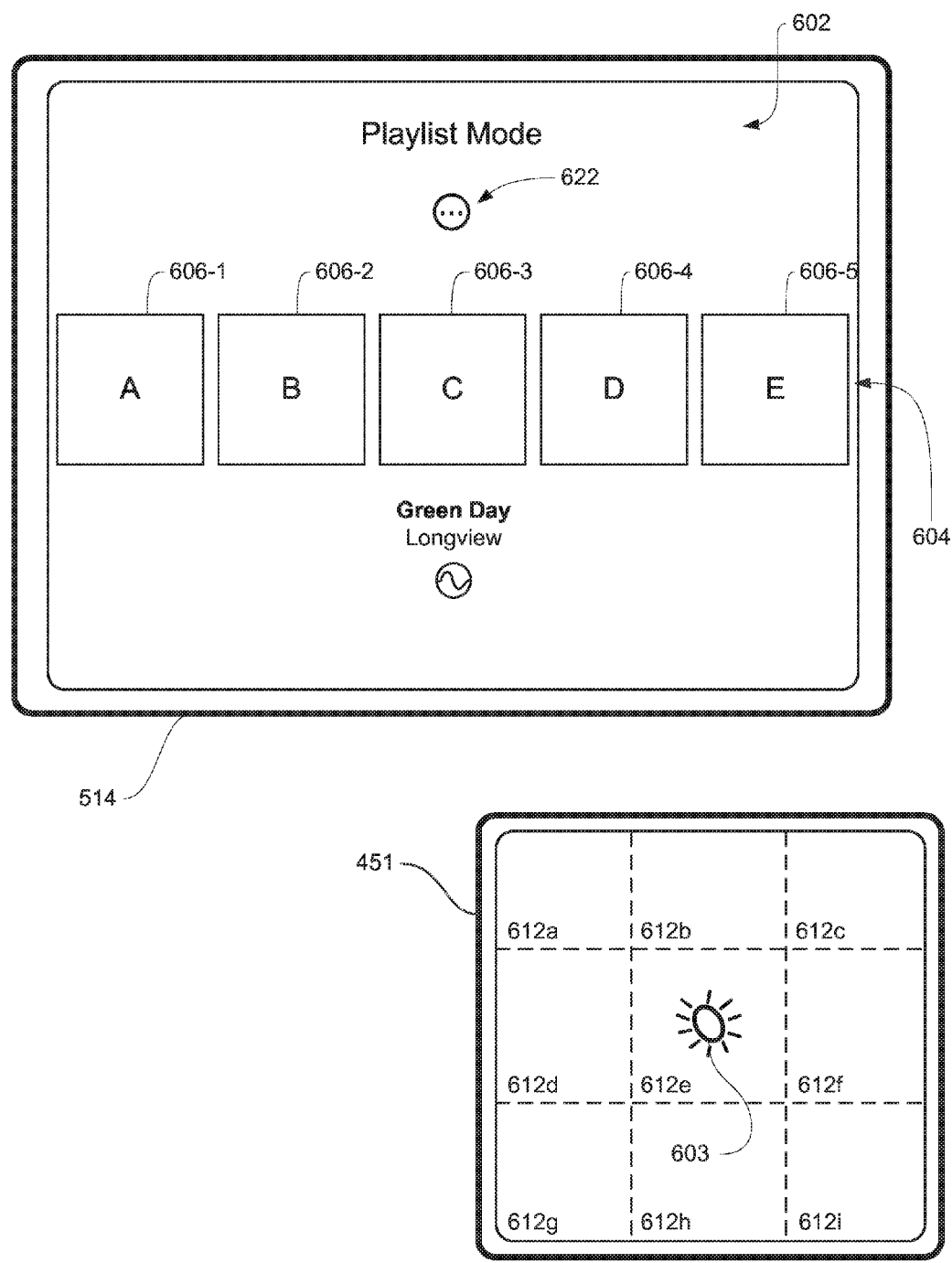
Figure 6C:
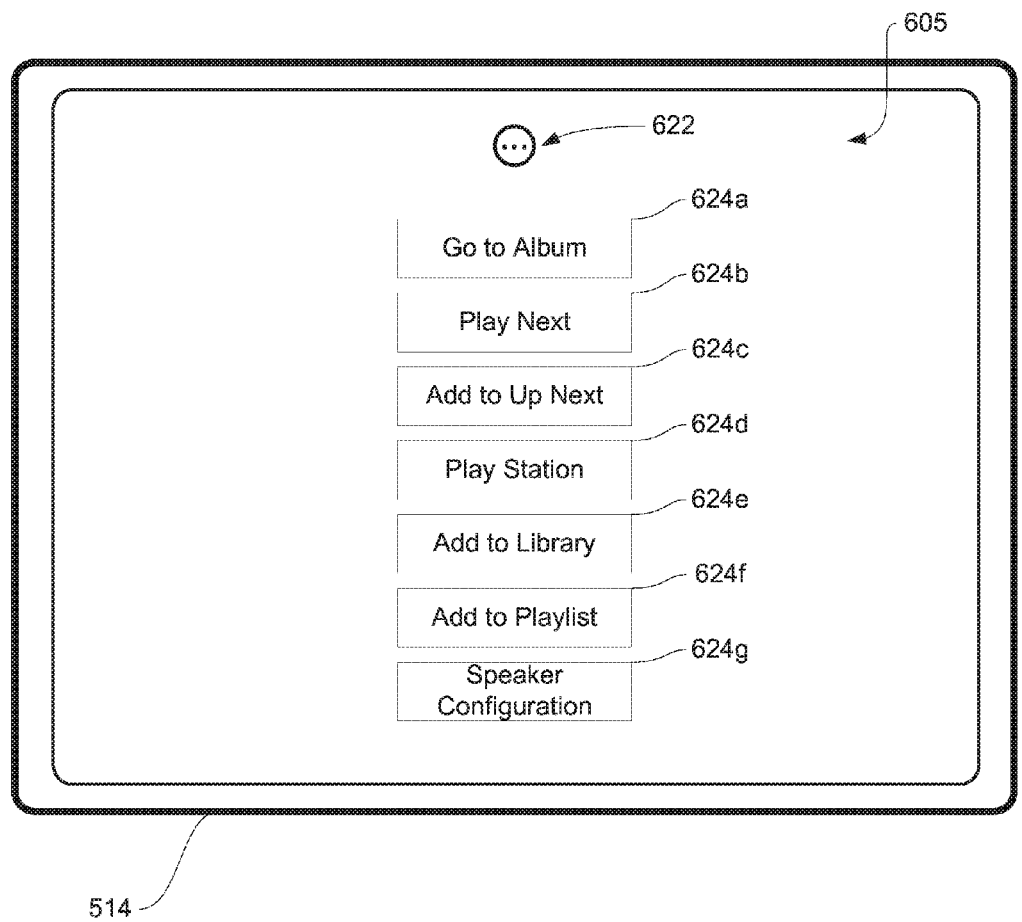
Figure 7A:
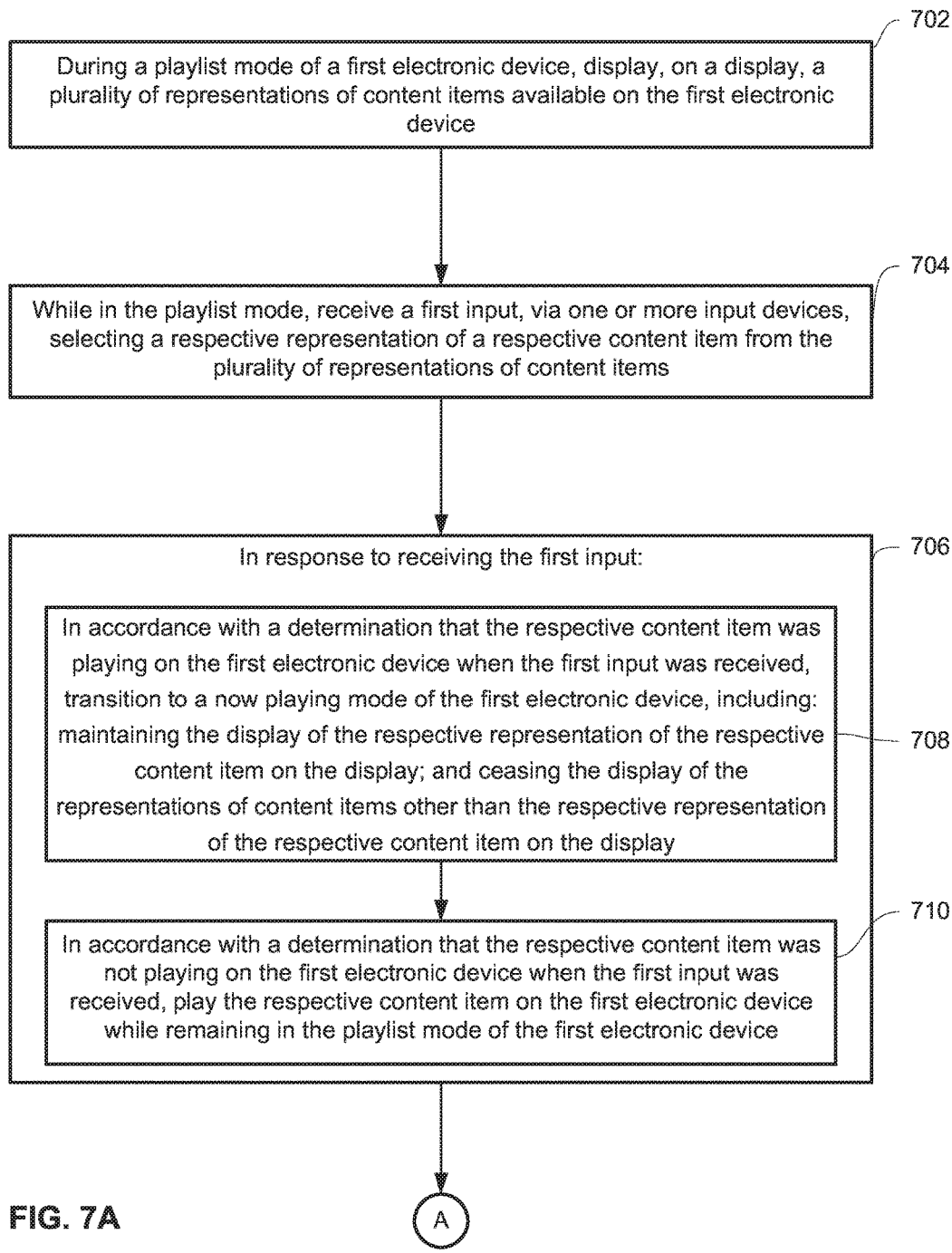
FIGS. 7A-7I are flow diagrams illustrating a method of navigating and playing content items available on an electronic device in accordance with some embodiments of the disclosure.
Figure 7B:
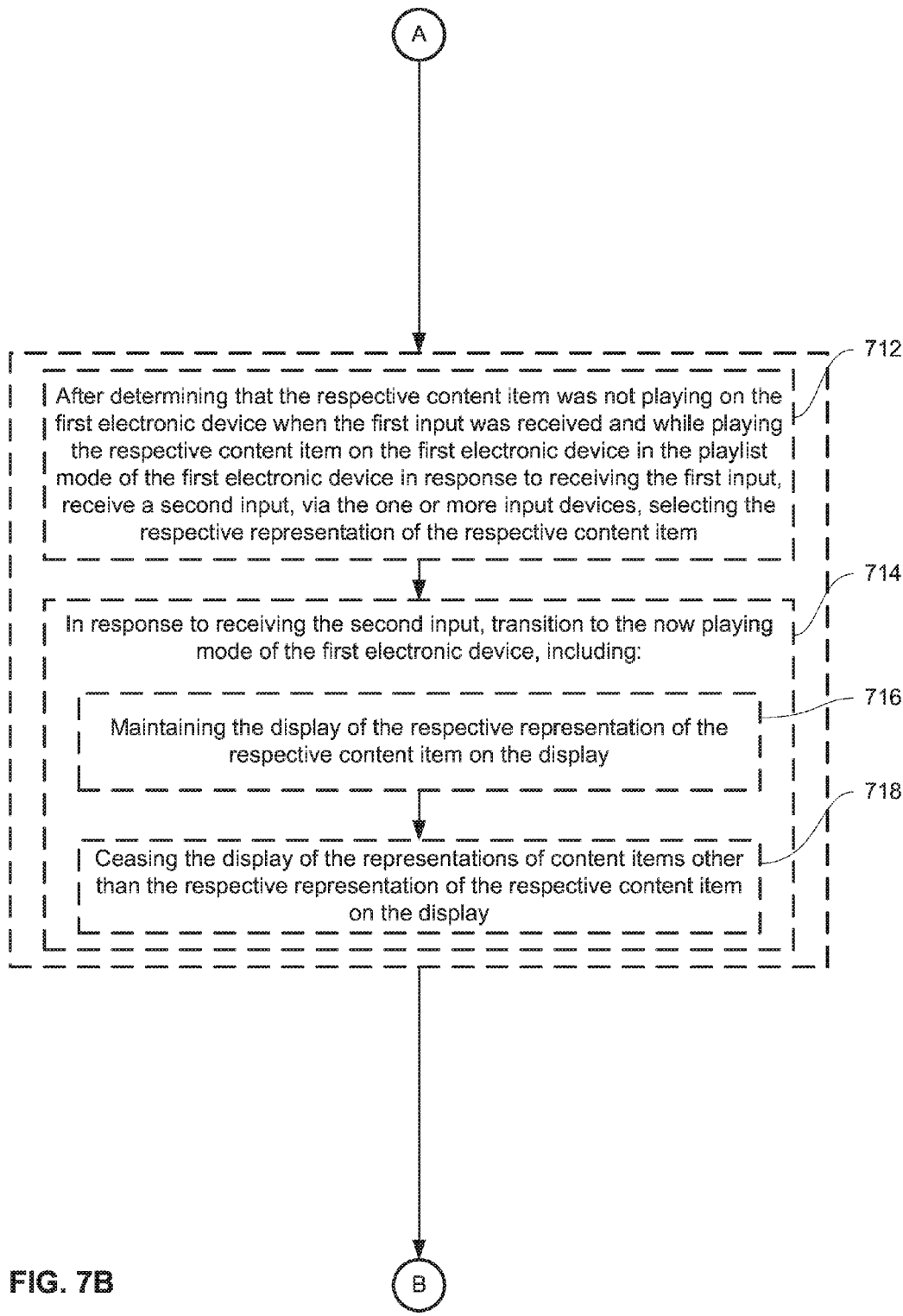
Figure 7C:
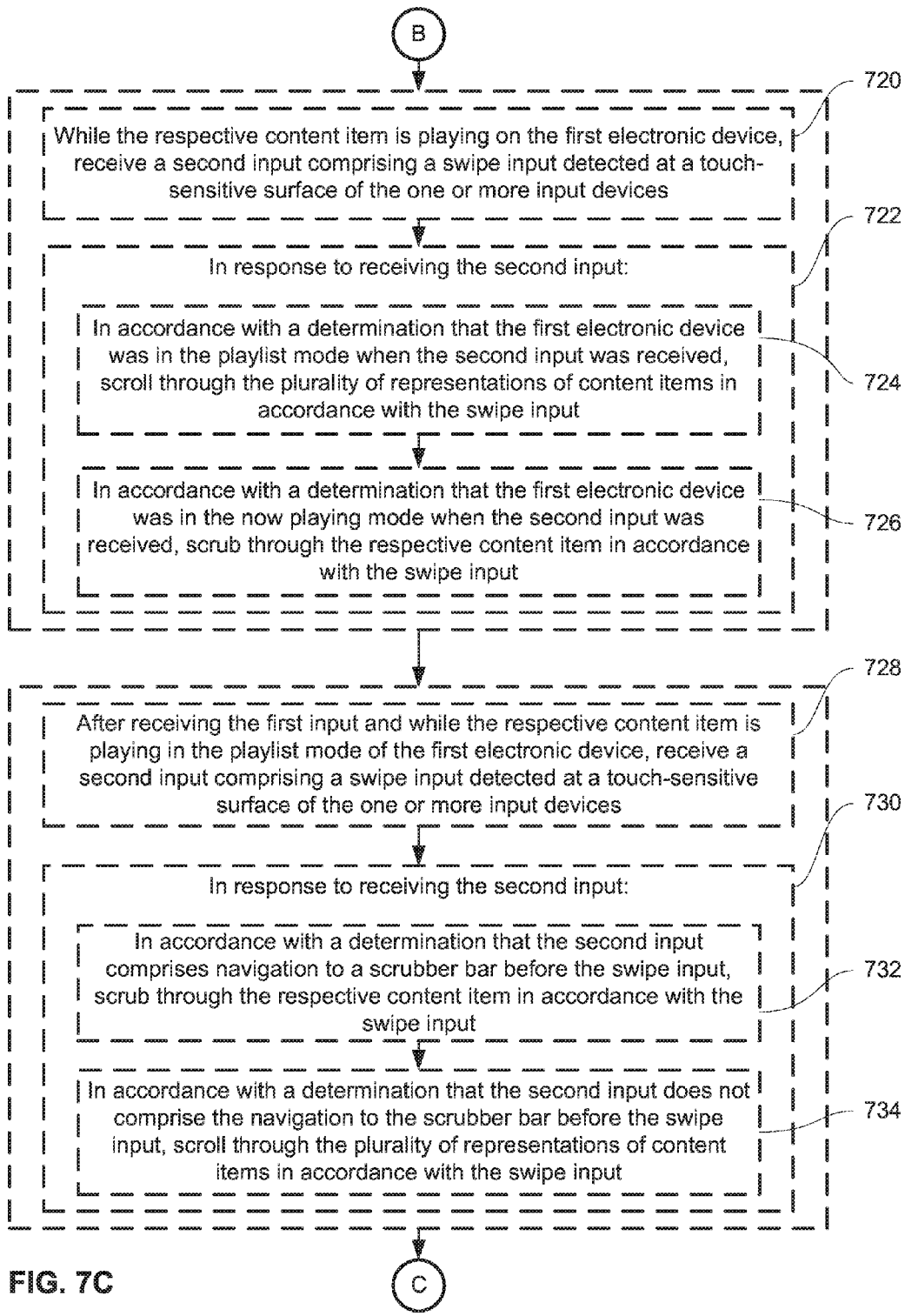
Figure 7D:
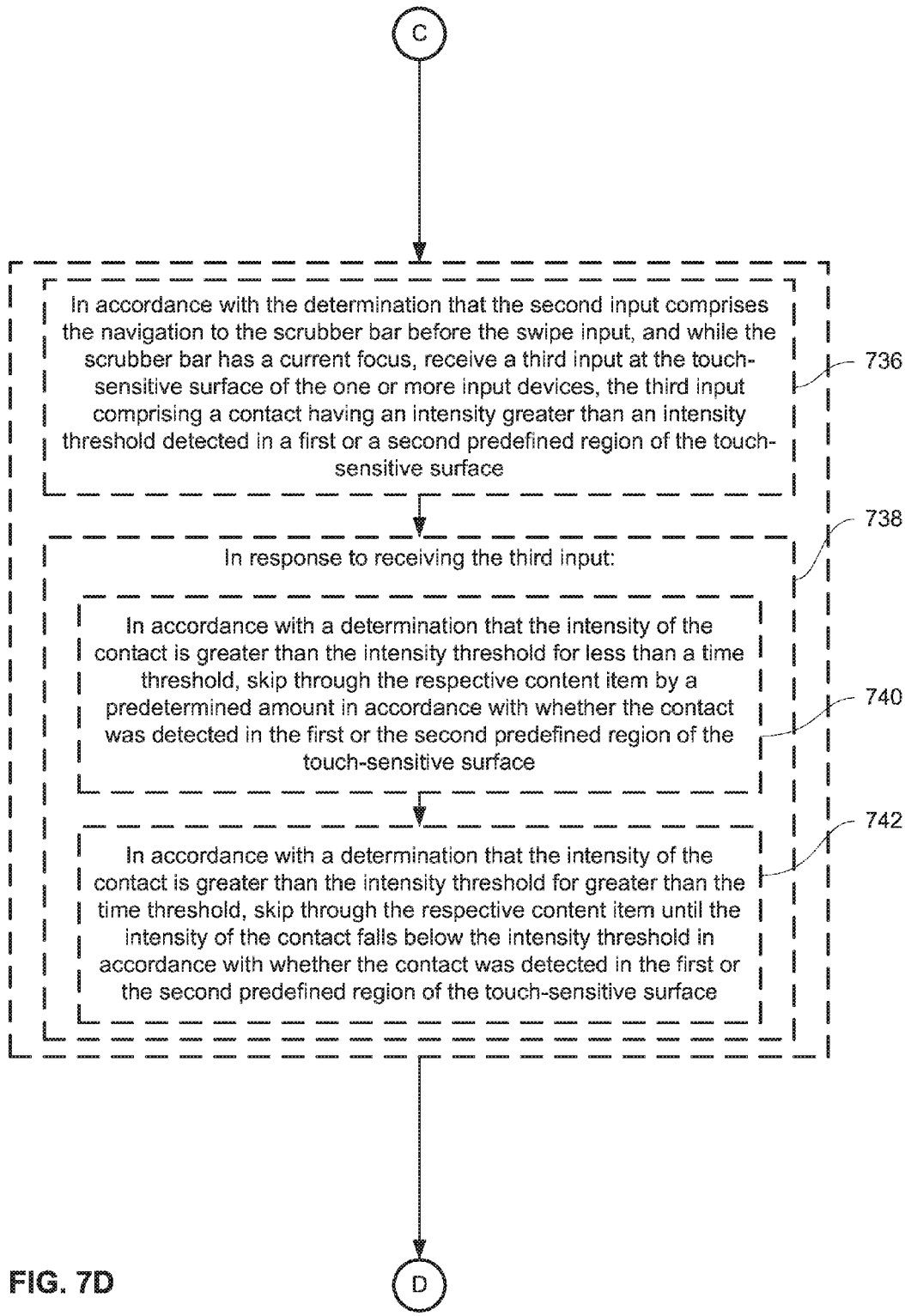
Figure 7E:
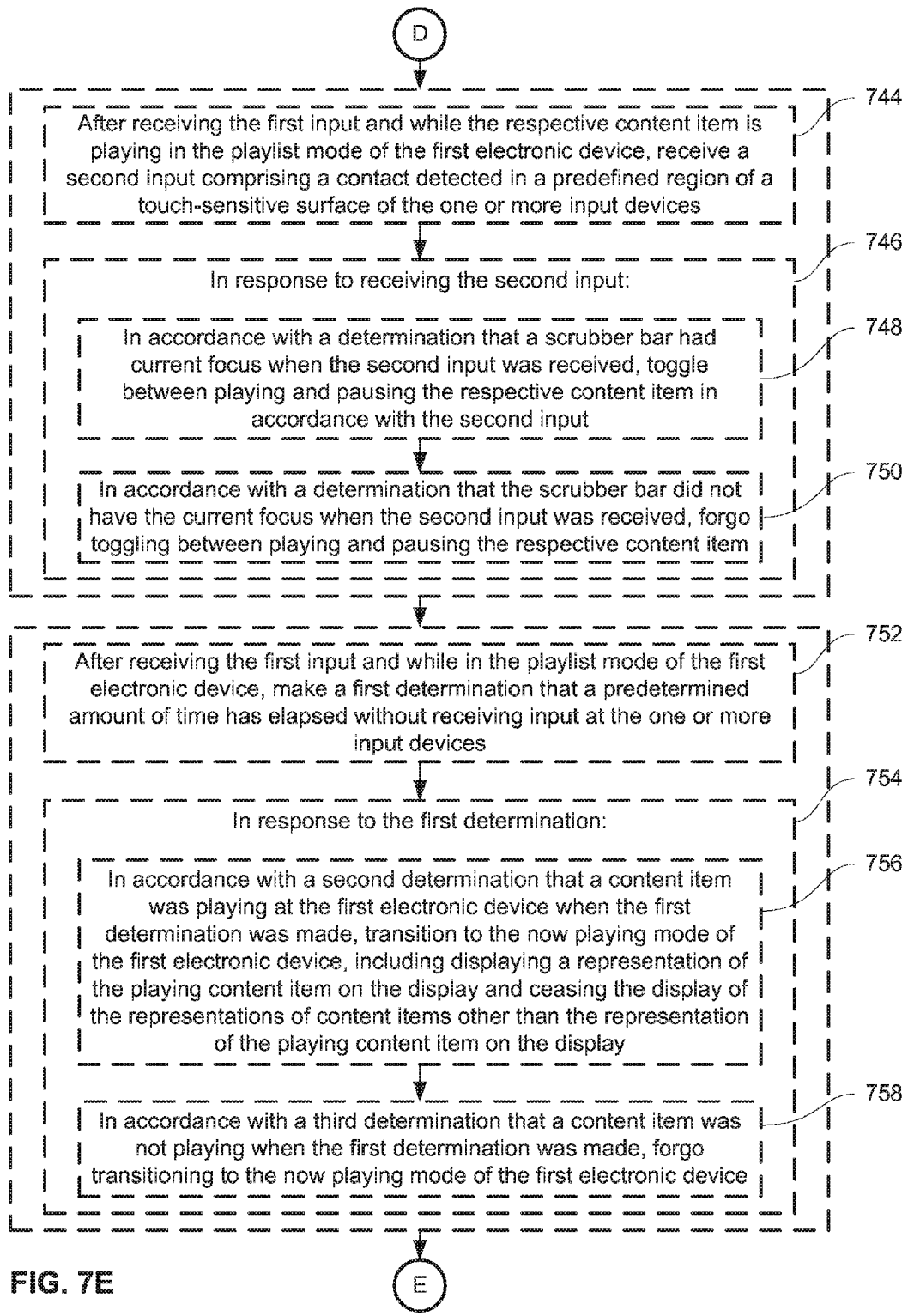
Figure 7F:
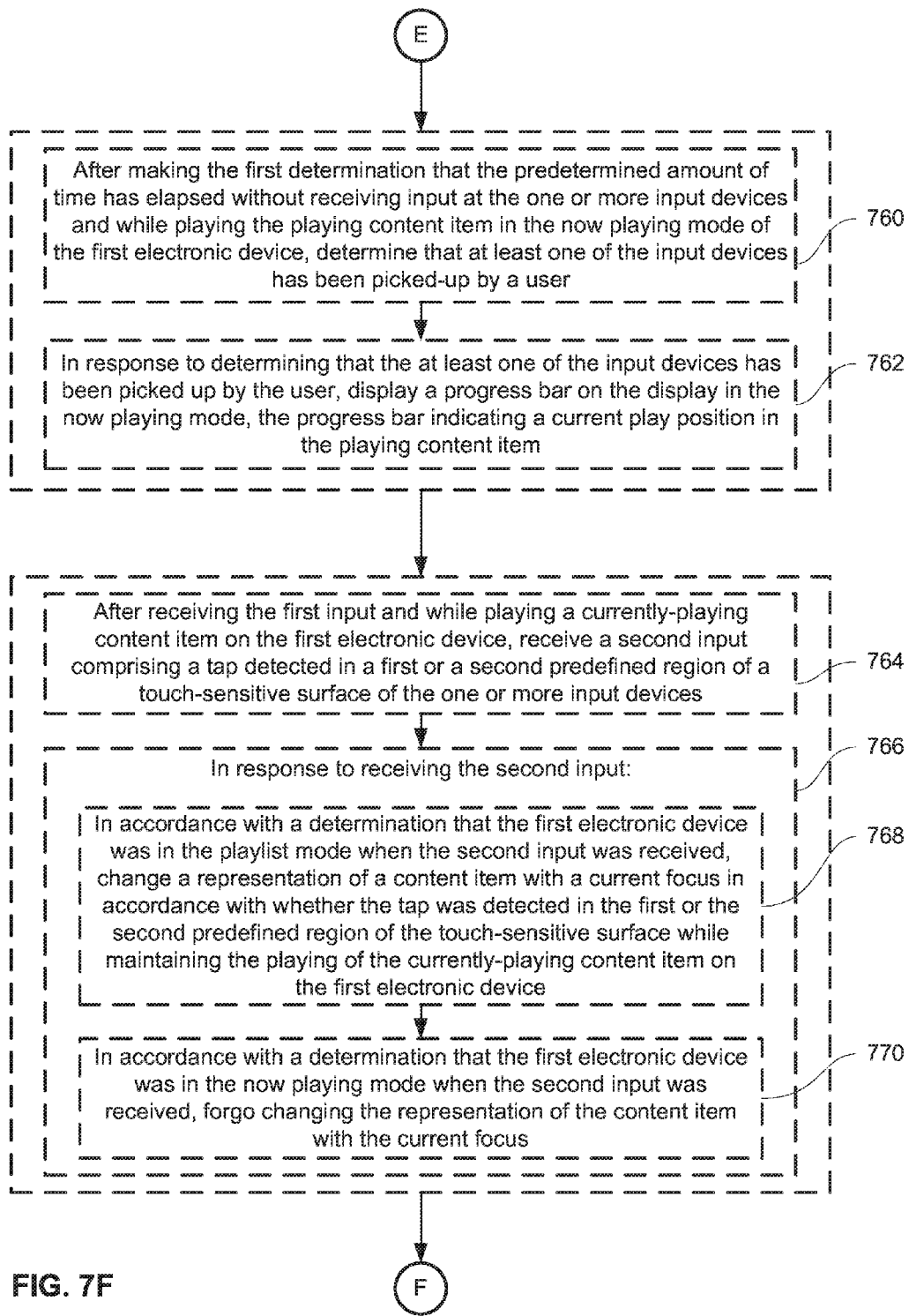
Figure 7G:
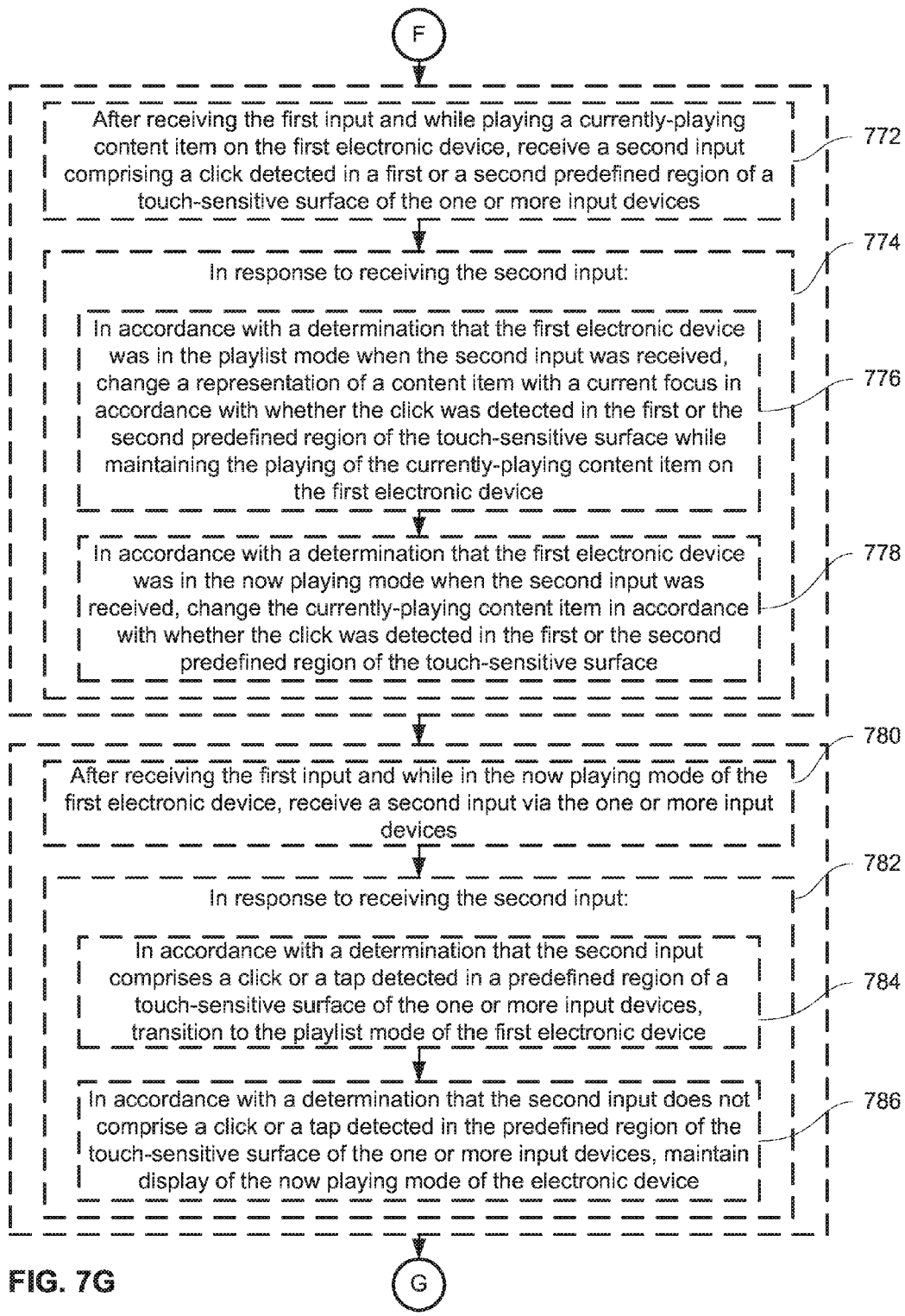
Figure 7H:
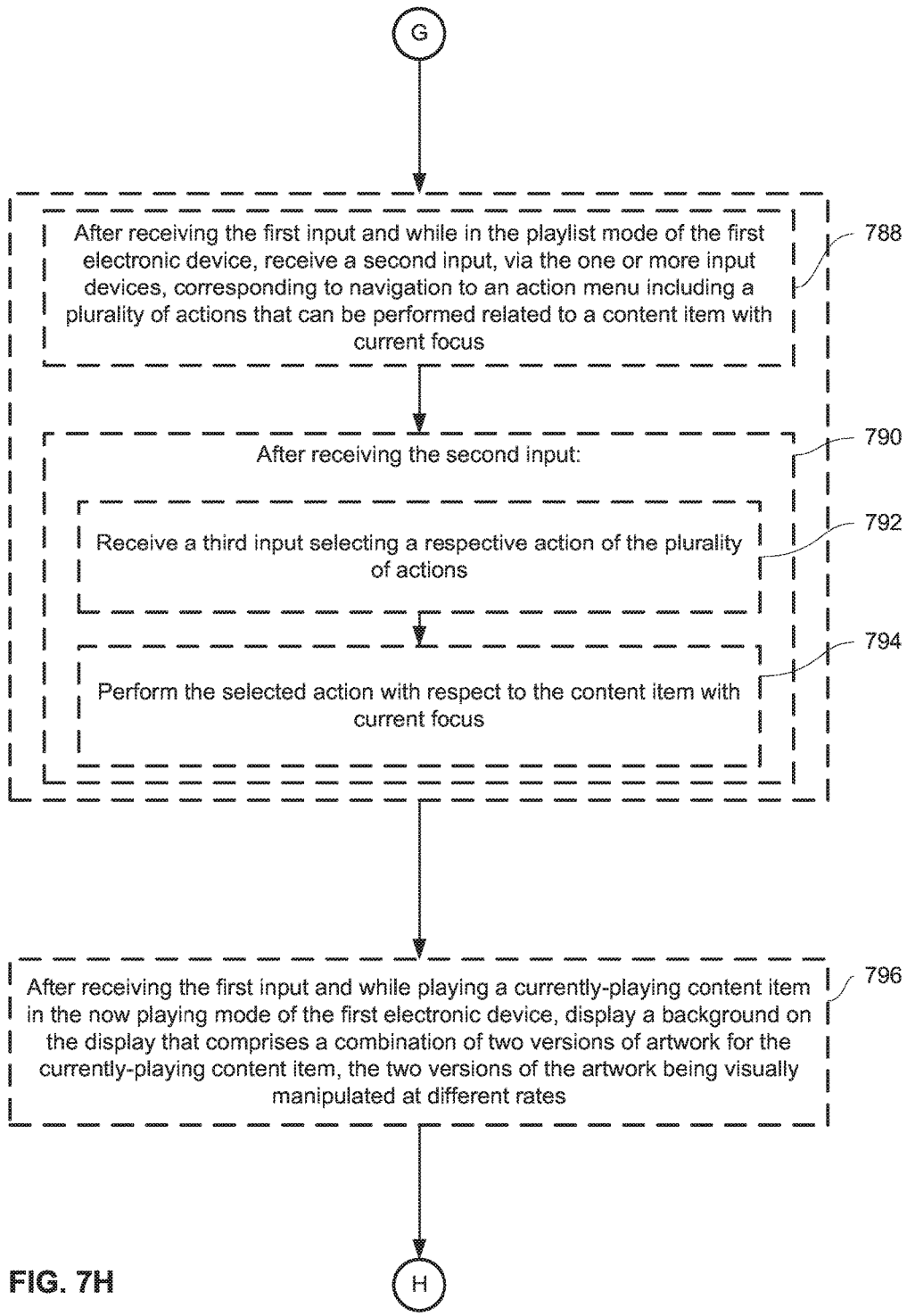
Figure 7I:
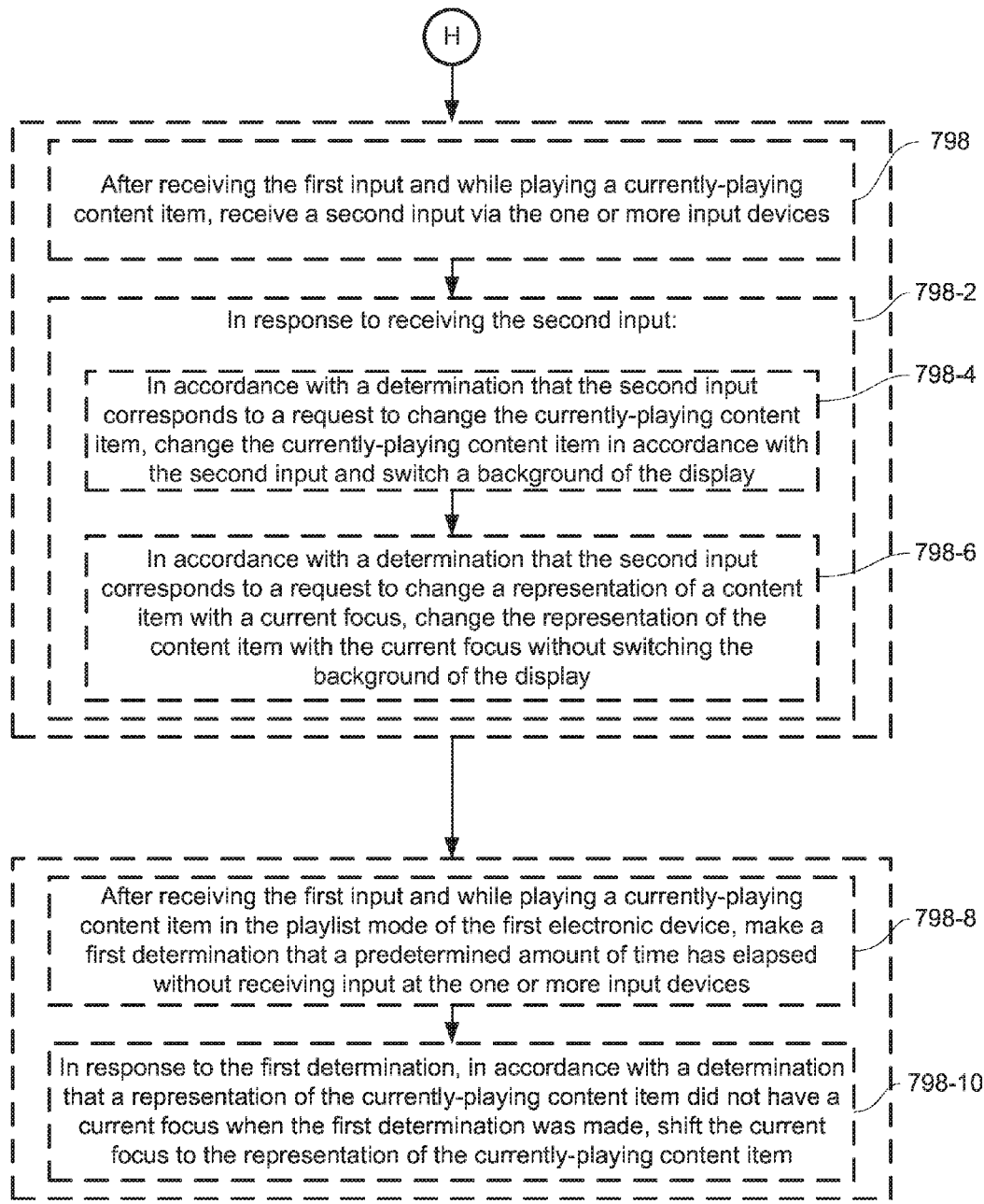

FIGS. 6A-6Z and 6AA-6CC illustrate exemplary ways in which electronic devices allow users to navigate and play content items available on the electronic devices in accordance with some embodiments of the disclosure. The embodiments in these figures are used to illustrate the processes described below, including the processes described with reference to FIGS. 7A-7I.

It should be noted that the examples illustrated in FIGS. 6A-6Z and 6AA-6CC are directed to electronic devices that display information on non-touch-sensitive displays, though it is understood that the electronic devices may instead display information on displays having touch-sensitive capability (e.g., touch screens). For example, the electronic devices may include touch screens, or the electronic devices may be capable of outputting display information for display on separate touch screens, as previously described in this disclosure—in such circumstances, the displays described below optionally correspond to the touch screens mentioned above, and the inputs described below are optionally detected on the touch screens.

FIG. 6A illustrates exemplary display 514. Display 514 optionally displays one or more user interfaces that include various content. In the example illustrated in FIG. 6A, display 514 optionally displays an application for navigating and playing content (e.g., music, movies, etc.) running on an electronic device (e.g., electronic device 500 of FIG. 5A) of which display 514 is a part, or to which display 514 is connected. The application is optionally in a playlist mode, and display 514 optionally displays a corresponding playlist user interface 602.

The playlist user interface 602 optionally includes a plurality of representations 606 of content items (e.g., music, movies, etc.) available on the electronic device. The representations 606 optionally include album artwork or other graphics related to the content items to which they correspond. In the embodiment of FIG. 6A, the playlist user interface 602 optionally includes five representations of content items available on the electronic device (representations 606-1, 606-2, 606-3, 606-4 and 606-5), and the representations optionally correspond to songs (content items A-E) available on the electronic device. The representations 606 are optionally displayed in a bar or line 604 along an axis in the playlist user interface 602 (e.g., horizontally, as in FIG. 6A). Representation 606-3 optionally has a current focus, which is optionally reflected by representation 606-3 being larger than the remaining representations (e.g., representations 606-1, 606-2, 606-4 and 606-5). Additional or alternative visual characteristics are optionally implemented to indicate a representation having the current focus (e.g., highlighting the representation, changing the color of the representation, outlining the representation, etc.). The representation with current focus—representation 606-3 in the embodiment illustrated in FIG. 6A—optionally has description 608 displayed adjacent to the representation (e.g., below the representation). Description 608 optionally includes information relating to the content item with current focus—in the embodiment of FIG. 6A, description 608 optionally includes the name of the artist ("Green Day") and the name of the song ("Longview") corresponding to the representation with current focus, though other information, such as the name of the music album to which the content item belongs, is optionally additionally or alternatively included in description 608

Playlist user interface 602 also optionally includes a current-play indicator 610, which optionally indicates which content item is currently-playing on the electronic device. In the embodiment of FIG. 6A, the content item corresponding to representation 606-3 (Green Day's Longview) is optionally playing on the electronic device, and the current-play indicator 610 is optionally displayed adjacent to representation 606-3 (e.g., below representation 606-3) to reflect this fact.

The playlist user interface 602 optionally displays a background behind representations 606, which optionally corresponds to the currently-playing content item on the electronic device. In the embodiment of FIG. 6A, the background optionally corresponds to the content item corresponding to representation 606-3 (e.g., background C optionally corresponds to content item C). In some embodiments, the background in the playlist user interface 602 is a combination of two versions of artwork for the currently-playing content item (e.g., album artwork for content item C), the two versions of the artwork being visually manipulated (e.g., rotating and scaling) at different rates (e.g., the combination is optionally a union of two instances of the same artwork for the currently-playing content item, the two instances rotating at different rates, and/or scaling larger and smaller at different rates). In some embodiments, the artwork is the same artwork as is displayed in the representation of the currently-playing content item (e.g., representation 606-3). Representations 606 are optionally scrollable (e.g., the representation with the current focus is optionally changeable) in accordance with one or more inputs detected by the electronic device.

FIG. 6B illustrates scrolling of representations 606 in accordance with an input detected by the electronic device. The electronic device optionally detects a swipe input on touch-sensitive surface 451. Touch-sensitive surface 451 is optionally a touch-sensitive surface on a second electronic device, such as a remote control (e.g., remote 510 in FIGS. 5A-5B). The swipe input optionally includes contact 603 moving from left to right in a horizontal manner, as illustrated in FIG. 6B. In response to detecting the swipe input, representations 606 are optionally scrolled. Specifically, representation 606-2 optionally now has the current focus (e.g., the current focus optionally shifts left in the representations 606 in response to a left-to-right swipe input detected at touch-sensitive surface 451). As such, representation 606-2 is now optionally displayed with a larger size than the remaining representations, as illustrated in FIG. 6B. Further, in some embodiments, the representation 606 with the current focus remains at the same location in the playlist user interface 602 (e.g., in the center, as illustrated in FIG. 6B), and thus a swipe input detected at touch-sensitive surface 451 optionally moves representations 606 with respect to the playlist user interface 602 displayed on display 514. In some embodiments, such swipe inputs detected while the electronic device is in the playlist mode optionally change the representation 606 with the current focus, but do not change the currently-playing content item on the electronic device. As such, current-play indicator 610 optionally remains with representation 606-3, even though representation 606-2 optionally now has the current focus. In some embodiments, because the background of the playlist user interface 602 is determined by the currently-playing content item on the electronic device, the background in FIG. 6B optionally remains unchanged with respect to the background in FIG. 6A (e.g., background C) in response to receiving the swipe input on touch-sensitive surface 451, because the swipe input optionally does not change the currently-playing content item, as mentioned above, but rather optionally merely changes the representation 606 with the current focus.

Description 608, however, optionally does change when the current focus changes. Specifically, description 608 optionally now includes information related to the content item corresponding to representation 606-2 (content item B), because representation 606-2 now optionally has the current focus. In the embodiment of FIG. 6B, representation 606-2 optionally corresponds to Michael Jackson's Thriller, and thus description 608 optionally includes that information.

FIG. 6C illustrates further scrolling of representations 606 in accordance with a further input detected by the electronic device. Specifically, another left-to-right swipe input is optionally detected on touch-sensitive surface 451, as illustrated in FIG. 6C. In response to the swipe input, representations 606 are optionally further scrolled to the left, such that representation 606-1 optionally now has the current focus. Description 608 is optionally updated again to include information about the content item corresponding to the representation 606 with current focus—namely, content item A corresponding to representation 606-1. The current-play indicator 610 optionally remains with representation 606-3, as previously discussed.

FIG. 6D illustrates selection of a representation 606 corresponding to a content item that is not currently playing on the electronic device. Specifically, touch-sensitive surface 451 optionally includes a plurality of predefined regions 612, such as a top-left region 612a, a top-center region 612b, and additional such regions as illustrated in FIG. 6D. The electronic device optionally detects a selection input at touch-sensitive surface 451 in FIG. 6D. A selection input optionally corresponds to a click (e.g., contact 603 having an intensity greater than an intensity threshold) detected in center region 612e of touch-sensitive surface 451. In some embodiments, the selection input is a tap (e.g., contact 603 having an intensity less than the intensity threshold) in center region 612e of touch-sensitive surface 451, rather than a click. In response to detecting the selection input at touch-sensitive surface 451, the electronic device optionally starts to play the content item corresponding to the selected representation 606-1—the Spice Girls' Wannabe. Current-play indicator 610 is optionally updated to be displayed with representation 606-1, and the background of the playlist user interface 602 is optionally also updated to correspond to content item A (background A).

In contrast to FIG. 6D, FIGS. 6E-6G illustrate selection of a representation 606 in the playlist user interface 602 corresponding to a content item that is currently playing on the electronic device. For example, starting at FIG. 6B, instead of detecting input to scroll to and select representation 606-1, the electronic device in FIG. 6E optionally detects a right-to-left swipe on touch-sensitive surface 451, as illustrated in FIG. 6E. In response, the electronic device optionally scrolls back to representation 606-3, corresponding to content item C, which is optionally currently-playing on the electronic device. FIG. 6E illustrates representation 606-3 having the current focus in response to the input detected on touch-sensitive surface 451.

In FIG. 6F, the electronic device optionally detects a selection input on touch-sensitive surface 451 (e.g., a click or tap detected in center region 612e of touch-sensitive surface 451) selecting representation 606-3—the representation with the current focus. Because content item C—the content item optionally corresponding to selected representation 606-3—is optionally currently-playing on the electronic device when the selection input is received, the electronic device optionally transitions to a now playing mode in response to detecting the selection input on touch-sensitive surface 451, as illustrated in FIG. 6G. In some embodiments, the electronic device transitions from the now playing mode back to the playlist mode in response to selection of "menu" button 516 on remote 510 in FIG. 5B. Further, in some embodiments, the electronic device transitions from the playlist mode back to the now playing mode in response to further selection of "menu" button 516 on remote 510 in FIG. 5B.

FIG. 6G illustrates an exemplary now playing user interface 603 displayed by the electronic device while in the now playing mode of the electronic device. Specifically, when transitioning from the playlist mode to the now playing mode, the electronic device optionally maintains display of the representation corresponding to the currently-playing content item (representation 606-3, corresponding to content item C), but ceases display of the remaining representations (e.g., representations 606-1, 606-2, 606-4 and 606-5). In some embodiments, description 608 continues to be displayed in the now playing user interface 603. In this way, a user is able to easily determine which content item is playing on the electronic device.

FIG. 6H illustrates display of a progress bar 614 in the now playing user interface 603. Progress bar 614 optionally indicates a current play position in the currently-playing content item—in the embodiment of FIG. 6H, content item C corresponding to representation 606-3. The progress bar 614 optionally includes a current-play position indicator 616 that reflects the current-play position in the currently-playing content item. In some embodiments, the current-play position indicator 616 includes a time display of the current play position (e.g., 23 seconds), and the scrubber bar 614 optionally includes a time display of a total length of the currently-playing content item (e.g., 2 minutes and 10 seconds). In some embodiments, the progress bar is optionally displayed in the now playing user interface 603 in response to a determination that an input device to the electronic device (e.g., remote 510 including touch-sensitive surface 451) has been picked up by a user of the electronic device.

FIG. 6I illustrates scrubbing through the currently-playing content item while in the now playing mode of the electronic device. Specifically, a left-to-right swipe input has been detected on touch-sensitive surface 451, as illustrated in FIG. 6I. In response to detecting the swipe input, the electronic device optionally scrubs through the currently-playing content item, as reflected by the movement of the current-play position indicator 616 from 00:23 to 00:38 (a forward scrubbing of 15 seconds). In some embodiments, the amount and/or speed of scrubbing through the currently-playing content item is dependent on the speed and/or length of the swipe input detected on touch-sensitive surface 451. In some embodiments, while in the now playing mode, no progress bar 614 is displayed in the now playing user interface, and the currently-playing content item is optionally scrubbed as described above despite the lack of progress bar 614 displayed in the now playing user interface 603 (e.g., progress bar 614 is optionally not required to scrub through the currently-playing content item while in the now playing mode of the electronic device).

In some embodiments, the currently-playing content item is optionally also able to be scrubbed while in the playlist mode of the electronic device. FIG. 6J illustrates an exemplary playlist user interface 602, as previously described with reference to FIG. 6A, for example. FIG. 6K illustrates display of a scrubber bar 615 in the playlist user interface 602. An input has optionally been detected on touch-sensitive surface 451 that corresponds to navigation to the scrubber bar 615. Specifically, a downward swipe input has optionally been detected on touch-sensitive surface 451 while a representation 606 had a current focus (e.g., representation 606-3, as illustrated in FIG. 6J). In response to the downward swipe, scrubber bar 615 is optionally displayed in the playlist user interface 602, as illustrated in FIG. 6K, and the scrubber bar 615 is optionally selected (e.g., representation 606-3 optionally no longer has the current focus, as reflected by its reduction in size to match the other representations 606). Scrubber bar 615 optionally has the same structure as progress bar 614 described with reference to FIGS. 6H-6I.

Scrubber bar 615 is optionally usable to scrub through the currently-playing content item (e.g., content item C) while the electronic device is in the playlist mode. FIG. 6L illustrates scrubbing through the currently-playing content item using the scrubber bar 615. While the scrubber bar 615 is selected, a left-to-right swipe input is optionally detected on touch-sensitive surface 451. In response to detecting the input, the currently-playing content item is optionally scrubbed forward in accordance with the swipe input, as reflected by the change in the current-play position indicator 616. A right-to-left swipe detected on touch-sensitive surface 451 optionally correspondingly scrubs backwards through the currently-playing content item.

FIG. 6M illustrates skipping through the currently-playing content item by a predetermined amount while in the playlist mode of the electronic device. While the scrubber bar 615 is selected, a click input is optionally detected in center-right region 612f of touch-sensitive surface 451. In response to detecting the click, the electronic device optionally skips through the currently-playing content item by a predetermined amount (e.g., 10 seconds, as illustrated in FIG. 6M). In some embodiments, a simple click (e.g., contact 603 having an intensity greater than an intensity threshold for less than a predetermined amount of time, such as 0.5 seconds) results in skipping through the currently-playing content item by a predetermined amount, while a click-and-hold (e.g., contact 603 having an intensity greater than the intensity threshold for longer than the predetermined amount of time) results in skipping through the currently-playing content items until the click is released (e.g., until the intensity of the contact falls below the intensity threshold). In some embodiments, a click or click-and-hold in the center-left region 612d of touch-sensitive surface 451 causes backwards skipping through the currently-playing content item, while a click or click-and-hold in the center-right region 612f of touch-sensitive surface 451 causes forwards skipping through the currently-playing content item.

FIGS. 6N and 6O illustrate toggling between playing and pausing the currently-playing content item while in the playlist mode of the electronic device. Specifically, while the scrubber bar 615 is selected, a click detected in center region 612e optionally toggles between playing and pausing the currently-playing content item. In FIG. 6N, a click has optionally been detected in center region 612e of touch-sensitive surface 451. In response, the electronic device has optionally paused playback of content item C—the currently-playing content item. Visual indicator 618 also optionally reflects that the currently-playing content item has been paused. In FIG. 6O, another click has optionally been detected in center region 612e of touch-sensitive surface 451. In response, the electronic device has optionally resumed playback of content item C. Visual indicator 618 also optionally reflects that playback of the currently-playing content item has resumed. In some embodiments, the currently-playing content item is playable and pausable, whether in the now playing mode or the playlist mode of the electronic device, and whether or not scrubber bar 615 is selected in the user interface, in response to selection of "play/pause" button 520 in remote 510 in FIG. 5B, as previously discussed.

In some embodiments, in response to determining that no input has been detected for longer than a predetermined amount of time (e.g., 5, 10 or 20 seconds) at touch-sensitive surface 451, the electronic device optionally determines that a timeout has occurred, and optionally performs specified actions in response. For example, in FIG. 6P, the electronic device is optionally in the playlist mode. Representation 606-1 optionally has the current focus, while content item C, corresponding to representation 606-3, is optionally the currently-playing content item. Optionally, no input has been detected on touch-sensitive surface 451 for longer than a predetermined amount of time (e.g., 5, 10 or 20 seconds).

FIG. 6Q illustrates an exemplary response of the electronic device to the above timeout determination. Specifically, because the representation corresponding to the currently-playing content item optionally did not have the current focus when the above timeout occurred, the electronic device optionally updates the current focus such that the representation corresponding to the currently-playing content item has the current focus in response to the above timeout, as illustrated in FIG. 6Q. In particular, representation 606-3 now optionally has the current focus in response to the above timeout determination.

In some embodiments, another timeout optionally occurs while representation 606-3, corresponding to the currently-playing content item, has the current focus. Specifically, the electronic device optionally determines that no input has been detected at touch-sensitive surface 451 for longer than a predetermined amount of time (e.g., 5, 10 or 20 seconds) while the representation corresponding to the currently-playing content item has the current focus. In response, the electronic device optionally transitions to the now playing mode, as illustrated in FIG. 6R. Therefore, two different timeouts and corresponding actions are optionally implemented by the electronic device (e.g., a timeout to cause the currently-playing content item to have the current focus, and a timeout to transition from the playlist mode to the now playing mode), as described with reference to FIGS. 6P-6R.

In some embodiments, the currently-playing content item is optionally changed while in the now playing mode of the electronic device. FIG. 6S illustrates a contact 603 detected in center-right region 612f of touch-sensitive surface 451 while in the now playing mode of the electronic device. The now playing user interface 603 optionally includes a background corresponding to the currently-playing content item, as previously discussed with reference to FIGS. 6A-6D (e.g., background C, corresponding to content item C, in FIG. 6S). Contact 603 is optionally a contact that does not correspond to a click (e.g., has an intensity less than an intensity threshold required to be a click). Because contact 603 optionally is not a click, the electronic device optionally does not change the currently-playing content item in response to detecting contact 603 in center-right region 612f of touch-sensitive surface 451 while in the now playing mode. Also, as discussed above, the now playing user interface 603 optionally displays a background corresponding to the currently-playing content item—in the embodiment of FIG. 6S, content item C. Thus, in FIG. 6S, the now playing user interface 603 optionally includes background C, and contact 603 detected in center-right region 612f of touch-sensitive surface 451 optionally does not change the background of the now playing user interface 603, because the contact optionally does not change the currently-playing content item, as discussed above.

FIG. 6T illustrates a click detected in center-right region 612f of touch-sensitive surface 451 while in the now playing mode of the electronic device. The click optionally corresponds to contact 603 having an intensity greater than an intensity threshold, as previously discussed. In response to detecting the click in center-right region 612f of touch-sensitive surface 451, the electronic device optionally changes the currently-playing content item from content item C (in FIG. 6S) to content item D (in FIG. 6T). In other words, a click detected in center-right region 612f of touch-sensitive surface 451 optionally results in the electronic device skipping to the next song in the playlist. Analogously, a click detected in center-left region 612d of touch-sensitive surface 451 optionally results in the electronic device skipping to the previous song in the playlist (e.g., content item B, in the embodiments illustrated in the figures). In some embodiments, the electronic device optionally displays skip indicator 620 in the now playing user interface 603 to provide a visual indication that the currently-playing content item is being changed to the next content item in the playlist (or, in the case of a backwards skip, the previous content item in the playlist). Additionally, in some embodiments, the background displayed in the now playing user interface 603 changes along with the change in the currently-playing content item, so that the background continues to correspond to the currently-playing content item. In the embodiment of FIG. 6T, the background optionally changes from background C (in FIG. 6S) to background D (in FIG. 6T).

FIG. 6U illustrates a further click detected in center-right region 612f of touch-sensitive surface 451 while in the now playing mode of the electronic device. In response to the click detected in center-right region 612f of touch-sensitive surface 451, the electronic device optionally again skips forward in the playlist to content item E, corresponding to representation 606-5. Like in FIG. 6T, skip indicator 620 optionally similarly indicates the forward skip through the playlist, and the background is optionally similarly changed from background D (in FIG. 6T) to background E (in FIG. 6U).

In some embodiments, contacts or clicks detected in center-right 612f or center-left 612d regions of touch-sensitive surface while the electronic device is in the playlist mode optionally result in corresponding actions to be taken by the electronic device. FIG. 6V illustrates an exemplary playlist user interface 602, as previously described. Touch-sensitive surface 451 optionally includes a plurality of predefined regions 612, as illustrated in FIG. 6V. In FIG. 6W, the electronic device has optionally detected a contact 603 (e.g., a tap) in center-right region 612f of touch-sensitive surface 451. In response to the contact 603 detected in center-right region 612f of touch-sensitive surface 451, the electronic device optionally shifts the current focus to the right by one, from representation 606-3 to 606-4, without changing the currently-playing content item. A contact detected in center-left region 612d of touch-sensitive surface 451 optionally analogously shifts the current focus to the left by one. Similarly, in FIG. 6X, the electronic device has optionally detected a click in center-right region 612f of touch-sensitive surface 451 (e.g., contact 603 having an intensity greater than an intensity threshold). In response to the click detected in center-right region 612*f* of touch-sensitive surface 451, the electronic device optionally shifts the current focus to the right by one, from representation 606-4 to 606-5, without changing the currently-playing content item. A click detected in center-left region 612*d* of touch-sensitive surface 451 optionally analogously shifts the current focus to the left by one. Thus, either a tap or a click detected in center-right region 612*f* or center-left region 612*d* of touch-sensitive surface 451 while the electronic device is in the playlist mode optionally results in the electronic device moving the current focus to the right or left by one, respectively, without changing the currently-playing content item.

In some embodiments, while in the now playing mode, if the electronic device detects a click (or, in some embodiments, a tap) in center region 612*e* of touch-sensitive surface 451, the electronic device optionally transitions to the playlist mode. FIG. 6Y illustrates the now playing user interface 603 while the electronic device is in the now playing mode. A click has been detected in center region 612*e* of touch-sensitive surface 451. In response, the electronic device optionally transitions to the playlist mode, as illustrated in FIG. 6Z.

In some embodiments, an action menu is optionally accessible from the playlist user interface to perform one or more actions relating to the content item with the current focus in the user interface. FIG. 6AA illustrates an exemplary playlist user interface 602. Representation 606-3, corresponding to content item C, optionally has the current focus. An upward swipe is optionally detected on touch-sensitive surface 451, as illustrated in FIG. 6AA. In response, action menu indicator 622 is optionally displayed in the playlist user interface 622 above the representation 606 with the current focus (e.g., representation 606-3), and the representation with the current focus optionally loses the current focus, which optionally shifts to the action menu indicator 622, as illustrated in FIG. 6BB.

While the action menu indicator 622 has the current focus, the electronic device optionally detects a click in center region 612*e* of touch-sensitive surface 451 to select the action menu indicator 622, as illustrated in FIG. 6BB. In some embodiments, action menu indicator 622 is optionally directly selected from FIG. 6AA by detection of a click in top-center region 612*b* of touch-sensitive surface 451, instead of detection of an upward swipe followed by a click in center region 612*e*. In response to the click input in center region 612*e* of touch-sensitive surface 451 in FIG. 6BB, the electronic device optionally displays action items 624 in an action menu user interface 605, as illustrated in FIG. 6CC. In some embodiments, the action items 624 are overlaid on the playlist user interface 602 illustrated in FIG. 6BB. The action items 624 optionally include a plurality of selectable user interface elements, each element corresponding to an action related to the content item whose representation 606 had the current focus when the action menu indicator 622 was selected (content item C, in the embodiment illustrated in FIG. 6AA). For example, action items 624 optionally include navigating to an album associated with the content item with current focus 624*a*, playing the content item with current focus next 624*b*, adding the content item with current focus to a list of content items up next 624*c*, playing a station of content items associated with the content item with current focus 624*d*, adding the content item with current focus to a library of content items 624*e*, adding the content item with current focus to a playlist 624*f*, and configuring speakers of the first electronic device 624*g*. In some embodiments, selection of action menu indicator 622 in FIG. 6CC (e.g., a click detected in top-center region 612*b* of touch-sensitive surface 451, or navigation to the action menu indicator 622 with an upwards swipe followed by selection of the action menu indicator 622 with a click detected in center region 612*e* of touch-sensitive surface 451) causes the electronic device to return to the playlist user interface 602 (e.g., as illustrated in FIG. 6AA).

FIGS. 7A-7I are flow diagrams illustrating a method 700 of navigating and playing content items available on an electronic device in accordance with some embodiments of the disclosure. The method 700 is optionally performed at an electronic device such as device 100, device 300 or device 500 as described above with reference to FIGS. 1A-1B, 2-3 and 5. Some operations in method 700 are, optionally, combined and/or the order of some operations is, optionally, changed.

As described below, the method 700 provides ways in which a user interacts with a device for playing and navigating content items available on the device. The method reduces the cognitive burden on a user when interacting with a user interface (e.g., a playlist or now playing user interface) of the device of the disclosure, thereby creating a more efficient human-machine interface. For battery-operated electronic devices, increasing the efficiency of the user's interaction with the user interface conserves power and increases the time between battery charges.

In some embodiments, a first electronic device (e.g., device 100, 300 or 500) with a display (e.g., a display device included in or coupled to the first electronic device, such as display 514 in FIG. 5A) and one or more input devices (e.g., one or more input devices included in or coupled to the first electronic device; for example, a second electronic device, such as a remote control, with a touch-sensitive surface, such as remote 510 in FIGS. 5A-5B), during a playlist mode of the first electronic device (e.g., such as in FIG. 6A), displays (702), on the display, a plurality of representations of content items (e.g., music, movies, television shows, etc.) available on the first electronic device (e.g., during the playlist mode, graphics corresponding to the content items available on the first electronic device are optionally displayed, such as in FIG. 6A). In some embodiments, the content items are songs, and the representations of the songs are corresponding album artwork for those songs. In some embodiments, the representations of the content items are displayed along a first axis, such as horizontally, on the display (e.g., as illustrated in FIG. 6A). In some embodiments, while in the playlist mode, the first electronic device receives (704) a first input (e.g., a click or a tap of a touch-sensitive surface of a second electronic device, such as illustrated in FIGS. 6D and 6F), via the one or more input devices, selecting a respective representation of a respective content item from the plurality of representations of content items. In some embodiments, in response to receiving the first input (706), in accordance with a determination that the respective content item was playing on the first electronic device when the first input was received, the first electronic device transitions (708) to a now playing mode of the first electronic device, including: maintaining the display of the respective representation of the respective content item on the display, and ceasing the display of the representations of content items other than the respective representation of the respective content item on the display (e.g., if the content item that was selected was already playing on the first electronic device when it was selected, the first electronic device optionally transitions to a now playing mode in which the representation of the content item that was selected remains on the display, while the other representations of the other content items stop being displayed on the display, such as illustrated in FIGS. 6F-6G). In some embodiments, in accordance with a determination that the respective content item was not playing on the first electronic device when the first input was received (e.g., because a different content item in the playlist was playing instead of the respective content item), the first electronic device plays (710) the respective content item on the first electronic device while remaining in the playlist mode of the first electronic device (e.g., if the content item that was selected was not already playing on the first electronic device when it was selected, the first electronic device optionally remains in the playlist mode in which the representations of the content items remain on the display, and starts playing the selected content item, such as illustrated in FIGS. 6C-6D).

After determining that the respective content item was not playing on the first electronic device when the first input was received and while playing the respective content item on the first electronic device in the playlist mode of the first electronic device in response to receiving the first input, the first electronic device optionally receives (712) a second input, via the one or more input devices, selecting the respective representation of the respective content item (e.g., receiving a second selection of the respective representation of the respective content item, such as a click or a tap of a touch-sensitive surface of a second electronic device). In some embodiments, the first electronic device, in response to receiving the second input, transitions (714) to the now playing mode of the first electronic device, including: maintaining (716) the display of the respective representation of the respective content item on the display, and ceasing (718) the display of the representations of content items other than the respective representation of the respective content item on the display (e.g., the first electronic device optionally transitions to a now playing mode in which the representation of the content item that was selected remains on the display, while the other representations of the other content items stop being displayed on the display, such as illustrated in FIG. 6G).

In some embodiments, while the respective content item is playing on the first electronic device (and, optionally, after receiving the first input), the first electronic device receives (720) a second input comprising a swipe input detected at a touch-sensitive surface of the one or more input devices (e.g., a horizontal swipe detected on the touch-sensitive surface, such as illustrated in FIGS. 6B-6C). In some embodiments, in response to receiving the second input (722), in accordance with a determination that the first electronic device was in the playlist mode when the second input was received, the first electronic device scrolls (724) through the plurality of representations of content items in accordance with the swipe input (e.g., scrolling left through the representations of content items if the swipe is a rightward horizontal swipe, and scrolling right through the representations of content items if the swipe is a leftward horizontal swipe, such as illustrated in FIGS. 6B-6C). In some embodiments, in accordance with a determination that the first electronic device was in the now playing mode when the second input was received, the first electronic device scrubs (726) through the respective content item in accordance with the swipe input (e.g., scrubbing forward through the respective content item if the swipe is a rightward horizontal swipe, and scrubbing backward through the respective content item if the swipe is a leftward horizontal swipe, such as illustrated in FIG. 6I). Therefore, a swipe while in the playlist mode optionally scrolls through the content items available on the first electronic device, while a swipe in the now playing mode optionally scrubs through the currently-playing content item on the first electronic device.

In some embodiments, after receiving the first input and while the respective content item is playing in the playlist mode of the first electronic device, the first electronic device receives (728) a second input comprising a swipe input (e.g., a horizontal swipe) detected at a touch-sensitive surface of the one or more input devices. In some embodiments, in response to receiving the second input (730), in accordance with a determination that the second input comprises navigation to a scrubber bar (e.g., a downward swipe while in the playlist mode that gives a scrubber bar a current focus, such as illustrated in FIG. 6K) before the swipe input, the first electronic device scrubs (732) through the respective content item in accordance with the swipe input (e.g., scrubbing forward through the respective content item if the swipe is a rightward horizontal swipe, and scrubbing backward through the respective content item if the swipe is a leftward horizontal swipe, such as illustrated in FIG. 6L). In some embodiments, in accordance with a determination that the second input does not comprise the navigation to the scrubber bar before the swipe input, the first electronic device scrolls (734) through the plurality of representations of content items in accordance with the swipe input (e.g., scrolling left through the representations of content items if the swipe is a rightward horizontal swipe, and scrolling right through the representations of content items if the swipe is a leftward horizontal swipe, such as illustrated in FIGS. 6B-6C). Therefore, a swipe while in the playlist mode will optionally only scrub through the currently-playing content item if the swipe was inputted while a scrubber bar was selected/activated. In some embodiments, the appearance of the scrubber bar is changed when the scrubber bar is selected. In some embodiments, the scrubber bar is selected in response to a prior input that is detected before detecting the second input (e.g., a separate downward swipe input detected prior to detecting the horizontal swipe input).

In some embodiments, in accordance with the determination that the second input comprises the navigation to the scrubber bar before the swipe input, and while the scrubber bar has a current focus, the first electronic device receives (736) a third input at the touch-sensitive surface of the one or more input devices, the third input comprising a contact having an intensity greater than an intensity threshold detected in a first or a second predefined region of the touch-sensitive surface (e.g., a click in a right or left region of a touch-sensitive surface of a remote control, such as illustrated in FIG. 6M). In some embodiments, in response to receiving the third input (738), in accordance with a determination that the intensity of the contact is greater than the intensity threshold for less than a time threshold (e.g., a click input with a duration less than 0.3, 0.5 or 1 second), the first electronic device skips (740) through the respective content item by a predetermined amount (e.g., in 10, 15 or 30 second intervals) in accordance with whether the contact was detected in the first or the second predefined region of the touch-sensitive surface (e.g., if the click was detected in the left region of the touch-sensitive surface, the first electronic device optionally skips backwards 10 seconds in the currently-playing content item; if the click was detected in the right region of the touch-sensitive surface, the first electronic device optionally skips forwards 10 seconds in the currently-playing content item, such as illustrated in FIG. 6M). In some embodiments, in accordance with a determination that the intensity of the contact is greater than the intensity threshold for greater than the time threshold (e.g., a click-and-hold input with a duration greater than 0.3, 0.5 or 1 second), the first electronic device skips (742) through the respective content item until the intensity of the contact falls below the intensity threshold (e.g., until the click-and-hold is released) in accordance with whether the contact was detected in the first or the second predefined region of the touch-sensitive surface (e.g., if the click-and-hold was detected in the left region of the touch-sensitive surface, the first electronic device optionally skips backwards in the currently-playing content item until the click-and-hold is released; if the click-and-hold was detected in the right region of the touch-sensitive surface, the first electronic device optionally skips forwards in the currently-playing content item until the click-and-hold is released). In some embodiments, the change in intensity is detected with one or more intensity sensors (e.g., pressure sensors) that detect changes in intensity of the contact based on force measurements and/or contact capacitance measurements. In some embodiments, the change in intensity is detected based on a pressure required to depress a mechanical switch.

In some embodiments, after receiving the first input and while the respective content item is playing in the playlist mode of the first electronic device, the first electronic device receives (744) a second input comprising a contact detected in a predefined region of a touch-sensitive surface of the one or more input devices (e.g., a click or a tap detected in a center region of the touch-sensitive surface). In some embodiments, in response to receiving the second input (746), in accordance with a determination that a scrubber bar had current focus when the second input was received, the first electronic device toggles (748) between playing and pausing the respective content item in accordance with the second input (e.g., if the respective content is playing when the click or tap is received, the first electronic device optionally pauses the respective content item, and if the respective content item is paused when the click or tap is received, the first electronic device optionally plays the respective content item, such as illustrated in FIGS. 6N-6O). In some embodiments, in accordance with a determination that the scrubber bar did not have the current focus when the second input was received, the first electronic device forgoes toggling (750) between playing and pausing the respective content item (e.g., switches between the playlist mode and the now playing mode, instead, such as illustrated in FIGS. 6Y-6Z). Therefore, a click or a tap input detected while the scrubber bar has current focus optionally toggles between playing and pausing a currently-playing content item, while a click or a tap input detected while the scrubber bar does not have the current focus optionally does not toggle between playing and pausing the currently-playing content item.

In some embodiments, after receiving the first input and while in the playlist mode of the first electronic device, the first electronic device makes a first determination (752) that a predetermined amount of time (e.g., 5, 10 or 20 seconds) has elapsed without receiving input at the one or more input devices. In some embodiments, in response to the first determination (754), in accordance with a second determination that a content item was playing at the first electronic device when the first determination was made (e.g., a determination that a content item was playing when 5, 10 or 20 seconds had elapsed without receiving input at the input devices), the first electronic device transitions (756) to the now playing mode of the first electronic device, including displaying a representation of the playing content item on the display and ceasing the display of the representations of content items other than the representation of the playing content item on the display, such as illustrated in FIGS. 6P-6R. In some embodiments, in accordance with a third determination that a content item was not playing when the first determination was made, the first electronic device forgoes transitioning (758) to the now playing mode of the first electronic device. Therefore, if a predetermined amount of time elapses (e.g., 5, 10 or 20 seconds) without receiving input, and if a content item is currently playing, the first electronic device optionally transitions to the now playing mode in which the currently playing content item is displayed. If a content item is not playing when the predetermined amount of time elapses (e.g., 5, 10 or 20 seconds) without receiving input, the first electronic device optionally does not transition to the now playing mode.

In some embodiments, after making the first determination that the predetermined amount of time has elapsed without receiving input at the one or more input devices and while playing the playing content item in the now playing mode of the first electronic device, the first electronic device determines (760) that at least one of the input devices has been picked-up by a user (e.g., using outputs from one or more of a gyroscope, an accelerometer, and/or similar components in the input devices, for example, in a remote control). In some embodiments, in response to determining that the at least one of the input devices has been picked up by the user, the first electronic device displays (762) a progress bar on the display in the now playing mode, the progress bar indicating a current play position in the playing content item (e.g., the progress bar is optionally a horizontal graphic with a length corresponding to the length of the playing content item, and a current play position indicator that is positioned in the progress bar at a location corresponding to the current play position in the playing content item, such as illustrated in FIG. 6H). In some embodiments, in response to determining that the one or more input devices have been picked up by a user, the first electronic device optionally also changes an appearance of the representation of the playing content item by, for example, darkening the background on the display.

In some embodiments, after receiving the first input and while playing a currently-playing content item on the first electronic device, the first electronic device receives (764) a second input comprising a tap (e.g., a contact having an intensity less than an intensity threshold for shorter than a time threshold, such as 0.3, 0.5 or 1 second) detected in a first or a second predefined region (e.g., a left or a right region) of a touch-sensitive surface of the one or more input devices. In response to receiving the second input (766), in accordance with a determination that the first electronic device was in the playlist mode when the second input was received, the first electronic device optionally changes (768) a representation of a content item with a current focus in accordance with whether the tap was detected in the first or the second predefined region of the touch-sensitive surface while maintaining the playing of the currently-playing content item on the first electronic device (e.g., moving the current focus through the representations of the content items one-by-one, but not changing the currently-playing content item, such as illustrated in FIG. 6W). For example, if the tap was detected in the left region of the touch-sensitive surface, the current focus is optionally moved to the left by one, and if the tap was detected in the right region of the touch-sensitive surface, the current focus is optionally moved to the right by one. In some embodiments, in accordance with a determination that the first electronic device was in the now playing mode when the second input was received, the first electronic device forgoes changing (770) the representation of the content item with the current focus (e.g., a tap in the left or right region of the touch-sensitive surface while the first electronic device is in the now playing mode optionally does not move a current focus, such as illustrated in FIG. 6S).

In some embodiments, after receiving the first input and while playing a currently-playing content item on the first electronic device, the first electronic device receives (772) a second input comprising a click (e.g., a contact having an intensity greater than an intensity threshold) detected in a first or a second predefined region (e.g., a left or a right region) of a touch-sensitive surface of the one or more input devices. In response to receiving the second input (774), in accordance with a determination that the first electronic device was in the playlist mode when the second input was received, the first electronic device optionally changes (776) a representation of a content item with a current focus in accordance with whether the click was detected in the first or the second predefined region of the touch-sensitive surface while maintaining the playing of the currently-playing content item on the first electronic device (e.g., moving the current focus through the representations of the content items one-by-one, but not changing the currently-playing content item, such as illustrated in FIG. 6X). For example, if the click was detected in the left region of the touch-sensitive surface, the current focus is optionally moved to the left by one, and if the click was detected in the right region of the touch-sensitive surface, the current focus is optionally moved to the right by one. In some embodiments, in accordance with a determination that the first electronic device was in the now playing mode when the second input was received, the first electronic device changes (778) the currently-playing content item in accordance with whether the click was detected in the first or the second predefined region of the touch-sensitive surface (e.g., changing the currently-playing content item one-by-one, such as illustrated in FIGS. 6T-6U). For example, if the click was detected in the left region of the touch-sensitive surface, the content item previous to the currently-playing content item in the playlist is optionally played, and if the click was detected in the right region of the touch-sensitive surface, the content item after the currently-playing content item in the playlist is optionally played.

In some embodiments, after receiving the first input and while in the now playing mode of the first electronic device, the first electronic device receives (780) a second input via the one or more input devices. In response to receiving the second input (782), in accordance with a determination that the second input comprises a click or a tap detected in a predefined region (e.g., a center region) of a touch-sensitive surface of the one or more input devices, the first electronic device optionally transitions (784) to the playlist mode of the first electronic device (e.g., a center click or tap while in the now playing mode optionally transitions the first electronic device to the playlist mode, such as illustrated in FIGS. 6Y-6Z), and in accordance with a determination that the second input does not comprise a click or a tap detected in the predefined region of the touch-sensitive surface of the one or more input devices, the first electronic device optionally maintains (786) display of the now playing mode of the electronic device (e.g., does not transition to the playlist mode, but rather remains in the now playing mode).

In some embodiments, after receiving the first input and while in the playlist mode of the first electronic device, the first electronic device receives (788) a second input, via the one or more input devices, corresponding to navigation to an action menu including a plurality of actions that can be performed related to a content item with current focus (e.g., the navigation to the action menu optionally comprises an upward swipe on a touch-sensitive surface of the one or more input devices, such as illustrated in FIG. 6AA). Selection of the action menu is optionally accomplished by selection of the action menu after navigating to the action menu, such as illustrated in FIG. 6BB. In some embodiments, the navigation to the action menu optionally comprises a click in a top region of the touch-sensitive surface (e.g., region 612b of touch-sensitive surface 451 in FIG. 6BB). The actions optionally include actions such as navigating to an album associated with the content item with current focus, playing the content item with current focus next, adding the content item with current focus to a list of content items up next, starting playing a station of content items associated with the content item with current focus, adding the content item with current focus to a library of content items, adding the content item with current focus to a playlist, and configuring speakers of the first electronic device, such as illustrated in FIG. 6CC. After receiving the second input (790), the first electronic device optionally receives (792) a third input (e.g., a click or a tap on the touch-sensitive surface of the one or more input devices) selecting a respective action of the plurality of actions, and optionally performs (794) the selected action with respect to the content item with current focus (e.g., content item 606-3 in FIG. 6AA).

In some embodiments, after receiving the first input and while playing a currently-playing content item in the now playing mode of the first electronic device, the first electronic device displays (796) a background on the display (e.g., a background behind a representation of the currently-playing content item) that comprises a combination of two versions of artwork for the currently-playing content item (e.g., album artwork for the currently-playing content item), the two versions of the artwork being visually manipulated (e.g., rotating and scaling) at different rates (e.g., the combination is optionally a union of two instances of the same artwork for the currently-playing content item, the two instances rotating at different rates, and/or scaling larger and smaller at different rates). In some embodiments, the artwork is the same artwork as displayed in the representation of the currently-playing content item displayed on the display.

In some embodiments, after receiving the first input and while playing a currently-playing content item, the first electronic device receives (798) a second input via the one or more input devices. In response to receiving the second input (798-2), in accordance with a determination that the second input corresponds to a request to change the currently-playing content item (e.g., a click in a right or left region of a touch-sensitive surface of the one or more input devices while in the now playing mode, such as illustrated in FIGS. 6S-6U, or a selection of a not currently-playing content item while in the playlist mode, such as illustrated in FIGS. 6C-6D), the first electronic device optionally changes (798-4) the currently-playing content item in accordance with the second input and switches a background of the display (e.g., switching to a background based on artwork associated with the new currently-playing content item, such as illustrated in FIGS. 6C-6D and 6S-6U), and in accordance with a determination that the second input corresponds to a request to change a representation of a content item with a current focus (e.g., as illustrated in FIGS. 6A-6C), the first electronic device optionally changes (798-6) the representation of the content item with the current focus without switching the background of the display, such as in FIGS. 6A-6C (e.g., the background of the display is optionally only changed when the content item playing on the first electronic device is changed).

In some embodiments, after receiving the first input and while playing a currently-playing content item in the playlist mode of the first electronic device, the first electronic device makes a first determination (798-8) that a predetermined amount of time (e.g., 5, 10 or 20 seconds) has elapsed without receiving input at the one or more input devices, and in response to the first determination, in accordance with a determination that a representation of the currently-playing content item did not have a current focus when the first determination was made, the first electronic device shifts (798-10) the current focus to the representation of the currently-playing content item (e.g., bringing the current focus back to the representation of the currently-playing content item if more than a predetermined amount of time (e.g., 5, 10 or 20 seconds) has elapsed without receiving input while in the playlist mode, such as illustrated in FIGS. 6P-6Q). Thus, in some embodiments, if a representation of a non-playing content item has the current focus, after a first timeout the focus shifts back to the currently-playing content item while remaining in the playlist mode, such as illustrated in FIGS. 6P-6Q, and after a second timeout, the device shifts to the now playing mode, such as illustrated in FIGS. 6Q-6R.

It should be understood that the particular order in which the operations in FIGS. 7A-7I have been described is merely exemplary and is not intended to indicate that the described order is the only order in which the operations could be performed. One of ordinary skill in the art would recognize various ways to reorder the operations described herein. Additionally, the operations in the information processing methods described above are, optionally, implemented by running one or more functional modules in an information processing apparatus such as general purpose processors (e.g., as described above with respect to FIGS. 1A and 3) or application specific chips.

Figure 8:
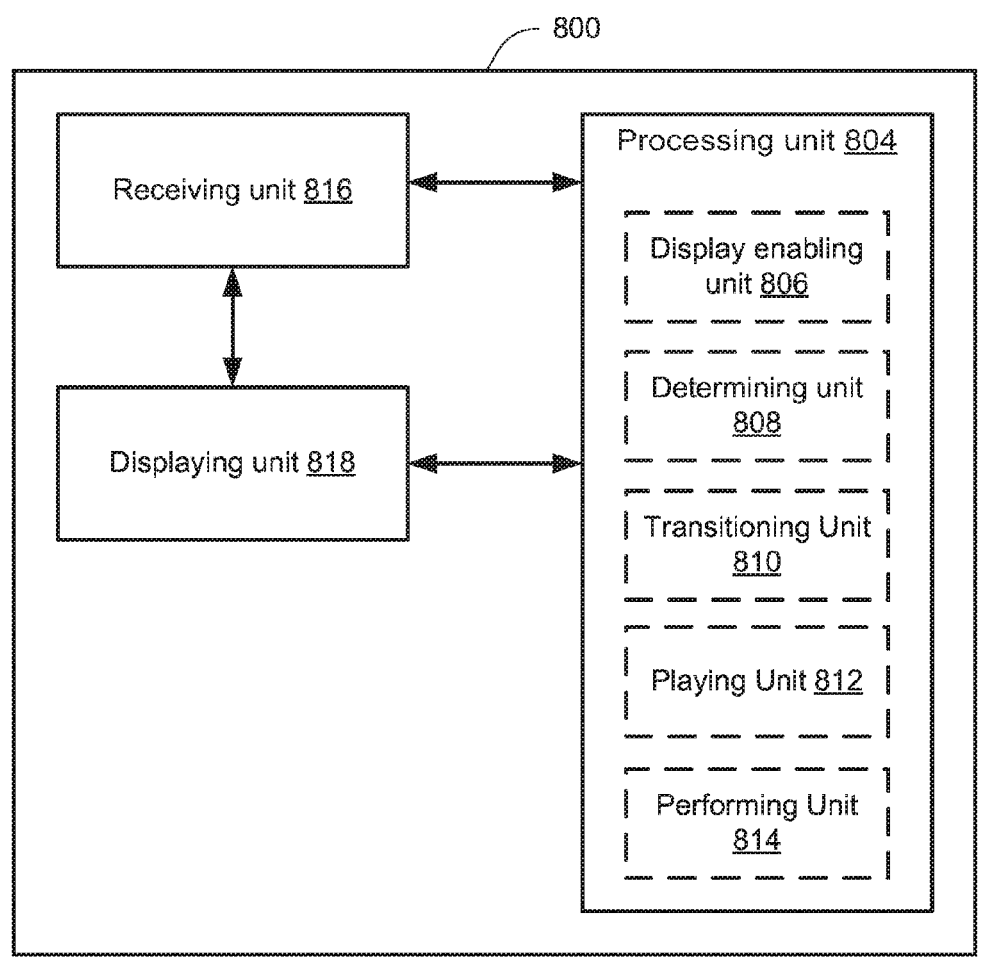
FIG. 8 is a functional block diagram of an electronic device in accordance with some embodiments of the disclosure.

In accordance with some embodiments, FIG. 8 shows a functional block diagram of a first electronic device 800 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 8 are, optionally, combined or separated into sub-blocks to implement the principles of the various described embodiments. Therefore, the description herein optionally supports any possible combination or separation or further definition of the functional blocks described herein.

As shown in FIG. 8, a first electronic device 800 optionally includes a receiving unit 816 configured to receive inputs, a displaying unit 818 coupled to the receiving unit 816 and configured to display content, and a processing unit 804 coupled to each of the receiving unit 816 and the displaying unit 818. In some embodiments, the processing unit 804 includes a display enabling unit 806, a determining unit 808, a transitioning unit 810, a playing unit 812 and a performing unit 814.

In some embodiments, the receiving unit 816 is configured to, while in a playlist mode of the first electronic device 800, receive a first input, via one or more input devices, selecting a respective representation of a respective content item from a plurality of representations of content items, displayed on a display (e.g., displaying unit 818), available on the first electronic device. In some embodiments, the processing unit 804 is configured to, during the playlist mode of the first electronic device, display (e.g., with the display enabling unit 806), on the display (e.g., displaying unit 818), the plurality of representations of content items available on the first electronic device, and in response to receiving the first input (e.g., with the receiving unit 816): in accordance with a determination (e.g., with the determining unit 808) that the respective content item was playing on the first electronic device when the first input was received, transition (e.g., with the transitioning unit 810) to a now playing mode of the first electronic device, including: maintaining the display (e.g., with the display enabling unit 806) of the respective representation of the respective content item on the display (e.g., displaying unit 818), and ceasing the display (e.g., with the display enabling unit 806) of the representations of content items other than the respective representation of the respective content item on the display (e.g., displaying unit 818). In some embodiments, the processing unit 804 is configured to, in accordance with a determination (e.g., with the determining unit 808) that the respective content item was not playing on the first electronic device when the first input was received, play (e.g., with the playing unit 812) the respective content item on the first electronic device while remaining in the playlist mode of the first electronic device.

In some embodiments, the receiving unit 816 is further configured to, after determining (e.g., with the determining unit 808) that the respective content item was not playing on the first electronic device (e.g., first electronic device 800) when the first input was received and while playing (e.g., with the playing unit 812) the respective content item on the first electronic device in the playlist mode of the first electronic device in response to receiving the first input, receive a second input, via the one or more input devices, selecting the respective representation of the respective content item. In some embodiments, the processing unit 804 is further configured to, in response to receiving the second input (e.g., with the receiving unit 816): transition (e.g., with the transitioning unit 810) to the now playing mode of the first electronic device, including: maintaining the display (e.g., with the display enabling unit 806) of the respective representation of the respective content item on the display (e.g., displaying unit 818), and ceasing the display (e.g., with the display enabling unit 806) of the representations of content items other than the respective representation of the respective content item on the display (e.g., displaying unit 818).

In some embodiments, the receiving unit 816 is further configured to while the respective content item is playing (e.g., with the playing unit 812) on the first electronic device (e.g., first electronic device 800), receive a second input comprising a swipe input detected at a touch-sensitive surface of the one or more input devices. In some embodiments, the processing unit 804 is further configured to, in response to receiving the second input (e.g., with the receiving unit 816): in accordance with a determination (e.g., with the determining unit 808) that the first electronic device was in the playlist mode when the second input was received, scroll (e.g., with the display enabling unit 806) through the plurality of representations of content items in accordance with the swipe input, and in accordance with a determination (e.g., with the determining unit 808) that the first electronic device was in the now playing mode when the second input was received, scrub (e.g., with the playing unit 812) through the respective content item in accordance with the swipe input.

In some embodiments, the receiving unit 816 is further configured to, after receiving the first input and while the respective content item is playing (e.g., with the playing unit 812) in the playlist mode of the first electronic device (e.g., first electronic device 800), receive a second input comprising a swipe input detected at a touch-sensitive surface of the one or more input devices. In some embodiments, the processing unit 804 is further configured to, in response to receiving the second input (e.g., with the receiving unit 816): in accordance with a determination (e.g., with the determining unit 808) that the second input comprises navigation to a scrubber bar before the swipe input, scrub (e.g., with the playing unit 812) through the respective content item in accordance with the swipe input, and in accordance with a determination (e.g., with the determining unit 808) that the second input does not comprise the navigation to the scrubber bar before the swipe input, scroll (e.g., with the display enabling unit 806) through the plurality of representations of content items in accordance with the swipe input.

In some embodiments, the receiving unit 816 is further configured to, in accordance with the determination (e.g., with the determining unit 808) that the second input comprises the navigation to the scrubber bar before the swipe input, and while the scrubber bar has a current focus, receive a third input at the touch-sensitive surface of the one or more input devices, the third input comprising a contact having an intensity greater than an intensity threshold detected in a first or a second predefined region of the touch-sensitive surface. In some embodiments, the processing unit 804 is further configured to, in response to receiving the third input (e.g., with the receiving unit 816): in accordance with a determination (e.g., with the determining unit 808) that the intensity of the contact is greater than the intensity threshold for less than a time threshold, skip (e.g., with the playing unit 812) through the respective content item by a predetermined amount in accordance with whether the contact was detected in the first or the second predefined region of the touch-sensitive surface, and in accordance with a determination (e.g., with the determining unit 808) that the intensity of the contact is greater than the intensity threshold for greater than the time threshold, skip (e.g., with the playing unit 812) through the respective content item until the intensity of the contact falls below the intensity threshold in accordance with whether the contact was detected in the first or the second predefined region of the touch-sensitive surface.

In some embodiments, the receiving unit 816 is further configured to, after receiving the first input and while the respective content item is playing (e.g., with the playing unit 812) in the playlist mode of the first electronic device (e.g., first electronic device 800), receive a second input comprising a contact detected in a predefined region of a touch-sensitive surface of the one or more input devices. In some embodiments, the processing unit 804 is further configured to, in response to receiving the second input (e.g., with the receiving unit 816): in accordance with a determination (e.g., with the determining unit 808) that a scrubber bar had current focus when the second input was received, toggle (e.g., with the playing unit 812) between playing and pausing the respective content item in accordance with the second input, and in accordance with a determination (e.g., with the determining unit 808) that the scrubber bar did not have the current focus when the second input was received, forgo toggling (e.g., with the playing unit 812) between playing and pausing the respective content item.

In some embodiments, the processing unit 804 is further configured to, after receiving the first input (e.g., with the receiving unit 816) and while in the playlist mode of the first electronic device (e.g., first electronic device 800), make a first determination (e.g., with the determining unit 808) that a predetermined amount of time has elapsed without receiving input at the one or more input devices. In some embodiments, the processing unit 804 is further configured to, in response to the first determination (e.g., with the determining unit 808): in accordance with a second determination (e.g., with the determining unit 808) that a content item was playing at the first electronic device when the first determination was made, transition (e.g., with the transitioning unit 810) to the now playing mode of the first electronic device, including displaying (e.g., with the display enabling unit 806) a representation of the playing content item on the display (e.g., the displaying unit 818) and ceasing the display (e.g., with the display enabling unit 806) of the representations of content items other than the representation of the playing content item on the display (e.g., the displaying unit 818). In some embodiments, the processing unit 804 is further configured to, in accordance with a third determination (e.g., with the determining unit 808) that a content item was not playing when the first determination was made, forgo transitioning (e.g., with the transitioning unit 810) to the now playing mode of the first electronic device.

In some embodiments, the processing unit 804 is further configured to, after making the first determination (e.g., with the determining unit 808) that the predetermined amount of time has elapsed without receiving (e.g., with the receiving unit 816) input at the one or more input devices and while playing (e.g., with the playing unit 812) the playing content item in the now playing mode of the first electronic device (e.g., first electronic device 800), determine (e.g., with the determining unit 808) that at least one of the input devices has been picked-up by a user. In some embodiments, the processing unit 804 is further configured to, in response to determining (e.g., with the determining unit 808) that the at least one of the input devices has been picked up by the user, display (e.g., with the display enabling unit 806) a progress bar on the display (e.g., displaying unit 818) in the now playing mode, the progress bar indicating a current play position in the playing content item.

In some embodiments, the receiving unit 816 is further configured to, after receiving the first input and while playing (e.g., with the playing unit 812) a currently-playing content item on the first electronic device (e.g., first electronic device 800), receive a second input comprising a tap detected in a first or a second predefined region of a touch-sensitive surface of the one or more input devices. In some embodiments, the processing unit 804 is further configured to, in response to receiving the second input (e.g., with the receiving unit 816): in accordance with a determination (e.g., with the determining unit 808) that the first electronic device was in the playlist mode when the second input was received, change (e.g., with the display enabling unit 806) a representation of a content item with a current focus in accordance with whether the tap was detected in the first or the second predefined region of the touch-sensitive surface while maintaining the playing (e.g., with the playing unit 812) of the currently-playing content item on the first electronic device, and in accordance with a determination (e.g., with the determining unit 808) that the first electronic device was in the now playing mode when the second input was received, forgo changing (e.g., with the display enabling unit 806) the representation of the content item with the current focus.

In some embodiments, the receiving unit 816 is further configured to, after receiving the first input and while playing (e.g., with the playing unit 812) a currently-playing content item on the first electronic device (e.g., first electronic device 800), receive a second input comprising a click detected in a first or a second predefined region of a touch-sensitive surface of the one or more input devices. In some embodiments, the processing unit 804 is further configured to, in response to receiving the second input (e.g., with the receiving unit 816): in accordance with a determination (e.g., with the determining unit 808) that the first electronic device was in the playlist mode when the second input was received, change (e.g., with the display enabling unit 806) a representation of a content item with a current focus in accordance with whether the click was detected in the first or the second predefined region of the touch-sensitive surface while maintaining the playing (e.g., with the playing unit 812) of the currently-playing content item on the first electronic device, and in accordance with a determination (e.g., with the determining unit 808) that the first electronic device was in the now playing mode when the second input was received, change (e.g., with the playing unit 812) the currently-playing content item in accordance with whether the click was detected in the first or the second predefined region of the touch-sensitive surface.

In some embodiments, the receiving unit 816 is further configured to, after receiving the first input and while in the now playing mode of the first electronic device (e.g., first electronic device 800), receive a second input via the one or more input devices. In some embodiments, the processing unit 804 is further configured to, in response to receiving the second input (e.g., with the receiving unit 816): in accordance with a determination (e.g., with the determining unit 808) that the second input comprises a click or a tap detected in a predefined region of a touch-sensitive surface of the one or more input devices, transition (e.g., with the transitioning unit 810) to the playlist mode of the first electronic device, and in accordance with a determination (e.g., with the determining unit 808) that the second input does not comprise a click or a tap detected in the predefined region of the touch-sensitive surface of the one or more input devices, maintain display of the now playing mode of the electronic device.

In some embodiments, the receiving unit 816 is further configured to: after receiving the first input and while in the playlist mode of the first electronic device (e.g., first electronic device 800), receive a second input, via the one or more input devices, corresponding to navigation to an action menu including a plurality of actions that can be performed related to a content item with current focus, and after receiving the second input, receive a third input selecting a respective action of the plurality of actions. In some embodiments, the processing unit 804 is further configured to perform (e.g., with the performing unit 814) the selected action with respect to the content item with current focus. In some embodiments, the processing unit 804 is further configured to, after receiving (e.g., with the receiving unit 816) the first input and while playing (e.g., with the playing unit 812) a currently-playing content item in the now playing mode of the first electronic device, display (e.g., with the display enabling unit 806) a background on the display (e.g., the displaying unit 818) that comprises a combination of two versions of artwork for the currently-playing content item, the two versions of the artwork being visually manipulated at different rates.

In some embodiments, the receiving unit 816 is further configured to, after receiving the first input and while playing (e.g., with the playing unit 812) a currently-playing content item, receive a second input via the one or more input devices. In some embodiments, the processing unit 804 is further configured to, in response to receiving the second input (e.g., with the receiving unit 816): in accordance with a determination (e.g., with the determining unit 808) that the second input corresponds to a request to change the currently-playing content item, change (e.g., with the playing unit 812) the currently-playing content item in accordance with the second input and switch (e.g., with the display enabling unit 806) a background of the display (e.g., the displaying unit 818), and in accordance with a determination (e.g., with the determining unit 808) that the second input corresponds to a request to change a representation of a content item with a current focus, change (e.g., with the display enabling unit 806) the representation of the content item with the current focus without switching (e.g., with the display enabling unit 806) the background of the display (e.g., the displaying unit 818).

In some embodiments, the processing unit 804 is further configured to: after receiving (e.g., with the receiving unit 816) the first input and while playing (e.g., with the playing unit 812) a currently-playing content item in the playlist mode of the first electronic device (e.g., first electronic device 800), make a first determination (e.g., with the determining unit 808) that a predetermined amount of time has elapsed without receiving input at the one or more input devices, and in response to the first determination, in accordance with a determination (e.g., with the determining unit 808) that a representation of the currently-playing content item did not have a current focus when the first determination was made, shift (e.g., with the display enabling unit 806) the current focus to the representation of the currently-playing content item.

The operations described above with reference to FIGS. 7A-7I are, optionally, implemented by components depicted in FIGS. 1A-1B and 8. For example, displaying operation 702, receiving operation 704, transitioning operation 708 and playing operation 710 are, optionally, implemented by event sorter 170, event recognizer 180, and event handler 190. Event monitor 171 in event sorter 170 detects a contact on touch-sensitive display 112 (or detects another input, such as an air gesture input or an input from a remote control if the electronic device does not have a touch-sensitive display, for example), and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B and 8.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A first electronic device, comprising:
one or more processors;
memory;
a display;
one or more input devices; and
one or more programs, wherein the one or more programs are stored in the memory and configured to be executed by the one or more processors, the one or more programs including instructions for:
during a playlist mode of the first electronic device, displaying, on the display, a plurality of representations of content items available on the first electronic device;
while in the playlist mode, receiving a first input, via the one or more input devices, selecting a respective representation of a respective content item from the plurality of representations of content items; and
in response to receiving the first input:
in accordance with a determination that the respective content item was playing on the first electronic device when the first input was received, transitioning to a now playing mode of the first electronic device, including:
maintaining the display of the respective representation of the respective content item on the display; and
ceasing the display of the representations of content items other than the respective representation of the respective content item on the display; and
in accordance with a determination that the respective content item was not playing on the first electronic device when the first input was received, playing the respective content item on the first electronic device while remaining in the playlist mode of the first electronic device.

2. The first electronic device of claim 1, wherein the one or more programs further include instructions for:
after determining that the respective content item was not playing on the first electronic device when the first input was received and while playing the respective content item on the first electronic device in the playlist mode of the first electronic device in response to receiving the first input, receiving a second input, via the one or more input devices, selecting the respective representation of the respective content item; and
in response to receiving the second input, transitioning to the now playing mode of the first electronic device, including:
maintaining the display of the respective representation of the respective content item on the display; and
ceasing the display of the representations of content items other than the respective representation of the respective content item on the display.

3. The first electronic device of claim 1, wherein the one or more programs further include instructions for:
while the respective content item is playing on the first electronic device, receiving a second input comprising a swipe input detected at a touch-sensitive surface of the one or more input devices; and
in response to receiving the second input:
in accordance with a determination that the first electronic device was in the playlist mode when the second input was received, scrolling through the plurality of representations of content items in accordance with the swipe input; and
in accordance with a determination that the first electronic device was in the now playing mode when the second input was received, scrubbing through the respective content item in accordance with the swipe input.

4. The first electronic device of claim 1, wherein the one or more programs further include instructions for:
after receiving the first input and while the respective content item is playing in the playlist mode of the first electronic device, receiving a second input comprising a swipe input detected at a touch-sensitive surface of the one or more input devices; and
in response to receiving the second input:
in accordance with a determination that the second input comprises navigation to a scrubber bar before the swipe input, scrubbing through the respective content item in accordance with the swipe input; and
in accordance with a determination that the second input does not comprise the navigation to the scrubber bar before the swipe input, scrolling through the plurality of representations of content items in accordance with the swipe input.

5. The first electronic device of claim 4, wherein the one or more programs further include instructions for:
in accordance with the determination that the second input comprises the navigation to the scrubber bar before the swipe input, and while the scrubber bar has a current focus, receiving a third input at the touch-sensitive surface of the one or more input devices, the third input comprising a contact having an intensity greater than an intensity threshold detected in a first or a second predefined region of the touch-sensitive surface; and
in response to receiving the third input:
in accordance with a determination that the intensity of the contact is greater than the intensity threshold for less than a time threshold, skipping through the respective content item by a predetermined amount in accordance with whether the contact was detected in the first or the second predefined region of the touch-sensitive surface; and
in accordance with a determination that the intensity of the contact is greater than the intensity threshold for greater than the time threshold, skipping through the respective content item until the intensity of the contact falls below the intensity threshold in accordance with whether the contact was detected in the first or the second predefined region of the touch-sensitive surface.

6. The first electronic device of claim 1, wherein the one or more programs further include instructions for:
after receiving the first input and while the respective content item is playing in the playlist mode of the first electronic device, receiving a second input comprising a contact detected in a predefined region of a touch-sensitive surface of the one or more input devices; and
in response to receiving the second input:
in accordance with a determination that a scrubber bar had current focus when the second input was received, toggling between playing and pausing the respective content item in accordance with the second input; and in accordance with a determination that the scrubber bar did not have the current focus when the second input was received, forgoing toggling between playing and pausing the respective content item.

7. The first electronic device of claim 1, wherein the one or more programs further include instructions for:
after receiving the first input and while in the playlist mode of the first electronic device, making a first determination that a predetermined amount of time has elapsed without receiving input at the one or more input devices; and
in response to the first determination:
in accordance with a second determination that a content item was playing at the first electronic device when the first determination was made, transitioning to the now playing mode of the first electronic device, including displaying a representation of the playing content item on the display and ceasing the display of the representations of content items other than the representation of the playing content item on the display; and
in accordance with a third determination that a content item was not playing when the first determination was made, forgoing transitioning to the now playing mode of the first electronic device.

8. The first electronic device of claim 7, wherein the one or more programs further include instructions for:
after making the first determination that the predetermined amount of time has elapsed without receiving input at the one or more input devices and while playing the playing content item in the now playing mode of the first electronic device, determining that at least one of the input devices has been picked-up by a user; and
in response to determining that the at least one of the input devices has been picked up by the user, displaying a progress bar on the display in the now playing mode, the progress bar indicating a current play position in the playing content item.

9. The first electronic device of claim 1, wherein the one or more programs further include instructions for:
after receiving the first input and while playing a currently-playing content item on the first electronic device, receiving a second input comprising a tap detected in a first or a second predefined region of a touch-sensitive surface of the one or more input devices; and
in response to receiving the second input:
in accordance with a determination that the first electronic device was in the playlist mode when the second input was received, changing a representation of a content item with a current focus in accordance with whether the tap was detected in the first or the second predefined region of the touch-sensitive surface while maintaining the playing of the currently-playing content item on the first electronic device; and
in accordance with a determination that the first electronic device was in the now playing mode when the second input was received, forgoing changing the representation of the content item with the current focus.

10. The first electronic device of claim 1, wherein the one or more programs further include instructions for:
after receiving the first input and while playing a currently-playing content item on the first electronic device, receiving a second input comprising a click detected in a first or a second predefined region of a touch-sensitive surface of the one or more input devices; and
in response to receiving the second input:
in accordance with a determination that the first electronic device was in the playlist mode when the second input was received, changing a representation of a content item with a current focus in accordance with whether the click was detected in the first or the second predefined region of the touch-sensitive surface while maintaining the playing of the currently-playing content item on the first electronic device; and
in accordance with a determination that the first electronic device was in the now playing mode when the second input was received, changing the currently-playing content item in accordance with whether the click was detected in the first or the second predefined region of the touch-sensitive surface.

11. The first electronic device of claim 1, wherein the one or more programs further include instructions for:
after receiving the first input and while in the now playing mode of the first electronic device, receiving a second input via the one or more input devices; and
in response to receiving the second input:
in accordance with a determination that the second input comprises a click or a tap detected in a predefined region of a touch-sensitive surface of the one or more input devices, transitioning to the playlist mode of the first electronic device; and
in accordance with a determination that the second input does not comprise a click or a tap detected in the predefined region of the touch-sensitive surface of the one or more input devices, maintaining display of the now playing mode of the electronic device.

12. The first electronic device of claim 1, wherein the one or more programs further include instructions for:
after receiving the first input and while in the playlist mode of the first electronic device, receiving a second input, via the one or more input devices, corresponding to navigation to an action menu including a plurality of actions that can be performed related to a content item with current focus; and
after receiving the second input:
receiving a third input selecting a respective action of the plurality of actions; and
performing the selected action with respect to the content item with current focus.

13. The first electronic device of claim 1, wherein the one or more programs further include instructions for:
after receiving the first input and while playing a currently-playing content item in the now playing mode of the first electronic device, displaying a background on the display that comprises a combination of two versions of artwork for the currently-playing content item, the two versions of the artwork being visually manipulated at different rates.

14. The first electronic device of claim 1, wherein the one or more programs further include instructions for:
after receiving the first input and while playing a currently-playing content item, receiving a second input via the one or more input devices; and
in response to receiving the second input:
in accordance with a determination that the second input corresponds to a request to change the currently-playing content item, changing the currently-playing content item in accordance with the second input and switching a background of the display; and in accordance with a determination that the second input corresponds to a request to change a representation of a content item with a current focus, changing the representation of the content item with the current focus without switching the background of the display.

15. The first electronic device of claim 1, wherein the one or more programs further include instructions for:

after receiving the first input and while playing a currently-playing content item in the playlist mode of the first electronic device, making a first determination that a predetermined amount of time has elapsed without receiving input at the one or more input devices; and in response to the first determination, in accordance with a determination that a representation of the currently-playing content item did not have a current focus when the first determination was made, shifting the current focus to the representation of the currently-playing content item.

16. A method comprising:

at a first electronic device with a display and one or more input devices:

during a playlist mode of the first electronic device, displaying, on the display, a plurality of representations of content items available on the first electronic device;

while in the playlist mode, receiving a first input, via the one or more input devices, selecting a respective representation of a respective content item from the plurality of representations of content items; and in response to receiving the first input:

in accordance with a determination that the respective content item was playing on the first electronic device when the first input was received, transitioning to a now playing mode of the first electronic device, including:

maintaining the display of the respective representation of the respective content item on the display; and ceasing the display of the representations of content items other than the respective representation of the respective content item on the display; and in accordance with a determination that the respective content item was not playing on the first electronic device when the first input was received, playing the respective content item on the first electronic device while remaining in the playlist mode of the first electronic device.

17. A non-transitory computer readable storage medium storing one or more programs, the one or more programs comprising instructions, which when executed by one or more processors of a first electronic device with a display and one or more input devices, cause the first electronic device to:

during a playlist mode of the first electronic device, display, on the display, a plurality of representations of content items available on the first electronic device;

while in the playlist mode, receive a first input, via the one or more input devices, selecting a respective representation of a respective content item from the plurality of representations of content items; and in response to receiving the first input:

in accordance with a determination that the respective content item was playing on the first electronic device when the first input was received, transition to a now playing mode of the first electronic device, including:

maintaining the display of the respective representation of the respective content item on the display; and ceasing the display of the representations of content items other than the respective representation of the respective content item on the display; and in accordance with a determination that the respective content item was not playing on the first electronic device when the first input was received, play the respective content item on the first electronic device while remaining in the playlist mode of the first electronic device.

18. The method of claim 16, further comprising:

after determining that the respective content item was not playing on the first electronic device when the first input was received and while playing the respective content item on the first electronic device in the playlist mode of the first electronic device in response to receiving the first input, receiving a second input, via the one or more input devices, selecting the respective representation of the respective content item; and in response to receiving the second input, transitioning to the now playing mode of the first electronic device, including:

maintaining the display of the respective representation of the respective content item on the display; and ceasing the display of the representations of content items other than the respective representation of the respective content item on the display.

19. The method of claim 16, further comprising:

while the respective content item is playing on the first electronic device, receiving a second input comprising a swipe input detected at a touch-sensitive surface of the one or more input devices; and in response to receiving the second input:

in accordance with a determination that the first electronic device was in the playlist mode when the second input was received, scrolling through the plurality of representations of content items in accordance with the swipe input; and in accordance with a determination that the first electronic device was in the now playing mode when the second input was received, scrubbing through the respective content item in accordance with the swipe input.

20. The method of claim 16, further comprising:

after receiving the first input and while the respective content item is playing in the playlist mode of the first electronic device, receiving a second input comprising a swipe input detected at a touch-sensitive surface of the one or more input devices; and in response to receiving the second input:

in accordance with a determination that the second input comprises navigation to a scrubber bar before the swipe input, scrubbing through the respective content item in accordance with the swipe input; and in accordance with a determination that the second input does not comprise the navigation to the scrubber bar before the swipe input, scrolling through the plurality of representations of content items in accordance with the swipe input.

21. The method of claim 20, further comprising:

in accordance with the determination that the second input comprises the navigation to the scrubber bar before the swipe input, and while the scrubber bar has a current focus, receiving a third input at the touch-sensitive surface of the one or more input devices, the third input comprising a contact having an intensity greater than an intensity threshold detected in a first or a second predefined region of the touch-sensitive surface; and in response to receiving the third input:
  in accordance with a determination that the intensity of the contact is greater than the intensity threshold for less than a time threshold, skipping through the respective content item by a predetermined amount in accordance with whether the contact was detected in the first or the second predefined region of the touch-sensitive surface; and
  in accordance with a determination that the intensity of the contact is greater than the intensity threshold for greater than the time threshold, skipping through the respective content item until the intensity of the contact falls below the intensity threshold in accordance with whether the contact was detected in the first or the second predefined region of the touch-sensitive surface.

22. The method of claim 16, further comprising:
after receiving the first input and while the respective content item is playing in the playlist mode of the first electronic device, receiving a second input comprising a contact detected in a predefined region of a touch-sensitive surface of the one or more input devices; and
in response to receiving the second input:
  in accordance with a determination that a scrubber bar had current focus when the second input was received, toggling between playing and pausing the respective content item in accordance with the second input; and
  in accordance with a determination that the scrubber bar did not have the current focus when the second input was received, forgoing toggling between playing and pausing the respective content item.

23. The method of claim 16, further comprising:
after receiving the first input and while in the playlist mode of the first electronic device, making a first determination that a predetermined amount of time has elapsed without receiving input at the one or more input devices; and
in response to the first determination:
  in accordance with a second determination that a content item was playing at the first electronic device when the first determination was made, transitioning to the now playing mode of the first electronic device, including displaying a representation of the playing content item on the display and ceasing the display of the representations of content items other than the representation of the playing content item on the display; and
  in accordance with a third determination that a content item was not playing when the first determination was made, forgoing transitioning to the now playing mode of the first electronic device.

24. The method of claim 23, further comprising:
after making the first determination that the predetermined amount of time has elapsed without receiving input at the one or more input devices and while playing the playing content item in the now playing mode of the first electronic device, determining that at least one of the input devices has been picked-up by a user; and in response to determining that the at least one of the input devices has been picked up by the user, displaying a progress bar on the display in the now playing mode, the progress bar indicating a current play position in the playing content item.

25. The method of claim 16, further comprising:
after receiving the first input and while playing a currently-playing content item on the first electronic device, receiving a second input comprising a tap detected in a first or a second predefined region of a touch-sensitive surface of the one or more input devices; and
in response to receiving the second input:
  in accordance with a determination that the first electronic device was in the playlist mode when the second input was received, changing a representation of a content item with a current focus in accordance with whether the tap was detected in the first or the second predefined region of the touch-sensitive surface while maintaining the playing of the currently-playing content item on the first electronic device; and
  in accordance with a determination that the first electronic device was in the now playing mode when the second input was received, forgoing changing the representation of the content item with the current focus.

26. The method of claim 16, further comprising:
after receiving the first input and while playing a currently-playing content item on the first electronic device, receiving a second input comprising a click detected in a first or a second predefined region of a touch-sensitive surface of the one or more input devices; and
in response to receiving the second input:
  in accordance with a determination that the first electronic device was in the playlist mode when the second input was received, changing a representation of a content item with a current focus in accordance with whether the click was detected in the first or the second predefined region of the touch-sensitive surface while maintaining the playing of the currently-playing content item on the first electronic device; and
  in accordance with a determination that the first electronic device was in the now playing mode when the second input was received, changing the currently-playing content item in accordance with whether the click was detected in the first or the second predefined region of the touch-sensitive surface.

27. The method of claim 16, further comprising:
after receiving the first input and while in the now playing mode of the first electronic device, receiving a second input via the one or more input devices; and
in response to receiving the second input:
  in accordance with a determination that the second input comprises a click or a tap detected in a predefined region of a touch-sensitive surface of the one or more input devices, transitioning to the playlist mode of the first electronic device; and
  in accordance with a determination that the second input does not comprise a click or a tap detected in the predefined region of the touch-sensitive surface of the one or more input devices, maintaining display of the now playing mode of the electronic device.

28. The method of claim 16, further comprising:
after receiving the first input and while in the playlist mode of the first electronic device, receiving a second input, via the one or more input devices, corresponding to navigation to an action menu including a plurality of actions that can be performed related to a content item with current focus; and
after receiving the second input:
receiving a third input selecting a respective action of the plurality of actions; and
performing the selected action with respect to the content item with current focus.

29. The method of claim 16, further comprising:
after receiving the first input and while playing a currently-playing content item in the now playing mode of the first electronic device, displaying a background on the display that comprises a combination of two versions of artwork for the currently-playing content item, the two versions of the artwork being visually manipulated at different rates.

30. The method of claim 16, further comprising:
after receiving the first input and while playing a currently-playing content item, receiving a second input via the one or more input devices; and
in response to receiving the second input:
in accordance with a determination that the second input corresponds to a request to change the currently-playing content item, changing the currently-playing content item in accordance with the second input and switching a background of the display; and
in accordance with a determination that the second input corresponds to a request to change a representation of a content item with a current focus, changing the representation of the content item with the current focus without switching the background of the display.

31. The method of claim 16, further comprising:
after receiving the first input and while playing a currently-playing content item in the playlist mode of the first electronic device, making a first determination that a predetermined amount of time has elapsed without receiving input at the one or more input devices; and
in response to the first determination, in accordance with a determination that a representation of the currently-playing content item did not have a current focus when the first determination was made, shifting the current focus to the representation of the currently-playing content item.

32. The non-transitory computer readable storage medium of claim 17, wherein the instructions further cause the first electronic device to:
after determining that the respective content item was not playing on the first electronic device when the first input was received and while playing the respective content item on the first electronic device in the playlist mode of the first electronic device in response to receiving the first input, receiving a second input, via the one or more input devices, select the respective representation of the respective content item; and
in response to receiving the second input, transition to the now playing mode of the first electronic device, including:
maintaining the display of the respective representation of the respective content item on the display; and
ceasing the display of the representations of content items other than the respective representation of the respective content item on the display.

33. The non-transitory computer readable storage medium of claim 17, wherein the instructions further cause the first electronic device to:
while the respective content item is playing on the first electronic device, receive a second input comprising a swipe input detected at a touch-sensitive surface of the one or more input devices; and
in response to receiving the second input:
in accordance with a determination that the first electronic device was in the playlist mode when the second input was received, scroll through the plurality of representations of content items in accordance with the swipe input; and
in accordance with a determination that the first electronic device was in the now playing mode when the second input was received, scrub through the respective content item in accordance with the swipe input.

34. The non-transitory computer readable storage medium of claim 17, wherein the instructions further cause the first electronic device to:
after receiving the first input and while the respective content item is playing in the playlist mode of the first electronic device, receive a second input comprising a swipe input detected at a touch-sensitive surface of the one or more input devices; and
in response to receiving the second input:
in accordance with a determination that the second input comprises navigation to a scrubber bar before the swipe input, scrub through the respective content item in accordance with the swipe input; and
in accordance with a determination that the second input does not comprise the navigation to the scrubber bar before the swipe input, scroll through the plurality of representations of content items in accordance with the swipe input.

35. The non-transitory computer readable storage medium of claim 34, wherein the instructions further cause the first electronic device to:
in accordance with the determination that the second input comprises the navigation to the scrubber bar before the swipe input, and while the scrubber bar has a current focus, receive a third input at the touch-sensitive surface of the one or more input devices, the third input comprising a contact having an intensity greater than an intensity threshold detected in a first or a second predefined region of the touch-sensitive surface; and
in response to receiving the third input:
in accordance with a determination that the intensity of the contact is greater than the intensity threshold for less than a time threshold, skip through the respective content item by a predetermined amount in accordance with whether the contact was detected in the first or the second predefined region of the touch-sensitive surface; and
in accordance with a determination that the intensity of the contact is greater than the intensity threshold for greater than the time threshold, skip through the respective content item until the intensity of the contact falls below the intensity threshold in accordance with whether the contact was detected in the first or the second predefined region of the touch-sensitive surface.

36. The non-transitory computer readable storage medium of claim 17, wherein the instructions further cause the first electronic device to:
after receiving the first input and while the respective content item is playing in the playlist mode of the first electronic device, receive a second input comprising a contact detected in a predefined region of a touch-sensitive surface of the one or more input devices; and in response to receiving the second input:

in accordance with a determination that a scrubber bar had current focus when the second input was received, toggle between playing and pausing the respective content item in accordance with the second input; and in accordance with a determination that the scrubber bar did not have the current focus when the second input was received, forgo toggling between playing and pausing the respective content item.

37. The non-transitory computer readable storage medium of claim 17, wherein the instructions further cause the first electronic device to:

after receiving the first input and while in the playlist mode of the first electronic device, make a first determination that a predetermined amount of time has elapsed without receiving input at the one or more input devices; and in response to the first determination:

in accordance with a second determination that a content item was playing at the first electronic device when the first determination was made, transition to the now playing mode of the first electronic device, including displaying a representation of the playing content item on the display and ceasing the display of the representations of content items other than the representation of the playing content item on the display; and in accordance with a third determination that a content item was not playing when the first determination was made, forgo transitioning to the now playing mode of the first electronic device.

38. The non-transitory computer readable storage medium of claim 37, wherein the instructions further cause the first electronic device to:

after making the first determination that the predetermined amount of time has elapsed without receive input at the one or more input devices and while playing the playing content item in the now playing mode of the first electronic device, determine that at least one of the input devices has been picked-up by a user; and in response to determining that the at least one of the input devices has been picked up by the user, display a progress bar on the display in the now playing mode, the progress bar indicating a current play position in the playing content item.

39. The non-transitory computer readable storage medium of claim 17, wherein the instructions further cause the first electronic device to:

after receiving the first input and while playing a currently-playing content item on the first electronic device, receive a second input comprising a tap detected in a first or a second predefined region of a touch-sensitive surface of the one or more input devices; and in response to receiving the second input:

in accordance with a determination that the first electronic device was in the playlist mode when the second input was received, change a representation of a content item with a current focus in accordance with whether the tap was detected in the first or the second predefined region of the touch-sensitive surface while maintaining the playing of the currently-playing content item on the first electronic device; and in accordance with a determination that the first electronic device was in the now playing mode when the second input was received, forgo changing the representation of the content item with the current focus.

40. The non-transitory computer readable storage medium of claim 17, wherein the instructions further cause the first electronic device to:

after receiving the first input and while playing a currently-playing content item on the first electronic device, receive a second input comprising a click detected in a first or a second predefined region of a touch-sensitive surface of the one or more input devices; and in response to receiving the second input:

in accordance with a determination that the first electronic device was in the playlist mode when the second input was received, change a representation of a content item with a current focus in accordance with whether the click was detected in the first or the second predefined region of the touch-sensitive surface while maintaining the playing of the currently-playing content item on the first electronic device; and in accordance with a determination that the first electronic device was in the now playing mode when the second input was received, change the currently-playing content item in accordance with whether the click was detected in the first or the second predefined region of the touch-sensitive surface.

41. The non-transitory computer readable storage medium of claim 17, wherein the instructions further cause the first electronic device to:

after receiving the first input and while in the now playing mode of the first electronic device, receive a second input via the one or more input devices; and in response to receiving the second input:

in accordance with a determination that the second input comprises a click or a tap detected in a predefined region of a touch-sensitive surface of the one or more input devices, transition to the playlist mode of the first electronic device; and in accordance with a determination that the second input does not comprise a click or a tap detected in the predefined region of the touch-sensitive surface of the one or more input devices, maintain display of the now playing mode of the electronic device.

42. The non-transitory computer readable storage medium of claim 17, wherein the instructions further cause the first electronic device to:

after receiving the first input and while in the playlist mode of the first electronic device, receive a second input, via the one or more input devices, corresponding to navigation to an action menu including a plurality of actions that can be performed related to a content item with current focus; and after receiving the second input:

receive a third input selecting a respective action of the plurality of actions; and perform the selected action with respect to the content item with current focus.

43. The non-transitory computer readable storage medium of claim 17, wherein the instructions further cause the first electronic device to:

after receiving the first input and while playing a currently-playing content item in the now playing mode of the first electronic device, display a background on the display that comprises a combination of two versions of artwork for the currently-playing content item, the two versions of the artwork being visually manipulated at different rates.

44. The non-transitory computer readable storage medium of claim 17, wherein the instructions further cause the first electronic device to:

after receiving the first input and while playing a currently-playing content item, receive a second input via the one or more input devices; and in response to receiving the second input:

in accordance with a determination that the second input corresponds to a request to change the currently-playing content item, change the currently-playing content item in accordance with the second input and switch a background of the display; and in accordance with a determination that the second input corresponds to a request to change a representation of a content item with a current focus, change the representation of the content item with the current focus without switching the background of the display.

45. The non-transitory computer readable storage medium of claim 17, wherein the instructions further cause the first electronic device to:

after receiving the first input and while playing a currently-playing content item in the playlist mode of the first electronic device, make a first determination that a predetermined amount of time has elapsed without receiving input at the one or more input devices; and in response to the first determination, in accordance with a determination that a representation of the currently-playing content item did not have a current focus when the first determination was made, shift the current focus to the representation of the currently-playing content item.

* * * * *